US012565912B2

(12) United States Patent
Awtar et al.

(10) Patent No.: US 12,565,912 B2
(45) Date of Patent: Mar. 3, 2026

(54) IN-PLANE INTER-STAGE CONNECTION IN FLEXURE MECHANISMS

(71) Applicant: The Regents of the University of Michigan, Ann Arbor, MI (US)

(72) Inventors: Shorya Awtar, Ann Arbor, MI (US); Siddharth Rath, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 18/605,399

(22) Filed: Mar. 14, 2024

(65) Prior Publication Data

US 2025/0290542 A1 Sep. 18, 2025

(51) Int. Cl.
*F16C 11/12* (2006.01)

(52) U.S. Cl.
CPC ............. *F16C 11/12* (2013.01); *Y10T 403/45* (2015.01); *Y10T 403/54* (2015.01)

(58) Field of Classification Search
CPC ....... F16C 11/12; Y10T 403/45; Y10T 403/54
See application file for complete search history.

(56) References Cited

U.S. PATENT DOCUMENTS 4,559,717 A * 12/1985 Scire ....................... F16C 11/12 33/1 M
4,991,309 A * 2/1991 Nagasawa .............. G05B 19/23 33/573
6,688,183 B2 * 2/2004 Awtar ................... G01M 5/005 74/521
7,239,107 B1 7/2007 Ferreira et al.
8,312,561 B2 * 11/2012 Rangelow .............. B82Y 35/00 850/2
9,157,476 B2 10/2015 Panas
9,200,689 B2 * 12/2015 Awtar ................... B81B 3/0051
2005/0198844 A1 9/2005 Lee et al.
2010/0116161 A1 5/2010 Shilpiekandula et al.

OTHER PUBLICATIONS

Shorya Awtar and Gaurav Parmar, Design of a Large Range XY Nanopositioning System, Paper, Ann Arbor, MI (13 pages).
Shorya Awtar and Alexander H. Slocum, Constraint-based Design of Parallel Kinematic XY Flexure Mechanisms, Paper (33 pages).
Jiaxiang Zhu, Guangbo Hao, Shiyao Li, Shuwen Yu, Xianwen Kong, A Mirror-Symmetrical XY Compliant Parallel Manipulator with Improved Performances without Increasing the Footprint, Proceedings of the ASME 2021 International Design Engineering Technical Conferences and Computers and Information in Engineering Conference IDETC-CIE2021 Aug. 17-19, 2021, Virtual, Online (13 pages).

(Continued)

*Primary Examiner* — Michael P Ferguson
(74) *Attorney, Agent, or Firm* — Reising Ethington P.C.

(57) ABSTRACT

A multitude of flexure mechanism designs are set forth herein that furnish enhanced stiffness properties. The flexure mechanism designs can have various stages including ground stages, motion stages, flexure stages, and reinforcement stages, among other possible stages depending on the construction of the flexure mechanism designs. It has been determined that stages constituting sister stages can be connected via one or more in-plane inter-stage connections.

16 Claims, 43 Drawing Sheets

(56) References Cited

OTHER PUBLICATIONS

S. Awtar, A.H. Slocum, A Large Range XY Flexure Stage for Nanopositioning, Paper (4 pages).
Yuen Kuan Yong, Sumeet S. Aphale, and S. O. Reza Moheimani, Design, Identification, and Control of a Flexure-Based XY Stage for Fast Nanoscale Positioning, IEEE Transactions On Nanotechnology, vol. 8, No. 1, Jan. 2009 (9 pages).
Qingsong Xu, Design and Development of a Compact Flexure-Based XY Precision Positioning System With Centimeter Range, IEEE Transactions On Industrial Electronics, vol. 61, No. 2, Feb. 2014 (11 pages).
Kunhai Caia, Yanling Tiana, Xianping Liub, Dawei Zhanga, Jiangkun Shanga, Bijan Shirinzadehc, Development and control methodologies for 2-DOF micro/nano positioning stage with high out-of-plane payload capacity, Robotics and Computer Integrated Manufacturing, 2019 (11 pages).
Dongwoo Kang, Kihyun Kim, Dongmin Kim, Jongyoup Shim, Dae-Gab Gweon, Jaehwa Jeong, Optimal design of high precision XY-scanner with nanometer-level resolution and millimeter-level working range, Mechatronics, 2009 (9 pages).
Yiling Yang, Yanding Wei, Junqiang Lou and Fengran Xie, Design and analysis of a new flexure-based XY stage, Journal of Intelligent Material Systems and Structures 2017, vol. 28 (17) 2388-2402 (15 pages).
Shixun Fan, Hua Liu, and Dapeng Fan, Design and development of a novel monolithic compliant XY stage with centimeter travel range and high payload capacity, Mech. Sci., 9, 161-176, 2018 (16 pages).
Mohammad Olfatnia, Leqing Cui, Pankaj Chopra, and Shorya Awtar, MEMS Based XY Stage with Large Displacement, Proceedings of the ASME 2013 International Design Engineering Technical Conferences & Computers and Information in Engineering Conference IDETC/CIE Aug. 4-7, 2013, 2013, Portland, OR, USA (9 pages).
Mohammad Olfatnia, Siddharth Sood, Jason J. Gorman, Shorya Awtar, Large Stroke Electrostatic Comb-drive Actuators Based on a Novel Flexure Mechanism, Paper (4 pages).
Mohammad Olfatnia, Siddharth Sood, Shorya Awtar, Large Stroke Comb-Drive Actuators Using Reinforced, Clamped, Paired Double Parallelogram (C-DP-DP) Flexure, Proceedings of the ASME 2012 International Design Engineering Technical Conferences & Computers and Information in Engineering Conference IDETC/CIE 2012, Aug. 12-15, 2012, Chicago, IL, USA (9 pages).
Mohammad Olfatnia, Siddharth Sood, Jason J. Gorman, Member, IEEE, and Shorya Awtar, Member, ASME, Large Stroke Electrostatic Comb-Drive Actuators Enabled by a Novel Flexure Mechanism, Journal of Microelectromechanical Systems, vol. 22, No. 2, Apr. 2013 (12 pages).
Shorya Awtar and Alexander H. Slocum, Design of Parallel Kinematic XY Flexure Mechanisms, Proceedings of IDETC/CIE 2005 ASME 2005 International Design Engineering Technical Conferences & Computers and Information in Engineering Conference, Sep. 24-28, 2005, Long Beach, California, USA (11 pages).
Shorya Awtar, Alexander H. Slocum, Topology Evolution of High Performance XY Flexure Stages, Paper (4 pages).

* cited by examiner

IN-PLANE INTER-STAGE CONNECTION IN FLEXURE MECHANISMS

TECHNICAL FIELD

This disclosure relates generally to flexure mechanisms for guiding motion and, more particularly, relates to flexure mechanisms that exhibit enhanced stiffness properties.

BACKGROUND

Flexure mechanisms are often employed as bearings to provide guided motion. Flexure mechanisms can move by elastic deformation and, when they do, are largely free of backlash, wear, and friction. Flexure mechanisms also lack the need of lubrication. Important in certain precision engineering and micro- and nano-positioning applications, flexure mechanisms exhibit low inertia and high accuracy. Examples of some general applications in which flexure mechanisms are useful include, but are not limited to, micro-electro mechanical system (MEMS) devices such as actuators and sensors, ultra-precision motion stages for fine alignment and adjustments, scanning probe microscopy and metrology, scanning probe nanolithography, memory storage, hard-drive and semiconductor inspection, semiconductor packaging, biological imaging, and non-contact macro scale actuators and sensors.

SUMMARY

In an embodiment, a flexure mechanism assembly may have a ground body, a motion body, a multitude of double parallelogram flexure modules, and one or more in-plane inter-stage connections. The double parallelogram flexure modules are arranged between the ground body and the motion body. The double parallelogram flexure modules have a multitude of secondary bodies. The in-plane inter-stage connection(s) extends between one or more sets of sister stages of the flexure mechanism assembly.

In an embodiment, a flexure mechanism assembly may have a ground body, a motion body, a multitude of flexure modules, a multitude of intermediate bodies, and one or more in-plane inter-stage connections. The flexure modules are arranged between the ground body and the motion body. The intermediate bodies are arranged among the flexure modules. The in-plane inter-stage connection(s) extends between at least a first intermediate body of the multitude of intermediate bodies and a second intermediate body of the multitude of intermediate bodies.

In an embodiment, a flexure mechanism assembly may have a ground body, a motion body, four or more double parallelogram flexure modules, four or more intermediate bodies, one or more first in-plane inter-stage connections, and one or more second in-plane inter-stage connections. The double parallelogram flexure modules are arranged between the ground body and the motion body. The intermediate bodies are arranged among the double parallelogram flexure modules. The first in-plane inter-stage connection(s) extends between a first intermediate body of the four or more intermediate bodies and a second intermediate body of the four or more intermediate bodies. The second in-plane inter-stage connection(s) extends between a third intermediate body of the four or more intermediate bodies and a fourth intermediate body of the four or more intermediate bodies.

BRIEF DESCRIPTION OF THE DRAWINGS

Exemplary embodiments will hereinafter be described in conjunction with the appended drawings, wherein like designations denote like elements, and wherein.

DETAILED DESCRIPTION

Figure 1:
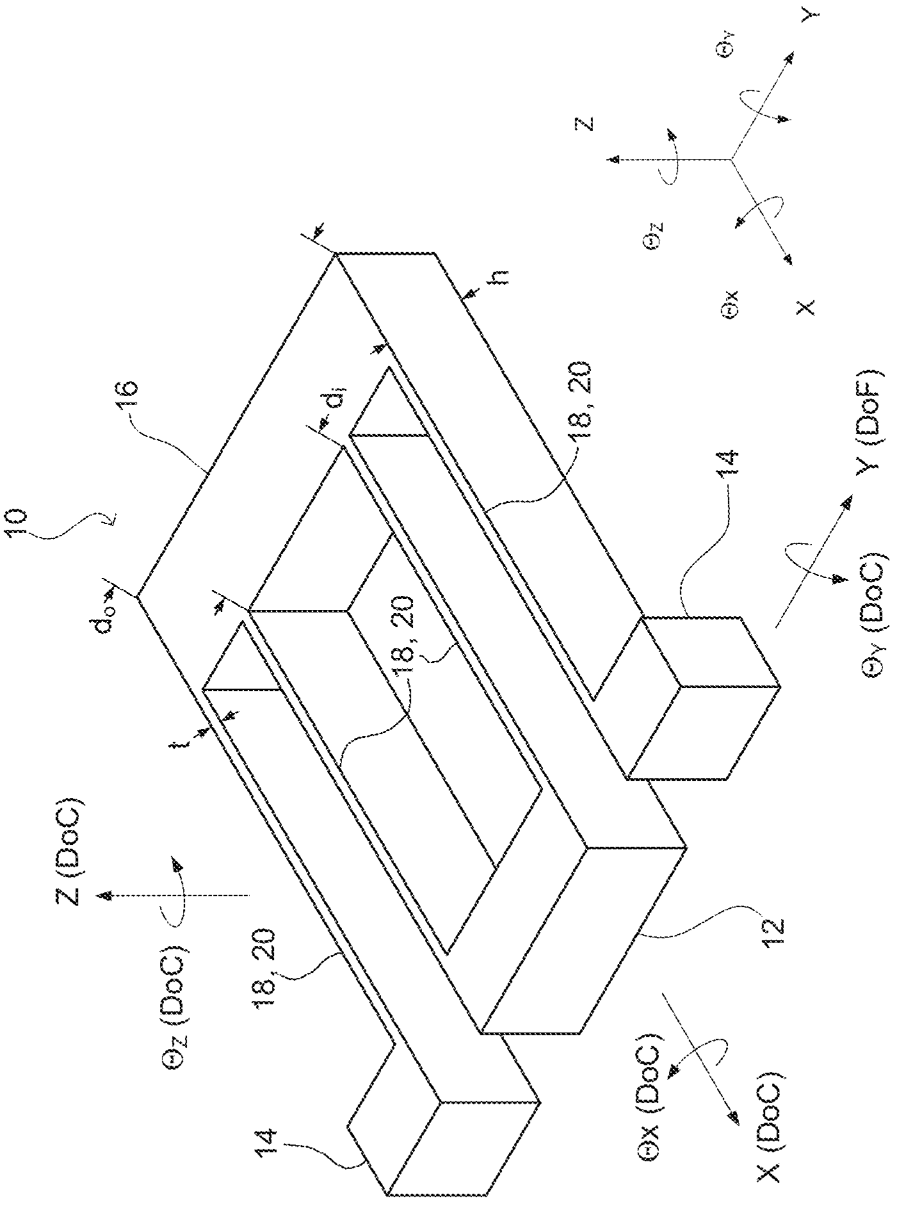
FIG. 1 is a perspective view of a double parallelogram flexure mechanism (DPFM), showing degrees of freedom (DoFs) and degrees of constraint (DoCs)

Initially, numbered definitions are presented for certain terms and phrases used in this detailed description and in the claims.

1) Body. A body can be part of an assembly, sub-assembly, or mechanism, etc. A body can be a rigid body or a flexible body. But nothing is ever truly rigid. Rather, what this term means is that the intent for the rigid body is to be rigid. In general, a rigid body will have some undesired compliance, referred to parasitic compliance, as subsequently described. A flexible body, on the other hand, is flexible by design. In other words, it has intentional (as opposed to undesired) compliance.

Elements, components, stages, etc., are all examples of rigid or flexible bodies. In this patent, stages are typically rigid bodies, while flexure elements (e.g., beams, strips, wires) are flexible bodies.

A flexible body may be intentionally flexible in certain portions and intentionally rigid in other portions. The portions can be monolithic or structurally assembled. A flexible body may also be referred to as a compliant body. Further, a body may be of homogeneous material composition or heterogeneous material composition.

As subsequently set forth, a rigid body or a flexible body can be a monolith or a structural assembly of multiple bodies. Structural assembly is defined as an interface between two bodies that eliminates all relative degrees of freedom between the two bodies.

2) The displacement(s) (used interchangeably with motion(s); a general term that includes both translations and rotations) of a body can generally be defined with respect to another body by describing motion or lack thereof along six directions (three translations and three rotations).

Of the six directions, the directions along which relative displacement is allowed between two bodies are called the "Degrees of Freedom (DoF)" between the two bodies. DoF is a technical term to capture or convey these allowed motions. Other terms that can be used interchangeably with degrees of freedom are directions of freedom, and motion directions.

Of the six directions, the directions along which relative displacement is not allowed are called "Degrees of Constraint (DoC)" between the two bodies. Displacements and loads (a general term that includes both force and moments) are transmitted from one body to the other along the DoC. Since relative motion is constrained, these are directions along which motions (i.e., translations or rotations) and loads (i.e., forces or moments) can be transmitted from one body to the other body. Since the joint/interface between the two bodies does not allow relative motion between the two bodies in the DoC direction, if one body moves in the DoC direction, it drives along with it the other body along that direction. In other words, motions are transmitted from one body to another body in the DoC directions. Consequently, loads are also transmitted from one body to the other in the DoC directions. Therefore, these directions are referred to as constraint directions, directions of constraint, load bearing directions, bearing directions, transmission directions, or non-motion directions.

In general, DoF plus DoC equals six in total. The number of relative DoF between two bodies is determined by the joint or interface between the two bodies.

3) Joint. Joints are interfaces between two bodies. When a joint or an interface is intended to eliminate all relative motions, or DoF, between two bodies, it is a structural joint. The two bodies interconnected by a structural joint may be referred to as a structural assembly. Examples of structural joints include, but are not limited to, a screwed joint, a bolted joint, a riveted joint, a brazed joint, a welded joint, a glued joint, and the like. When a joint or interface between two bodies is intended to allow one or more DoF(s), the joint is a kinematic joint. Examples of kinematic joints include, but are not limited to, a pin/pivot joint, a slider joint, a universal joint, a ball and socket joint, a flexure joint, and the like.

In all, there are six independent directions along which motions, or DoFs, are possible between two rigid bodies when there is no joint between them: three translations and three rotations. A joint allows anywhere between zero and six DoF(s) between two bodies. For the case when the joint allows zero DoF, this effectively becomes a structural joint as described above. In this case, the two bodies become rigid extensions of each other. While a structural joint is intended to be ideal—i.e., the stiffness of the joint or interface is desired to be infinity—that is never the case. There is always some undesired joint stiffness that leads to parasitic compliance in a structural assembly.

Where a joint allows six DoFs, this effectively means that there is no joint, or that the joint does not constrain any motions between the two bodies. In other words, the motions of the two bodies are entirely independent of each other. Any practical kinematic joint for the purpose this patent allows one, two, three, four, or five DoF(s) between two bodies. If a joint allows one DoF, then the remaining five possible motions (DoCs) are constrained by the joint. If a joint allows two DoFs, then the remaining four possible motions (DoCs) are constrained by the joint. If a joint allows three DoFs, then the remaining three possible motions (DoCs) are constrained by the joint. If a joint allows four DoFs, then the remaining two possible motions (DoCs) are constrained by the joint. If a joint allows five DoFs, then the remaining one possible motion (DoC) is constrained by the joint.

Table 1 below sets forth certain nomenclature as used in this patent:

| | |
|---|---|
| Dimensions | Lower case, italicized<br>Example: t for flexure blade thickness |
| Direction | Upper case<br>Example: X, Y, Z, $\Theta_x$, $\Theta_y$, $\Theta_z$ directions |
| Motion/Displacement | Lower case<br>Example: x, y, z, $\theta_x$, $\theta_y$, $\theta_z$ displacements/translations/rotations |
| Axis | Upper case<br>Example: X1, X2, X3, Y1, Y2, Y3 axes |

Descriptions of certain embodiments are now presented with references to the figures.

Flexure Mechanism

A mechanism is an assembly of bodies that may be interconnected via interfaces/joints, and serves to offer relative motions (or DoF) between the bodies. In particular, a flexure mechanism is one that has at least one flexible body. Further, a flexure mechanism is one that provides at least some of these relative motions via intentional elastic deformation of one or more of its constituent flexible bodies. A flexure mechanism may also provide all of these relative motions via elastic deformation of its constituent flexible bodies.

In general, while a flexure mechanism can have multiple bodies, two bodies are often identified—a motion stage or body, and a ground stage or body. Typically, relative motions of the motion stage are described with respect to the ground stage. A flexure mechanism employs elastic deformation to provide relative motion between the motion stage and ground stage in one or more motion directions, or DoF; and, provides high stiffness and load bearing capability in the remaining non-motion directions, or bearing directions or DoC. Further, in the context of a mechanism like the flexure mechanism, the ground body or reference ground serves as a kinematic reference for the other bodies. The ground body is not necessarily an absolute ground in the sense that it is attached or bolted for the actual ground, although that is a possibility. The ground body serves as a mechanical reference with respect to which motions of other bodies are described or investigated.

Referring now to FIG. 1, an embodiment of a double parallelogram flexure mechanism (DPFM) 10 is presented. The DPFM 10 provides relative translation of a first body 12 in the Y direction with respect to a second body 14. The DPFM 10 constrains the first body 12 with respect to the second body 14 in the remaining five directions, i.e., X, Z, $\Theta_x$, $\Theta_y$, and $\Theta_z$. Therefore, the DPFM 10 provides one DoF and five DoCs, according to this embodiment. The first and second bodies 12, 14, or their respective portions, are also considered a part of the DPFM 10. In a particular context or application, and still referring to FIG. 1, the first body 12 is a motion body 12 or a motion stage of the DPFM 10, and the second body 14 is a ground body 14 or a ground stage of the DPFM 10. In another context or application, this arrangement could be reversed and the first body 12 would then be the ground body or ground stage of the DPFM 10, and the second body 14 would be the motion body or motion stage of the DPFM 10. Furthermore, in this embodiment, the DPFM 10 has a third body 16. Here, the third body 16 is a secondary body 16 or secondary stage of the DPFM 10.

The DPFM 10 also includes flexible or compliant bodies 18 in the form of flexure blades, per this embodiment. The elastic deformation of the flexible bodies 18 due to their decreased thickness (t) provides the Y direction translational motion of the motion body 12 relative to the ground body 14, according to this embodiment. The geometry of the DPFM 10 and its constituent bodies—i.e., motion body 12, ground body 14, secondary body 16, and flexible bodies 18—provides high stiffness in the remaining five directions, i.e., X, Z, $\Theta_x$, $\Theta_y$, and $\Theta_z$, making these five directions the load bearing or DoC directions.

The parallel geometric arrangement of the four flexible bodies 18 in the DPFM 10 of FIG. 1 and the increased separation among them, given by $d_i(d_i>>t)$ and $d_o(d_o>>t)$, along the Y direction provides high stiffness that constrains the displacement of the motion body 12 relative to the ground body 14 along the $\Theta_x$ and $\Theta_z$ directions. The increased height of the flexible bodies 18, given by h (h>>t), along the Z direction provides high stiffness that constrains the displacement of the motion body 12 relative to the ground body 14 along Z and $\Theta_y$ directions. Similarly, the increased stiffness of the flexible bodies 18 along the X direction constrains the displacement of the motion body 12 relative to the ground body 14 along the X direction.

Furthermore, as used herein, there is a certain equivalence among the terms flexure mechanism, flexure module, and flexure joint. All of these can be viewed as allowing certain motion(s) along certain degree(s) of freedom (DoF) between two bodies and constraining the remaining motions. A flexure joint, in particular, can include a single flexible body or a few flexible bodies; a flexure module can include more flexible bodies; and a flexure mechanism generally includes many flexible bodies. Typically, a joint is of simpler construction, a module if more complex and can include multiple joints, and a mechanism can include multiple joints and/or multiple modules.

Figure 3:
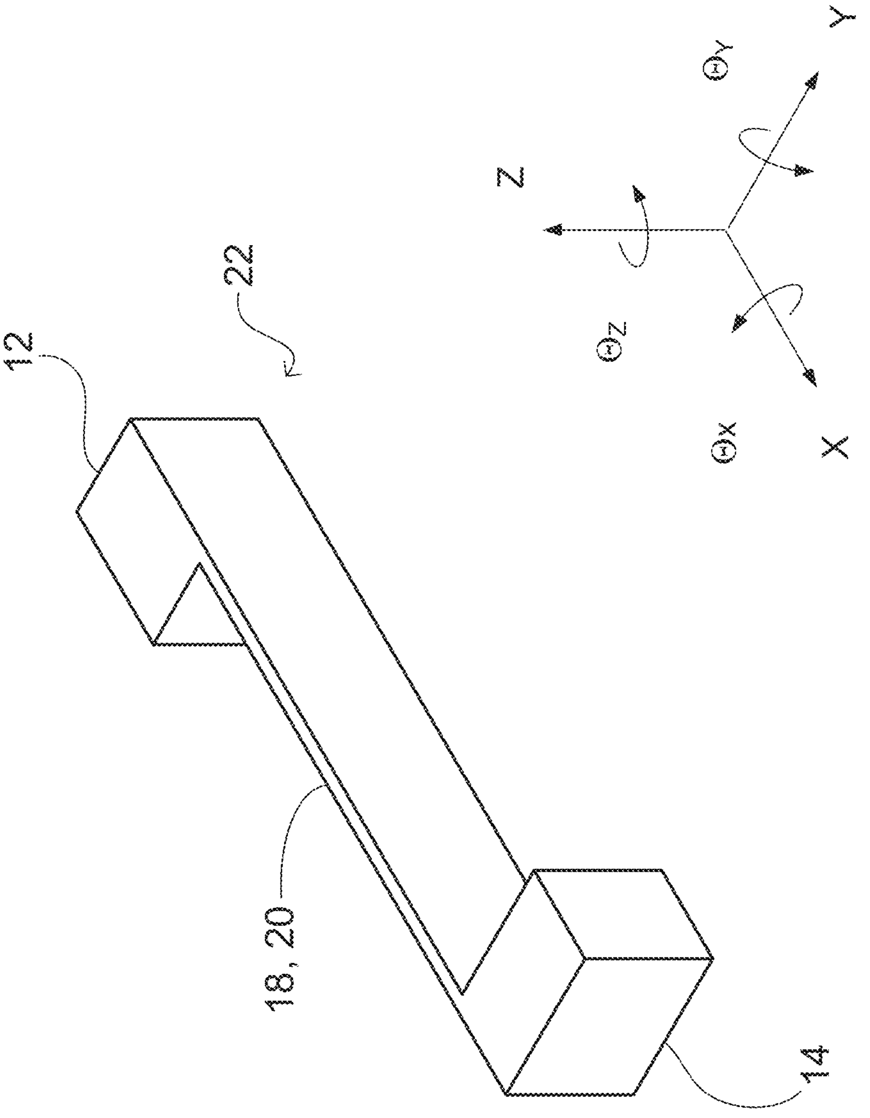
FIG. 3 is a perspective view of an embodiment of a flexure joint in the form of a flexure blade connecting a ground stage and a motion stage together.
Figure 4:
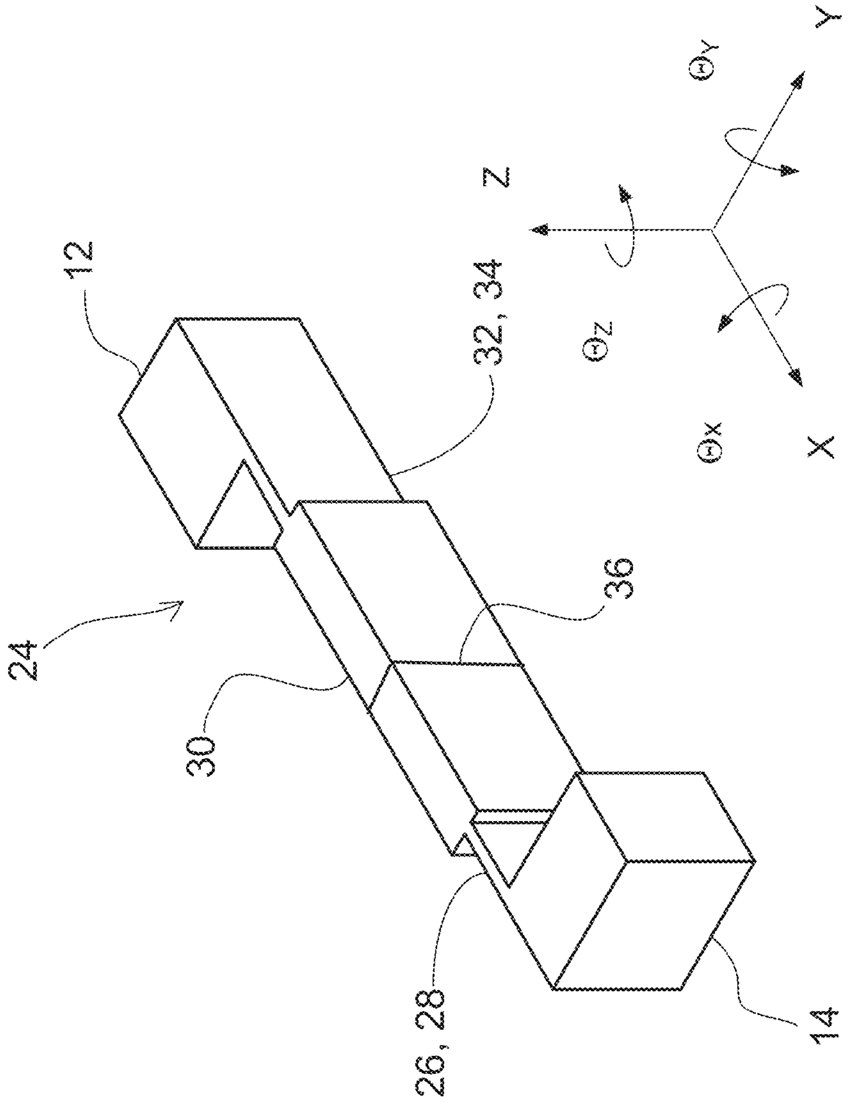
FIG. 4 is a perspective view of an embodiment of a flexure module having a pair of flexure blades and three bodies (i.e., a ground body/stage, a reinforcement body/stage, and a motion body/stage)

With reference to FIG. 3, the single flexible body 18—in the form of a flexure blade 20—is an example of a flexure joint 22 that allows relative displacements between the motion body 12 and ground body 14 along the Y, $\Theta_x$, and $\Theta_z$ directions, and restricts relative displacements along the $\Theta_y$, Z, and X directions. In FIG. 4, an example of a flexure module 24 is shown. The flexure module 24 has two flexible joints. A first flexible joint is made between the ground body 14 and another body. The first flexible joint here is a first flexible body 26 in the form of a first flexure blade 28. The other body in this example is a reinforcement body 30 or reinforcement stage. A second flexible joint is made between the motion body 12 and the reinforcement body 30. The second flexible joint, like the first flexible joint, is a second flexible body 32 in the form of a second flexure blade 34. The bodies that constitute the flexure module 24 can be monolithic or can be formed via the structural assembly of two or more bodies. In the example of FIG. 4, the motion body 12 and ground body 14 are monolithic bodies, while the reinforcement body 30 is an assemblage of two bodies joined structurally together. A structural joint 36 of the reinforcement body 30 can be carried out in various ways including, but not limited to, adhesives, bolting, and/or riveting.

Figure 9:
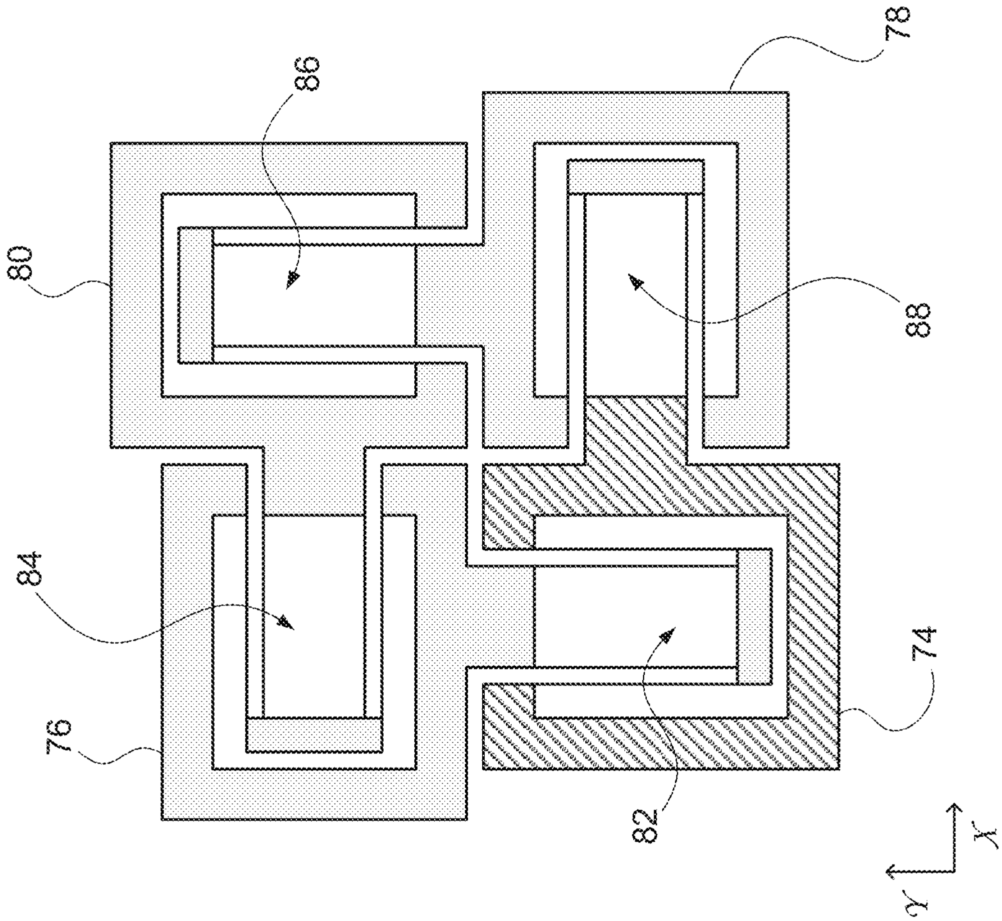
FIG. 9 is a schematic of an embodiment of a MDoF PK XY flexure mechanism having four DPFMs.

But what is simple and what is complex depends on context. A mechanism under consideration may appear simple or small in the context of a much larger mechanism, in which case the particular mechanism under consideration may be referred to as a module or even as a joint. For example, the DPFM 10 of FIG. 1 can be considered a flexure mechanism when employed by itself. But when the DPFM 10 of FIG. 1 is employed to build a more complex mechanism like the parallel kinematic (PK) XY flexure mechanism of FIG. 9, then in that context the DPFM can be considered a flexure module (i.e., double parallelogram flexure module). In FIG. 9, the arrangement of four double parallelogram flexure modules results in an XY flexure mechanism that has two DoFs, a DoF in the X direction and a DoF in the Y direction.

Ideal Bearing Behavior

Flexure mechanisms are commonly used as bearings to provide guided motion along the associated DoF in various motion control applications. When a flexure mechanism employs only elastic deformation of its accompanying flexible bodies to provide such guided motion, then the flexure mechanism is free of the friction and backlash associated with conventional rolling and sliding joints with sliding guideways or rolling element bearings. Examples of some general applications in which flexure mechanisms are utilized include, but are not limited to, micro-electro mechanical system (MEMS) devices such as actuators and sensors, ultra-precision motions stages for fine alignment and adjustments, scanning probe microscopy and metrology, scanning probe nanolithography, memory storage, hard-drive and semiconductor inspection, semiconductor packaging, biological imaging, and non-contact macro scale actuators and sensors. In these applications as well as others, it is highly desirable to achieve ideal bearing behavior in the flexure mechanisms.

A mechanism employed as a bearing in a motion control application exhibits ideal bearing behavior if it can effect: i) infinite motion and zero constraint (i.e., zero stiffness or resistance) along the motion directions (DoF) and over the entire range of motion in the DoF directions, and ii) zero error motion and infinite constraint (i.e., infinite stiffness or load bearing capability) along the non-motion or bearing directions (DoC) over the entire range of motions in the DoF directions. But a flexure mechanism, it is thought, can never achieve ideal bearing behavior because it produces motion due to the elastic deformation of its flexible/compliant bodies. It is impractical for the flexible/compliant bodies to have zero stiffness (i.e., infinite compliance) in some directions and infinite stiffness (i.e., zero compliance) in the other directions. Therefore, flexure mechanisms will have small but non-zero stiffness along their DoFs and large but finite stiffness along their DoCs. The large but finite stiffness of a flexure mechanism along its DoCs implies small but non-zero motion along its DoCs in the presence of applied force. This motion is referred to as elastic motion along the DoC because it arises due to the finite compliance of the mechanism along its DoCs. Another kind of motion is possible along the DoCs which is attributed to the kinematics of the flexure mechanism (and not its elastic behavior). Such motion is referred to as kinematic motion along the DoC. Apart from the flexible/compliant bodies, there are also rigid bodies in a flexure mechanism, as depicted in the DPFM 10 of FIG. 1. While ideally rigid bodies should have zero compliance (i.e., infinite stiffness), in practice there is always some compliance exhibited by them which is referred to as parasitic compliance (described in more detail below). The parasitic compliance of these rigid bodies leads to further deviation of the flexure mechanisms from the ideal bearing behavior. Accordingly, the aim in flexure mechanism design is to approach ideal bearing behavior, while knowing it can never truly be achieved.

Figure 2:
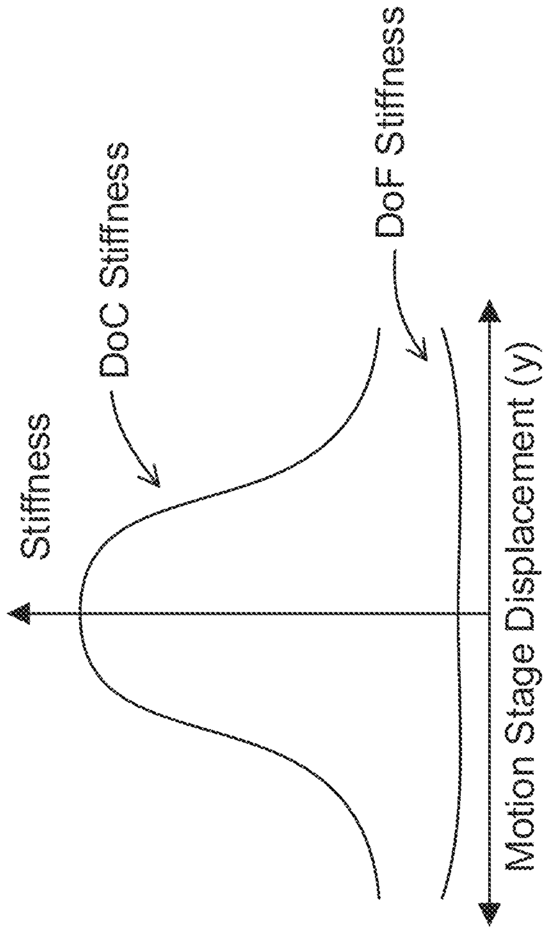
FIG. 2 is a graph demonstrating in a qualitative manner DoF stiffness and DoC stiffness of the DPFM in a Y direction, with motion stage displacement (y) plotted on an x-axis and stiffness plotted on a y-axis.

Consider the DPFM 10 of FIG. 1. FIG. 2 provides a graphical illustration of stiffness of the DPFM 10 of FIG. 1 along its DoF (i.e., Y direction) and any one of its DoCs (i.e., X, Z, $\Theta_x$, $\Theta_y$, $\Theta_z$ directions) as a function of the Y direction translation (y) of the motion body 12. Although FIG. 2 illustrates the DoC stiffness along only one of the load bearing directions, the DoC stiffness curve of the graph is representative of the stiffness along the remaining load bearing directions as well. It is shown in FIG. 2 that the DPFM 10 exhibits non-zero stiffness (i.e., finite compliance) along its DoF, the Y direction. Similarly, the DPFM 10 exhibits finite stiffness along its DoC, and not infinite stiffness which is required for ideal bearing behavior. But even when exhibiting non-ideal bearing behavior, there is a large difference between the DoF and DoC stiffness, with the DoC stiffness being several orders of magnitude higher than the DoF stiffness when Y translation (y) of the motion body 12 is zero (i.e., y=0). The stiffness along the DoC are not only finite, but further decrease as the Y direction translation (y) of the motion body 12 is increased. This means that the DPFM 10 provides limited load bearing capability in the non-motion directions, or DoCs, which further worsens as the Y direction translation (y) of the motion body 12 is increased. The DoF stiffness can also increase as the Y direction translation (y) of the motion body 12 is increased. Although it is shown here that a DPFM does not achieve ideal bearing behavior, this holds true for any flexure mechanism that consists of flexible/compliant bodies. Certain previously-known flexure mechanism designs have been purported to approach ideal bearing behavior. But these previously-known flexure mechanisms suffer from a trade-off between the DoF and DoC stiffness any design that increases the DoC stiffness concomitantly increases the DoF stiffness. Likewise, any flexure mechanism design that decreases the DoF stiffness concomitantly decreases the DoC stiffness. This trade-off between DoF and DoC stiffness is described below.

Parasitic Compliance

Figure 5:
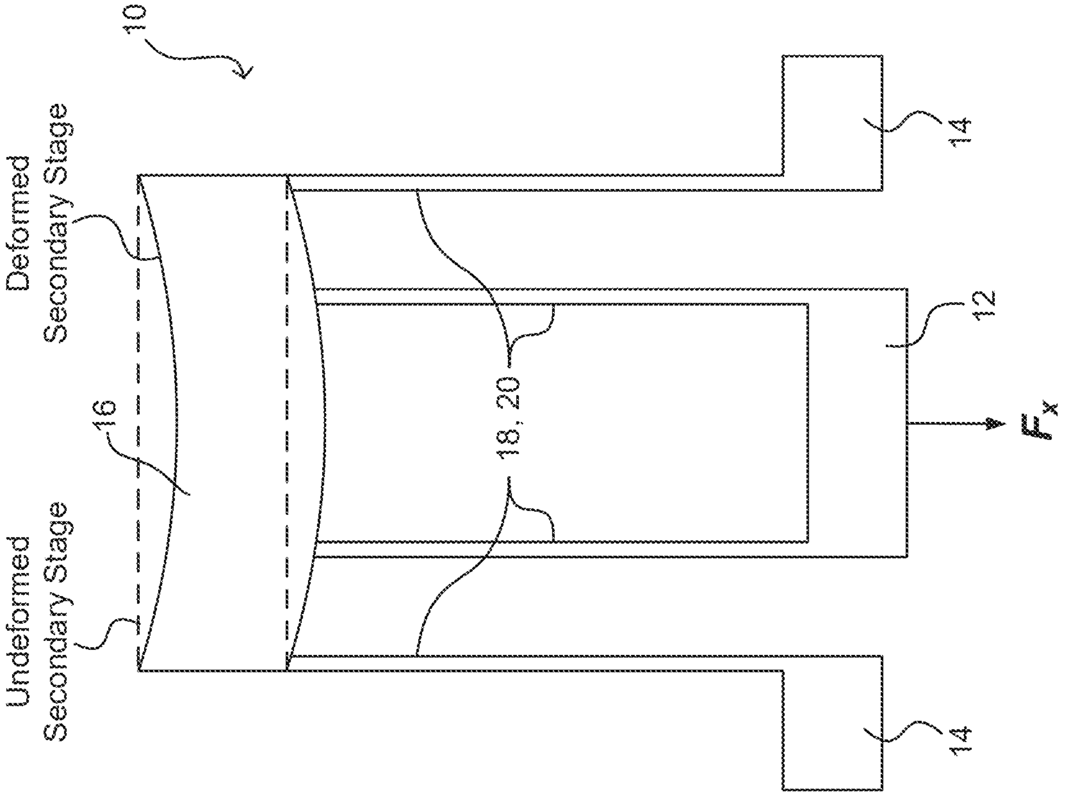
FIG. 5 is a schematic demonstrating parasitic compliance of a secondary stage in an X direction of a DPFM (i.e., undeformed secondary stage is presented in broken lines, and deformed secondary stage is presented in solid lines)

Rigid bodies are intended to be infinitely stiff in all six directions (i.e., X, Y, Z, $\Theta_x$, $\Theta_y$, $\Theta_z$ directions). But no rigid body can be infinitely stiff in practice. Even supposedly rigid bodies have some small finite compliance. Such unintended and often undesired compliance of the rigid bodies in any direction is referred to as parasitic compliance. As an example, and with reference again to FIG. 1, the DPFM 10 per this embodiment has three rigid bodies: the ground body 14, the secondary body 16, and the motion body 12. All of these rigid bodies should ideally have infinite stiffness in all of the six directions. But depending on their geometry and dimensions, the rigid bodies exhibit varying amounts of parasitic compliance in every one of the six directions. Referring now to FIG. 5, a top view of the DPFM 10 is shown to demonstrate parasitic compliance of the secondary stage 16 in the X direction. The top view of FIG. 5 is viewed from the Z direction. When force $F_x$ is applied on the motion body 12 along the X direction, the secondary body 16 is deformed in the XY plane as a consequence and as shown. The undeformed secondary stage is shown in broken lines in the figure, while the deformed secondary stage is shown in solid lines, both for demonstrative purposes. Such deformation of the secondary body 16 upon application of the force $F_x$ is due to the finite stiffness, or non-zero compliance, of the secondary body 16 in the X direction. This is the parasitic compliance of the secondary body 16 and it is less-than-ideal stiffness in the X direction which is a bearing direction of the DPFM 10. Although lacking depiction in FIG. 5, forces applied to the motion body 12 in the other five directions (i.e., Y, Z, $\Theta_x$, $\Theta_y$, $\Theta_z$ directions) will similarly cause deformations of the secondary body 16 due to the parasitic compliance of the secondary body 16 in those directions. Such parasitic compliances of rigid bodies—demonstrated here for the secondary body 16—lead to less than desired stiffnesses in the DoC directions.

Types of Flexure Mechanisms

Single degree of freedom flexure mechanism. Flexure mechanisms that provide guided relative motion between two bodies only along one direction, and therefore constrain the relative motion along the remaining five directions, are called single degree of freedom (SDoF) flexure mechanisms. Single DoF flexure mechanisms provide one DoF and five DoCs. The DPFM 10 in FIG. 1 is an example of a SDoF flexure mechanism. The DPFM 10 provides relative translational motion between the motion body 12 and the ground body 14 only along the Y direction, which is the single DoF, and constrains the relative motions of the motion body 12 with respect to the ground body 14 along the remaining five directions, making these five directions the DoCs.

Multi degree of freedom flexure mechanism. Flexure mechanisms that provide guided relative motion between two bodies along more than one direction are called multi degree of freedom (MDoF) flexure mechanisms. Multi DoF flexure mechanisms provide more than one DoF and less than five DoC. The flexure joint 22 of FIG. 3 is an XY flexure mechanism, and is an example of a MDoF flexure mechanism. The flexure joint 22 provides relative translational motion between the ground body 14 and the motion body 12 along the X direction and the Y direction. Specifically, the flexure joint 22 is an example of a two DoF flexure mechanism—it constrains the relative motions of the motion body 12 with respect to the ground body 14 along the remaining four directions, making these four directions the DoCs.

Figure 6:
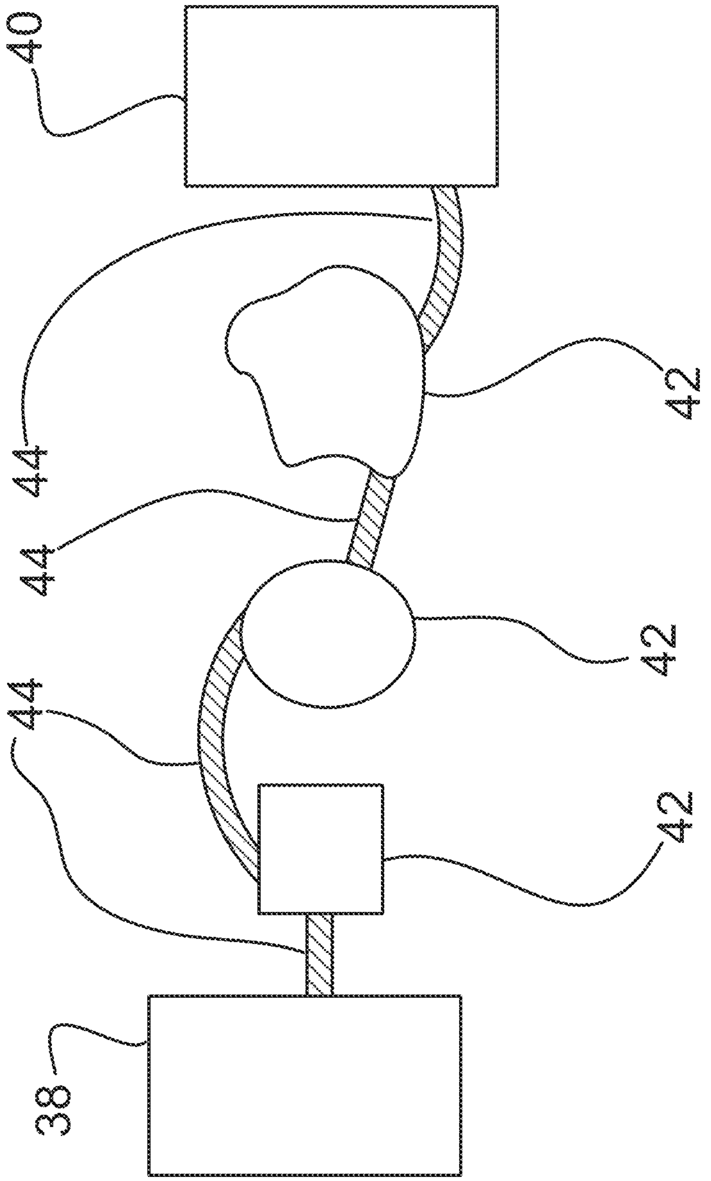
FIG. 6 is an abstract representation of a multi-degree-of-freedom (MDoF) serial kinematic (SK) mechanism.
Figure 7:
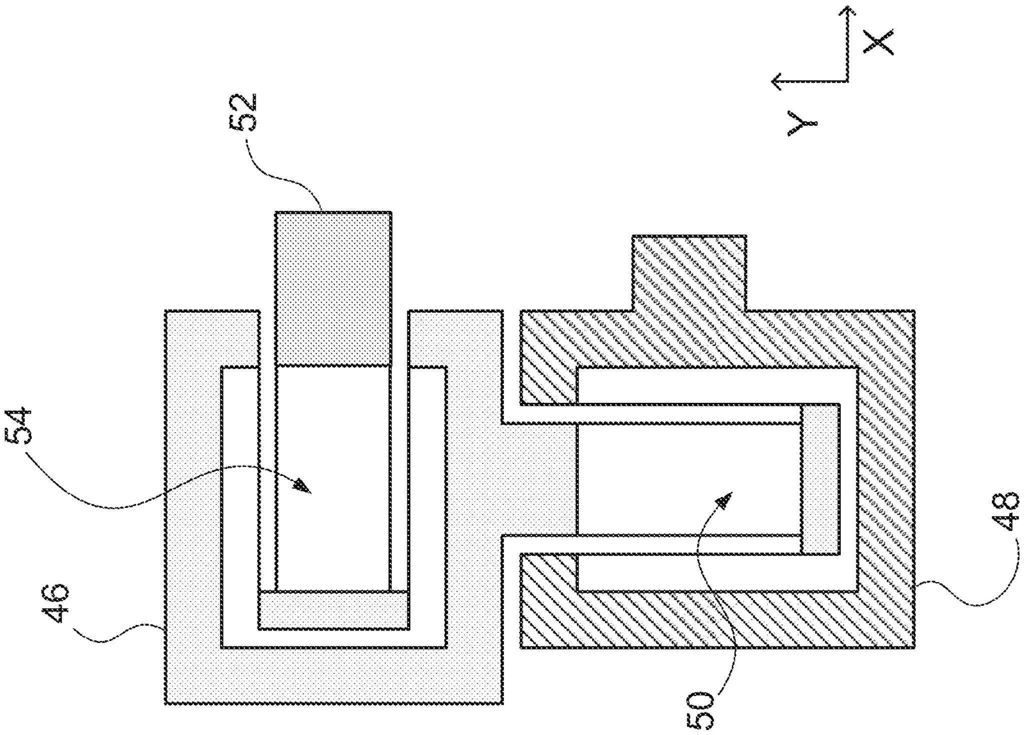
FIG. 7 is a schematic of an embodiment of a MDoF SK mechanism.

In general, in MDoF flexure mechanisms the DoFs can be effected in one of two ways: via serial design, also known as serial kinematic (SK) design or chain or mechanism, or via parallel design, also known as parallel kinematic (PK) design or chain or mechanism. The technical term "kinematics" refers to the geometric study and description of motion of bodies relative to other bodies. FIG. 6 shows an abstract representation of a serial design. A first body 38 is connected to a second body 40 via a serial chain of intermediate bodies 42. If one traces or scribbles a line from the first body 38 to the second body 40, there is only one mechanical path or line, making this a serial design. The first body 38, second body 40, and intermediate bodies 42 are rigid in this representation (but with parasitic compliances, as previously described). Connectors 44 between the first body 38, second body 40, and intermediate bodies 42 are flexure modules, which themselves are composed of rigid and flexible/compliant bodies. The flexure modules can be as simple as the flexure blade 20 of FIG. 3 or as complex as the DPFM 10 of FIG. 1. FIG. 7 presents an example of a serial kinematic XY flexure mechanism. In the figure, an intermediate stage or body 46 is connected to a ground stage or body 48 by way of a first DPFM 50. The first DPFM 50 only allows relative X translation, per this example. A motion stage or body 52 is connected to the intermediate stage 46 by way of a second DPFM 54. The second DPFM 54 only allows relative Y translation, per this example. In a deformed state of the serial kinematic XY flexure mechanism of FIG. 7, the intermediate stage 46 will only have an X translation with respect to the ground stage 48. The X translation of the intermediate stage 46 is inherited by the motion stage 52. Since the motion stage 52 has a Y translation with respect to the intermediate stage 46 via the second DPFM 54, the motion stage 52 exhibits both the X and Y translations with respect to the ground stage 48.

Figure 8:
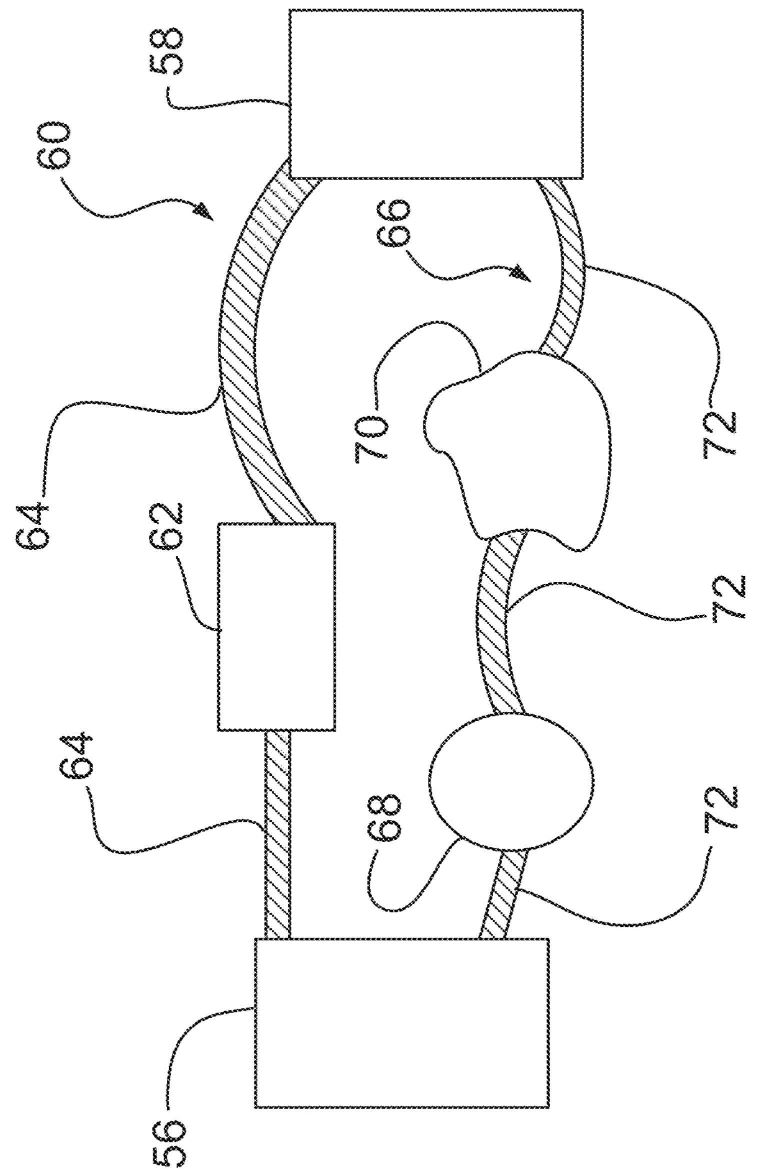
FIG. 8 is an abstract representation of a multi-degree-of-freedom (MDoF) parallel kinematic (PK) mechanism.

Referring now to FIG. 8, an abstract representation of a parallel design is shown. A first body 56 is connected to a second body 58 via multiple independent chains of intermediate bodies. A first chain of intermediate bodies 60 has a first intermediate body 62 and first connectors 64; and a second chain of intermediate bodies 66 has first and second intermediate bodies 68, 70 and second connectors 72. If one traces or scribbles a line from the first body 56 to the second body 58, there is more than one mechanical path or line, making this a parallel design. The mechanical paths are not necessarily parallel in a geometric sense (e.g., two straight lines being parallel such as the opposing sides of a rectangle). Rather, parallel as used here implied multiple independent, non-overlapping chains or paths between the first and second bodies 56, 58.

FIG. 9 presents an example of a parallel kinematic XY flexure mechanism. In the figure, the parallel kinematic XY flexure mechanism has four rigid bodies: a ground stage or body 74, a first intermediate stage or body 76, a second intermediate stage or body 78, and a motion stage or body 80. The first intermediate stage 76 is connected to the ground stage 74 by way of a first DPFM 82. The first DPFM 82 only allows relative X translation, per this example. The motion stage 80 is connected to the first intermediate stage 76 by way of a second DPFM 84. The second DPFM 84 only allows relative Y translation, per this example. Further, the motion stage 80 is connected to the second intermediate stage 78 by way of a third DPFM 86. The third DPFM 86 only allows relative X translation, per this example. Lastly, the second intermediate stage 78 is connected to the ground stage 74 by way of a fourth DPFM 88. The fourth DPFM 88 only allows relative Y translation, per this example. In the deformed state of the parallel kinematic XY flexure mechanism of FIG. 9, the first intermediate stage 76 will only have an X translation with respect to the ground stage 74, and the second intermediate stage 78 will only have a Y translation with respect to the ground stage 74. The motion stage 80 inherits the X translation of the first intermediate stage 76 and inherits the Y translation of the of the second intermediate stage 78, thus acquiring two translation DoFs.

Figure 10:
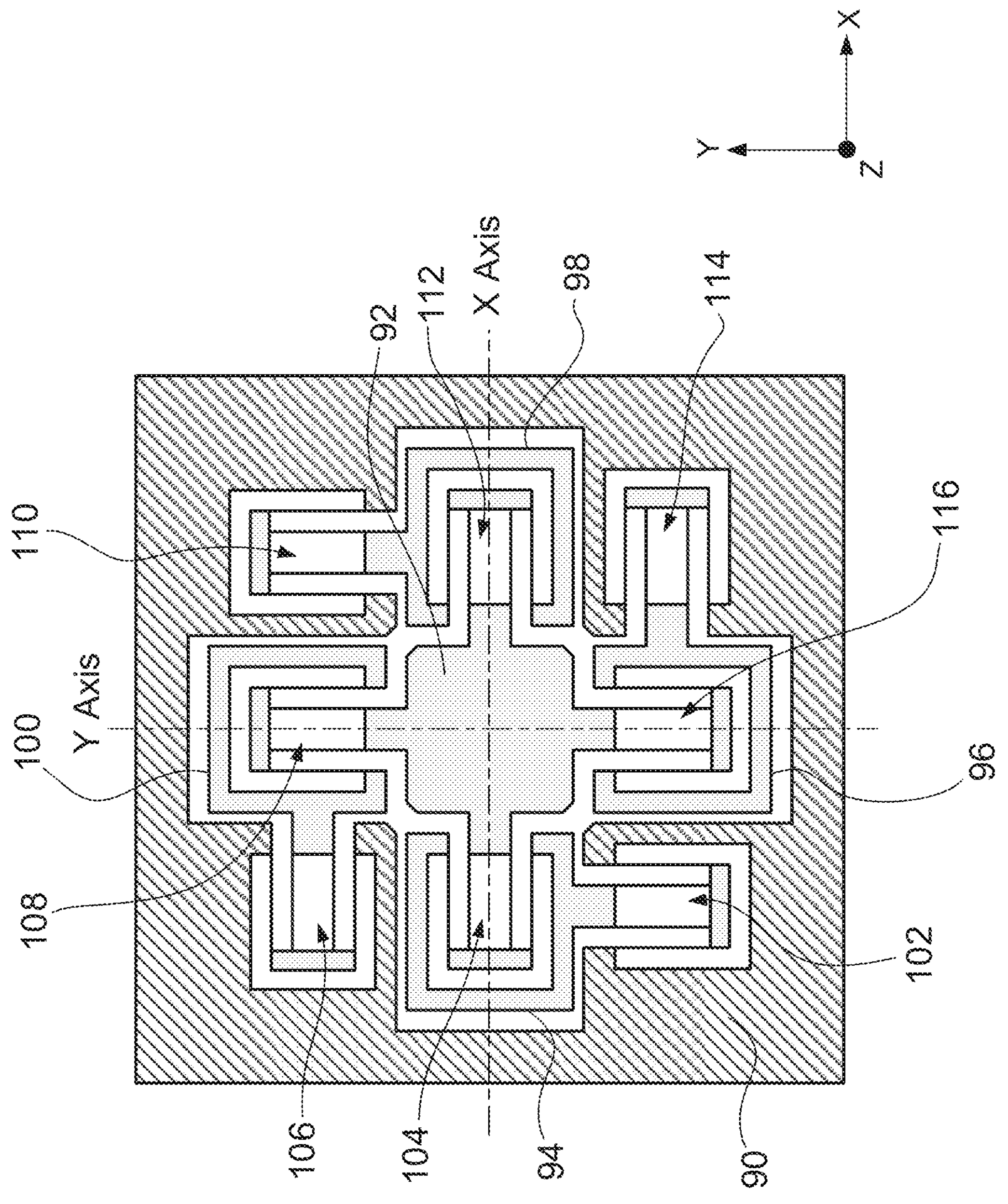
FIG. 10 is a schematic of an embodiment of a MDoF PK XY flexure mechanism having eight DPFMs.

Without causing over-constraint, the parallel design of FIG. 9 is further enhanced by making use of symmetry, which involves adding a third and fourth intermediate stage. The resulting parallel kinematic XY flexure mechanism is presented in FIG. 10 and is expected to exhibit superior performance. In the embodiment of FIG. 10, the parallel kinematic XY flexure mechanism includes a ground stage or body 90, a motion stage or body 92, a first intermediate stage or body 94, a second intermediate stage or body 96, a third intermediate stage or body 98, a fourth intermediate stage or body 100, a first DPFM 102, a second DPFM 104, a third DPFM 106, a fourth DPFM 108, a fifth DPFM 110, a sixth DPFM 112, a seventh DPFM 114, and an eighth DPFM 116. The use of symmetry and the addition of DPFMs leads to improved stiffness of the parallel kinematic XY flexure mechanism of FIG. 10 in its DoCs, and also makes the flexure mechanism design insensitive to thermal distortions and manufacturing errors. Interestingly, classical mobility analysis of mechanisms suggests that the parallel kinematic XY flexure mechanism of FIG. 10 should be immobile due to over-constraint. In rigid-link mechanisms, geometric imperfections arising from manufacture and assembly can cause otherwise redundant constraints to become independent, leading to over-constraint and thereby restricting the mobility of the mechanism. Adding redundant constraints in rigid-link mechanisms leads to reductions in the associated DoF(s) of the mechanisms. But in flexure mechanisms—and particularly distributed-compliance topologies—it has been found that elastic averaging plays an important role in ensuring that redundant constraints remain unaffected despite small geometric variations. Elastic averaging is a consequence of finite stiffness of the flexible bodies along the DoC(s) of flexure mechanisms. Thus, while the lack of ideal bearing behavior in flexure mechanisms results in performance compromises, on the one hand, it is also responsible for permitting certain special geometries in mechanism topology design, on the other hand. The concept of elastic averaging and symmetry can hence be exploited to add redundant constraints to a flexure mechanism in such a way that its DoF(s) remains conserved. As examples, the parallel kinematic XY flexure mechanisms of FIGS. 9 and 10 exhibit two DoFs and the DoFs are in the same directions, X direction and Y direction.

For a flexure mechanism consisting of multiple rigid bodies, there may be two or more rigid bodies that possess the exact same DoFs and DoCs. In the example parallel kinematic XY flexure mechanism of FIG. 10, for instance, the first intermediate stage 94 and the third intermediate stage 98 have the same DoF (i.e., the X direction), and have the same DoCs (i.e., Y, Z, $\Theta_x$, $\Theta_y$, $\Theta_z$ directions). Such rigid bodies can be referred to as familial stages. Under the umbrella term familial stages, there are three categories:

1) Twin Stages. If two or more familial stages—under the same quasi static loading along their DoF(s)—have kinematically identical motions, the stages are referred to as twin stages. Corresponding stages in a top layer and a bottom layer of a sandwich DPFM design, for instance, constitute twin stages. For example, top and bottom secondary stages are twin stages in a sandwich DPFM design.

Figure 11:
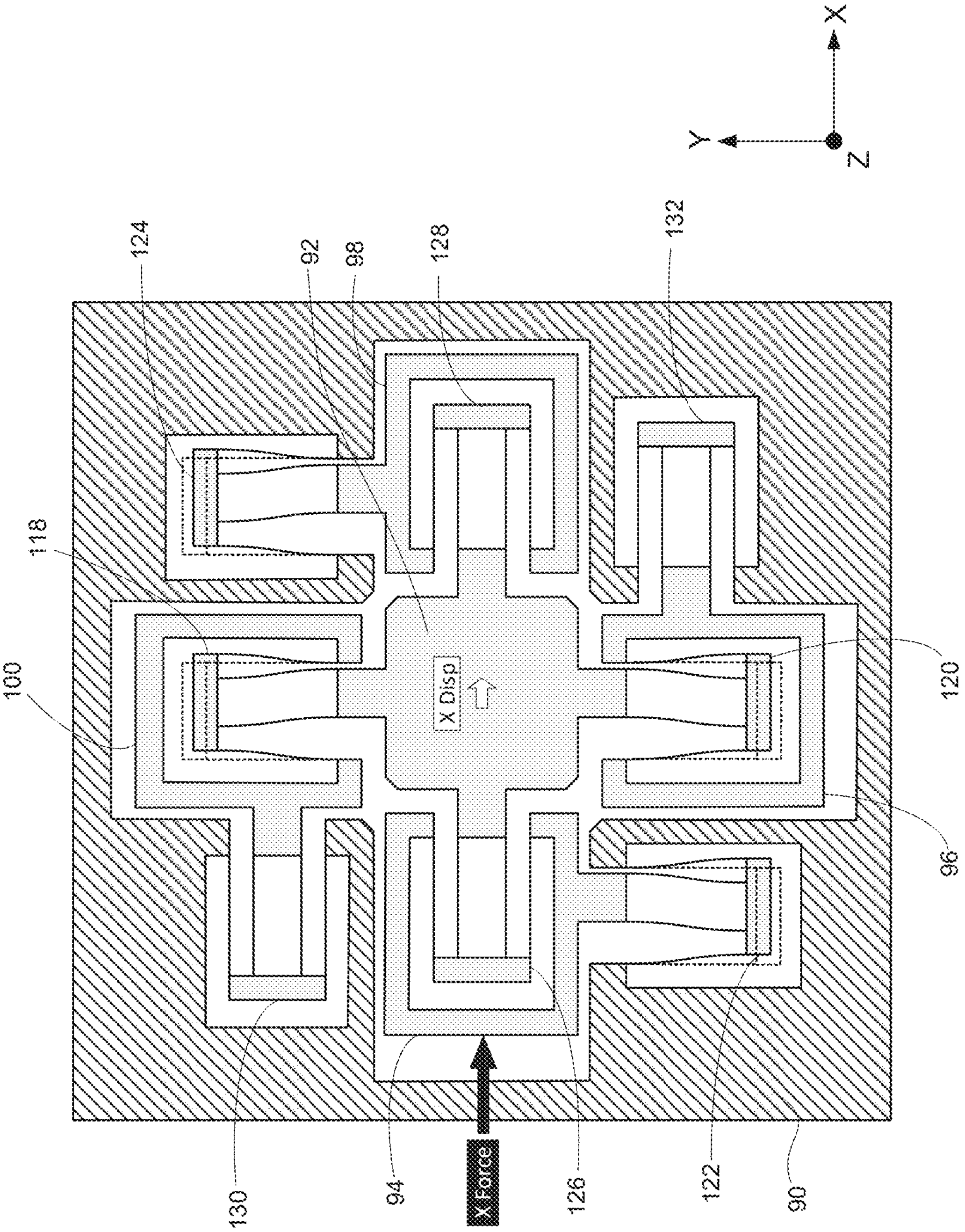
FIG. 11 shows an intermediate stage of the MDoF PK XY flexure mechanism of FIG. 10 being displaced in the X direction.

2) Sister Stages. If two or more familial stages under the same quasi static loading along their DoF(s)—have kinematically compatible motion, the stages are referred to as sister stages. The motion amongst stages is said to be kinematically compatible if they have substantially the same motion along their DoF(s) without a conflict amongst their kinematic motions along their DoC(s). Note that unlike sister stages, twin stages have kinematically identical motion. In the example parallel kinematic XY flexure mechanism of FIG. 10, for instance, the first intermediate stage 94 and the third intermediate stage 98 are sister stages. With reference now to FIG. 11, when a positive X direction quasi static force (X Force) is applied at the first intermediate stage 94, both the first and third intermediate stages 94, 98 translate in the positive X direction by substantially the same amount, as shown. Here, the first and third intermediate stages 94, 98 do not have kinematic motion along their DoCs (may still have small elastic motion), and hence there is no possibility of a conflict arising between their kinematic motions. In a similar way, when an X direction quasi static force is applied to the third intermediate stage 98, both the third and first intermediate stages 98, 94 translate in the X direction by substantially the same amount, and neither have kinematic motion along their DoCs. Further, the second and fourth intermediate stages 96, 100 are sister stages, and thus would have substantially the same Y direction translation if a Y direction quasi static force is applied to either of them. Moreover, and as set forth below, secondary stages of certain DPFMs can exhibit kinematically compatible motion and hence can be sister stages with respect to each other.

3) Cousin Stages. If two or more familial stages—under quasi static loading along their DoF(s)—have substantially the same motion along their DoF(s) with a kinematic conflict along their DoC(s), the stages are referred to as cousin stages. Still referring to FIG. 11, in this example parallel kinematic XY flexure mechanism, a fourth secondary stage or body 118 of the fourth DPFM 108 and an eighth secondary stage or body 120 of the eighth DPFM 116 are cousin stages. Upon application of the X Force, Y translations (y) of the fourth and eighth secondary stages 118, 120 are in opposite directions. The motions of the fourth and eighth secondary stages 118, 120 is composed of X translation (x) and Y translation (y), which are the DoF and DoC, respectively, of the fourth and eighth secondary stages 118, 120. This motion of a secondary stage of a DPFM is the result of beam arc length conservation, which is a kinematic constraint that arises from the elastic deformation of the flexure blades along their DoFs (here, the X direction). As the flexure blades undergo elastic deformation to allow the associated secondary stage to translate along the X direction, the beam arc length conservation (i.e., kinematic constraint) forces the end of the flexure blades—which is attached to the secondary stage—to also translate in the Y direction, leading to the Y translation (y) of the secondary stage in addition to the X translation (x). Again, taking the fourth and eighth secondary stages 118, 120 of FIG. 11 as examples, the fourth secondary stage 118 and the eighth secondary stage 120 have the same X translation (x) but their Y translations (y) are in opposite directions. This leads to a kinematic conflict along their DoCs. Hence, the fourth and eighth secondary stages 118, 120 are cousin stages.

Figure 12:
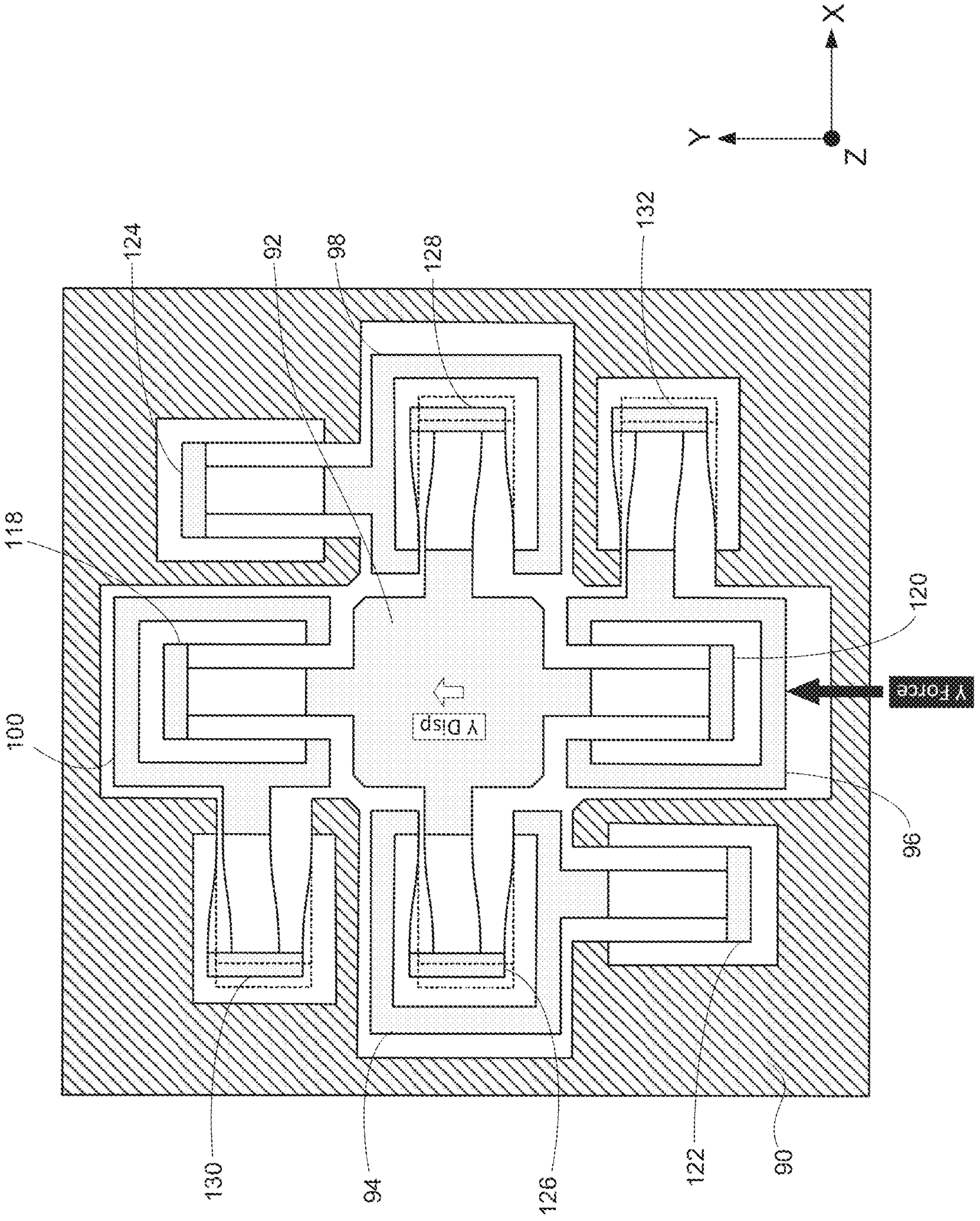
FIG. 12 shows another intermediate stage of the MDoF PK XY flexure mechanism of FIG. 10 being displaced in the Y direction.

In a similar way, other secondary stages of other DPFMs in the parallel kinematic XY flexure mechanism of FIG. 11 are cousin stages. A first secondary stage or body 122 of the first DPFM 102 and a fifth secondary stage or body 124 of the fifth DPFM 110 are cousin stages. This relationship is evident in FIG. 11, where the Y translations (y) of the first and fifth secondary stages 122, 124 are in opposite directions with respect to each other upon application of the X force, while their X translations (x) are the same. Furthermore, a second secondary stage or body 126 of the second DPFM 104 and a sixth secondary stage or body 128 of the sixth DPFM 112 are cousin stages. And a third secondary stage or body 130 of the third DPFM 106 and a seventh secondary stage or body 132 of the seventh DPFM 114 are cousin stages. These latter cousin stages are evidenced in FIG. 12. In FIG. 12, upon application of a Y direction quasi static force (Y Force) at the second intermediate stage 96, the X translations (x) of the second and sixth secondary stages 126, 128 are in opposite directions with respect to each other, while their Y translations (y) are the same. And the X translations (x) of the third and seventh secondary stages 130, 132 are in opposite directions with respect to each other, while their Y translations (y) are the same.

Limitations of Prior Art

In many applications, it has been an aim of flexure mechanism design to make flexure mechanisms approach ideal bearing behavior, while knowing it can never truly be achieved. In general, there are three conditions often simultaneously sought in order to approach ideal bearing behavior in flexure mechanism design: i) infinite motion along the DoF(s) and infinite compliance (i.e., zero stiffness) along the DoF(s) over the entire range of motion; ii) zero motion along the DoC(s) over the entire range of motion; and iii) infinite stiffness (i.e., zero compliance) along the DoC(s) over the entire range of motion.

i) Infinite Motion Along the DoF(s) and Infinite Compliance (i.e., Zero Stiffness) Along the DoF(s) Over the Entire Range of Motion As described, in general, flexure mechanisms are made up of flexible bodies and rigid bodies. The rigid bodies undergo displacement along their DoFs due to elastic deformation of the flexible bodies. When a flexible body undergoes elastic deformation, the flexible body builds stress within itself. The stress leads to the generation of internal loads within the flexible body that need to be overcome through the application of external loads in order to deform the flexible body. The larger the deformations, the more stress is built and larger external loads are needed to overcome it. Since the flexible bodies in a flexure mechanism require finite external loads for the rigid bodies to be displaced along their DoFs, the flexure mechanism cannot have infinite compliance (i.e., zero stiffness). Similarly, the flexible bodies have an upper limit on the amount of deformation they can undergo. This limit is determined by the yield stress of the material(s) used for manufacturing the flexible bodies. Therefore, the smaller the stiffness of the flexure mechanism along its DoFs, the larger will be its range of motion because it will take larger deformations in the flexible body to reach its yield stress point.

Figure 13:
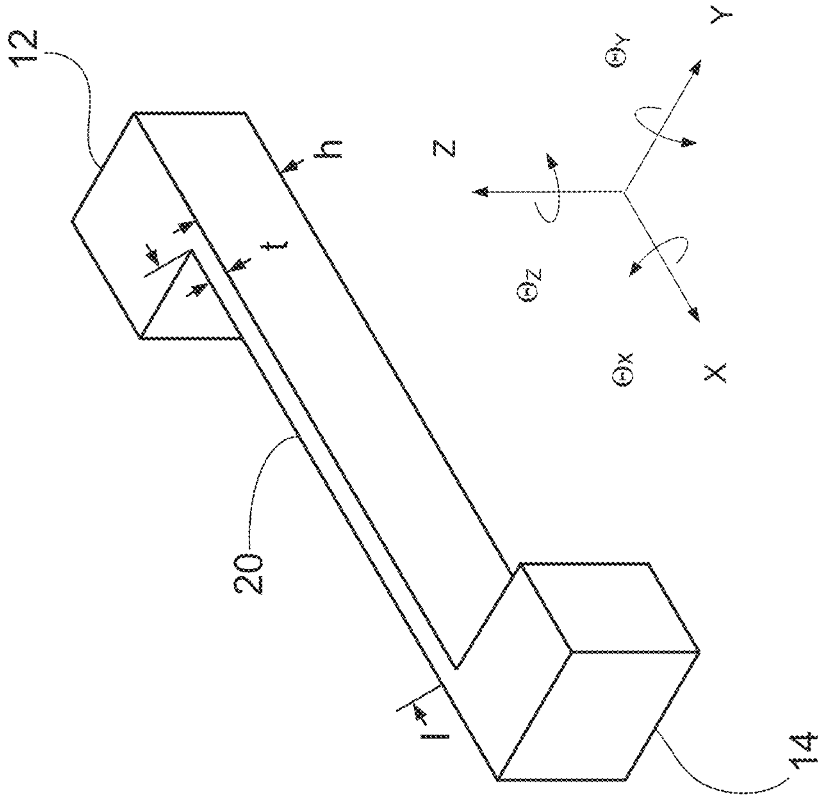
FIG. 13 is a perspective view of an embodiment of a flexure blade connecting a ground stage and a motion stage together.

No flexure mechanism can achieve zero stiffness and infinite motion along its DoFs. However, the DoF stiffness can be made smaller by selecting the appropriate dimensions for the flexible bodies of the flexure mechanism so that the elastic deformation of the flexible bodies that leads to the motion of the rigid bodies along the DoFs are as large as possible for unit loads applied along the DoFs. With reference now to FIG. 13, the flexure blade 20 connects the ground stage 14 and the motion stage 12. The flexure blade 20 can undergo six different types of elastic deformations—axial, in-plane bending, in-plane shear, out of plane bending, out of plane shear, and torsional deformations. The axial deformation of the flexure blade 20 occurs along the X direction and results in either stretching or compression of the flexure blade 20. This leads to the X translation (x) of the motion stage 12 relative to the ground stage 14. The in-plane bending and the in-plane shear deformation of the flexure blade 20 occur in the XY plane and lead to the Y translation (y) and $\Theta_z$ rotation ($\theta_z$) of the motion stage 12 relative to the ground stage 14. The out of plane bending and the out of plane shear deformation of the flexure blade 20 occur in the XZ plane and lead to the Z translation (z) and $\Theta_y$ rotation ($\theta_y$) of the motion stage 12 relative to the ground stage 14. The torsional deformation of the flexure blade 20 results in the twisting of the flexure blade 20 in the Θx direction. Therefore, it leads to the $\Theta_x$ rotation ($\theta_x$) of the motion stage 12 relative to the ground stage 14. The elastic deformations of the flexure blade 20 are associated with corresponding stiffness. The axial deformation of the flexure blade 20 is associated with the axial stiffness of flexure blade 20. Large axial stiffness of the flexure blade 20 implies small axial deformation of the flexure blade 20 when a force is applied to it along the X direction. This means small X translation (x) of the motion stage 12 relative to the ground stage 14. Similarly, the combination of in-plane shear and in-plane bending deformations of the flexure blade 20 is associated with the in-plane stiffness of the flexure blade 20. The combination of out of plane bending and out of plane shear deformations of the flexure blade 20 is associated with the out of plane stiffness of the flexure blade 20. The torsional deformation of the flexure blade 20 is associated with the torsional stiffness of the flexure blade 20. The distinction between in-plane and out of plane elastic deformations exist due to the rectangular cross-section of the flexure blade 20. In a conventional flexure blade—like the flexure blade 20 of FIG. 13—one of the dimensions of its cross-section is much larger than the other dimension, i.e., h>>t. The elastic deformations of the flexure blade 20 in the plane that contains the larger dimension (h) are referred to as out of plane deformations, and the larger dimension (h) is referred to as the out of plane thickness of the flexure blade 20. The elastic deformations of the flexure blade 20 in the plane that contains the smaller dimension (t) are referred to as in-plane deformations, and the smaller dimension (t) is referred to as in-plane thickness of the flexure blade 20.

The flexure blade 20 of FIG. 13 can also be a flexible body in a DPFM, such as the DPFM 10 of FIG. 1. The DPFM 10 has one DoF, i.e., Y direction between the motion stage 12 and the ground stage 14. Therefore, in order to reduce its DoF stiffness, one needs to reduce the in-plane stiffness of the flexure blades 20. This can be achieved by increasing the length of the flexure blade 20, given by l in FIG. 13. The in-plane stiffness of the flexure blade 20 is very sensitive to the length (l) of the flexure blade 20. Hence, for a small increment in the length of the flexure blade 20, a large reduction in the DoF stiffness can be achieved. But the out of plane stiffness of the flexure blade 20 is also equally sensitive to the length (l) of the flexure blade 20. Therefore, a small increment in the flexure blade 20 length (l) will also lead to large reduction in the out of plane stiffness of the flexure blade 20 and hence a large reduction in the DoC stiffness of the associated DPFM. Therefore, the reduction in DoF stiffness comes at the cost of reduction in DoC stiffness. Another way to reduce the in-plane stiffness of the flexure blade 20 is to reduce the out of plane thickness of the flexure blade 20, given by h in FIG. 13. But this again leads to a similar trade-off as discussed above, where the reduction in DoF stiffness is accompanied by reduction in DoC stiffness. In this case, the trade-off is worse because the out of plane stiffness of the flexure blade 20 is more sensitive to variations in the out of plane thickness (h) as compared to the in-plane stiffness of the flexure blade 20. Hence, reducing the out of plane thickness (h) of the flexure blade 20 leads to higher percentage reduction in the DoC stiffness as compared to the DoF stiffness. Yet another way to reduce the in-plane stiffness of the flexure blade 20 is to reduce in plane thickness of the flexure blade 20, given by t in FIG. 13. In this case, there is still a trade-off where reduction in DoF stiffness comes at the cost of reduction in DoC stiffness. But this trade-off is better than the last two trade-offs discussed above. The in-plane stiffness of the flexure blade 20 is more sensitive to variation in the in-plane thickness (t) of the flexure blade 20 as compared to the out of plane stiffness. Hence, reduction in the in-plane thickness (t) of the flexure blade 20 will lead to higher percentage reduction in the DoF stiffness as compared to the DoC stiffness. Therefore, reducing the flexure blade in-plane thickness (t) is the most effective way to reduce the DoF stiffness and increase the range of motion of the associated flexure mechanisms that employ flexure blades such as DPFMs. However, there are practical constraints such as reliable manufacturing of ultra-thin flexure blades and the risk of buckling under loading, which place a lower limit on the in-plane thickness of flexure blades.

ii) Zero Motion Along the DoC(s) Over the Entire Range of Motion

Figure 14:
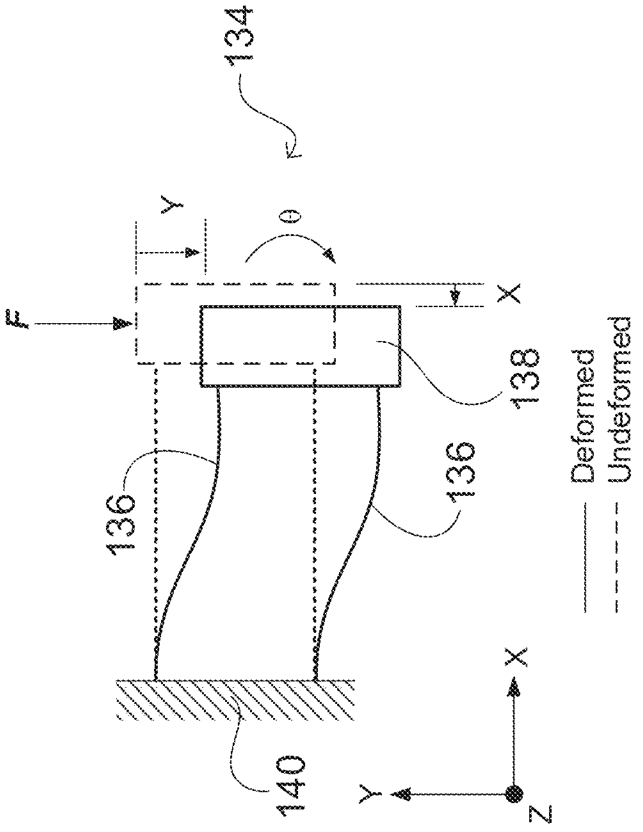
FIG. 14 is a schematic demonstration of parasitic error motion in an axial direction (X direction; DoC) of a motion stage of a parallelogram flexure mechanism (PFM) when the motion stage is displaced in a transverse direction (Y direction; DoF)
Figure 15:
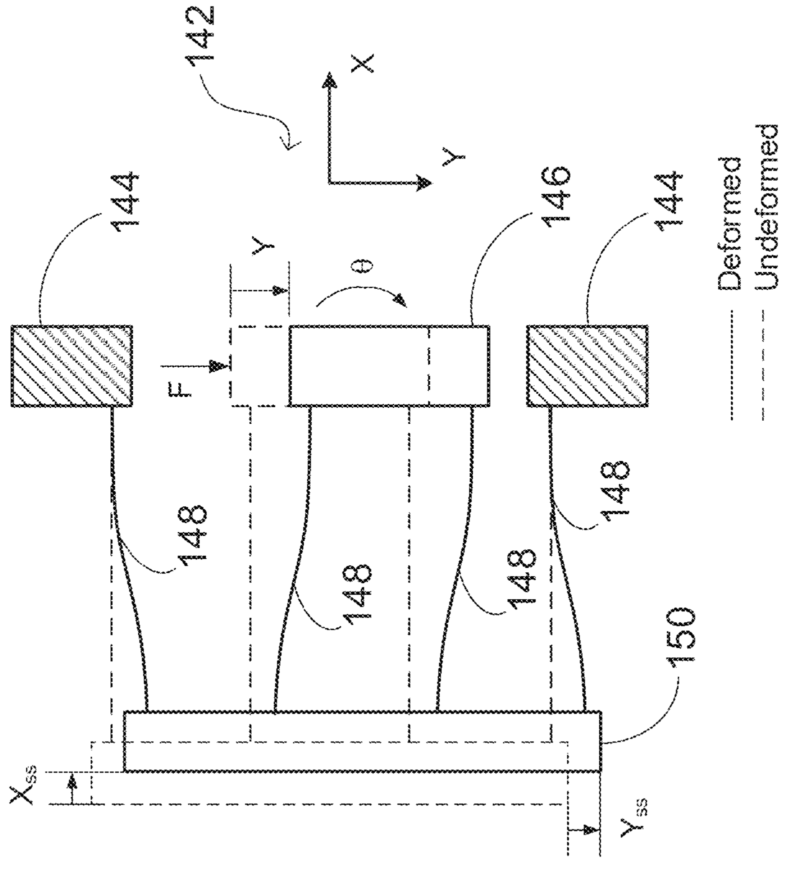
FIG. 15 is a schematic demonstration of the parasitic error motion of FIG. 14 of a motion stage of a DPFM being cancelled due to the geometric design of the DPFM.
Figure 16:
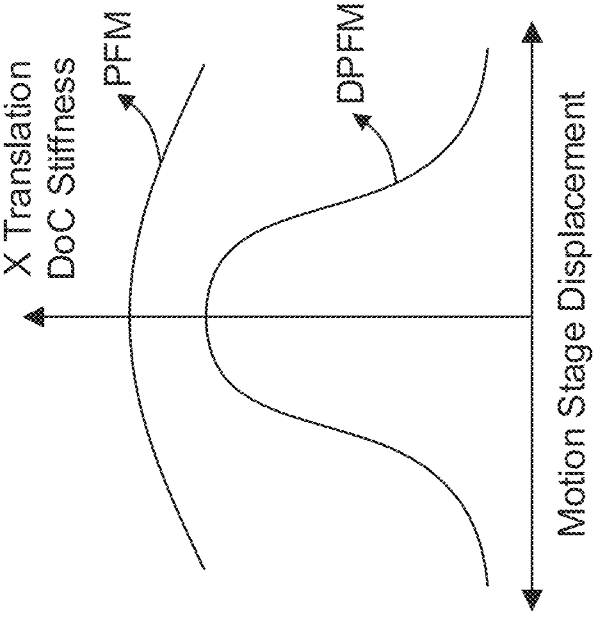
FIG. 16 is a graph demonstrating in a qualitative manner X direction stiffness with respect to Y direction displacement of motion stages of a PFM and of a DPFM, with motion stage displacement plotted on an x-axis and X translation DoC stiffness plotted on a y-axis.

There are certain flexure mechanism designs that have high DoC stiffness, yet exhibit finite error motion along the DoC due to the geometric placement of the flexible bodies and the kinematic constraint that is imposed by them. With reference now to FIG. 14, an embodiment of a parallelogram flexure mechanism (PFM) 134 is presented. The PFM 134 consists of two parallel flexure bodies or blades 136 connecting a motion body or stage 138 to a ground body or stage 140. The PFM 134 has one translational DoF in the Y direction between the motion stage 138 and the ground stage 140. However, when the motion stage 138 is displaced in the Y direction, it also translates in the X direction. This occurs because of the arc length conservation of the flexure blades 136. The arc length conservation of the flexure blade 136 is a kinematic constraint (because the flexure blade 136 is considered inextensible in the X direction) which dictates that the length of the flexure blade 136 should remain constant as it translates in the Y direction. In order to keep the flexure blade length constant, the end of the flexure blade 136 which is connected to the motion stage 138 translates in both X and Y directions, as shown in FIG. 14. The motion of the motion stage 138 in the X direction (DoC) is its kinematic motion along its DoC. To eliminate the finite error motion in the X direction when the motion stage 138 translates in the Y direction, a DPFM should be used instead of a PFM. An embodiment of a DPFM 142 is present in FIG. 15. The DPFM 142 is made up of two PFMs that are placed in geometrically reversed configuration. The DPFM 142, per this embodiment, has a ground body or stage 144, a motion body or stage 146, four flexure bodies or blades 148, and a secondary body or stage 150. Because the DPFM 142 is composed of two PFMs, the parasitic error motion of the two PFMs cancels each other such that the motion stage 146 has zero translation along the X direction. But this comes at the cost of reduced stiffness of the DPFM 142 along its DoC, i.e., X direction. FIG. 16 compares the stiffness of a PFM and of a DPFM along the X direction as a function of motion stage displacement along the Y direction. The graph of FIG. 16 illustrates that the stiffness of a DPFM is lower than that of a PFM at the nominal configuration (i.e., when motion stage Y displacement is zero) and continues to drop much faster as the motion stage Y displacement is increased. Therefore, here again, trade-offs between the competing requirements for ideal bearing behavior are illustrated.

iii) Infinite Stiffness (Zero Compliance) Along the DoC(s) Over the Entire Range of Motion Finite compliance of a flexure mechanism along its DoC is due to the compliance of the associated flexible bodies and the parasitic compliance of the associated rigid bodies that are used to construct the flexure mechanism. Furthermore, the drop in the DoC stiffness of the flexure mechanism as its motion stage is displaced along the DoF is either due to the kinematic design of the flexure mechanism or the compliance of the flexible bodies along the DoC. The graph of FIG. 16 illustrates the rapid decrease in the X direction (DoC) stiffness of a DPFM as the motion stage displacement is increased in the Y direction (DoF). This decrease in DoC stiffness is attributed to the kinematically under-constrained secondary stage of the DPFM. However, the stiffness can be drastically improved by controlling the motion of the secondary stage such that its Y translation (y) remains approximately one-half of the Y translation (y) of the motion stage over the entire range of Y translation (y) of the motion stage. Therefore, the secondary stage is kinematically constrained to the motion stage. Certain flexure mechanism designs, such as those described in U.S. Pat. No. 9,200,689, have been shown to achieve this.

Figure 17A:
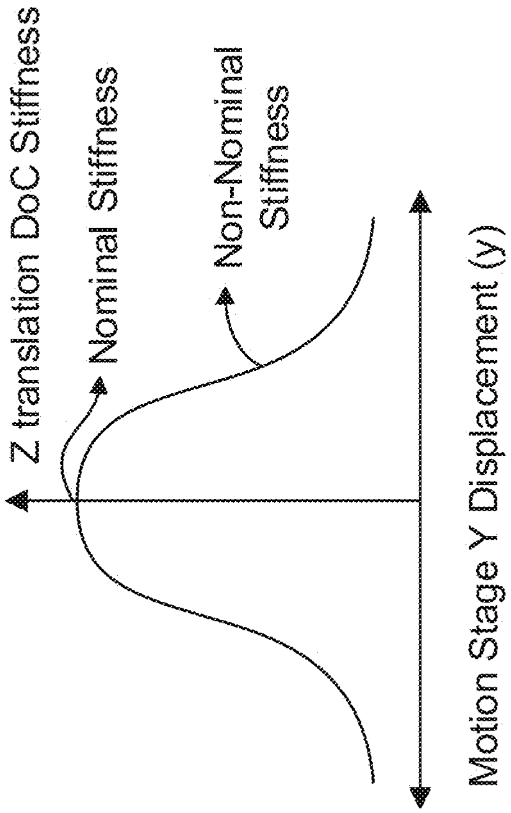
FIG. 17*a* is a graph demonstrating in a qualitative manner Z direction stiffness with respect to Y direction displacement of a motion stage of a DPFM, with motion stage Y displacement plotted on an x-axis and Z translation DoC stiffness plotted on a y-axis.
Figure 17B:
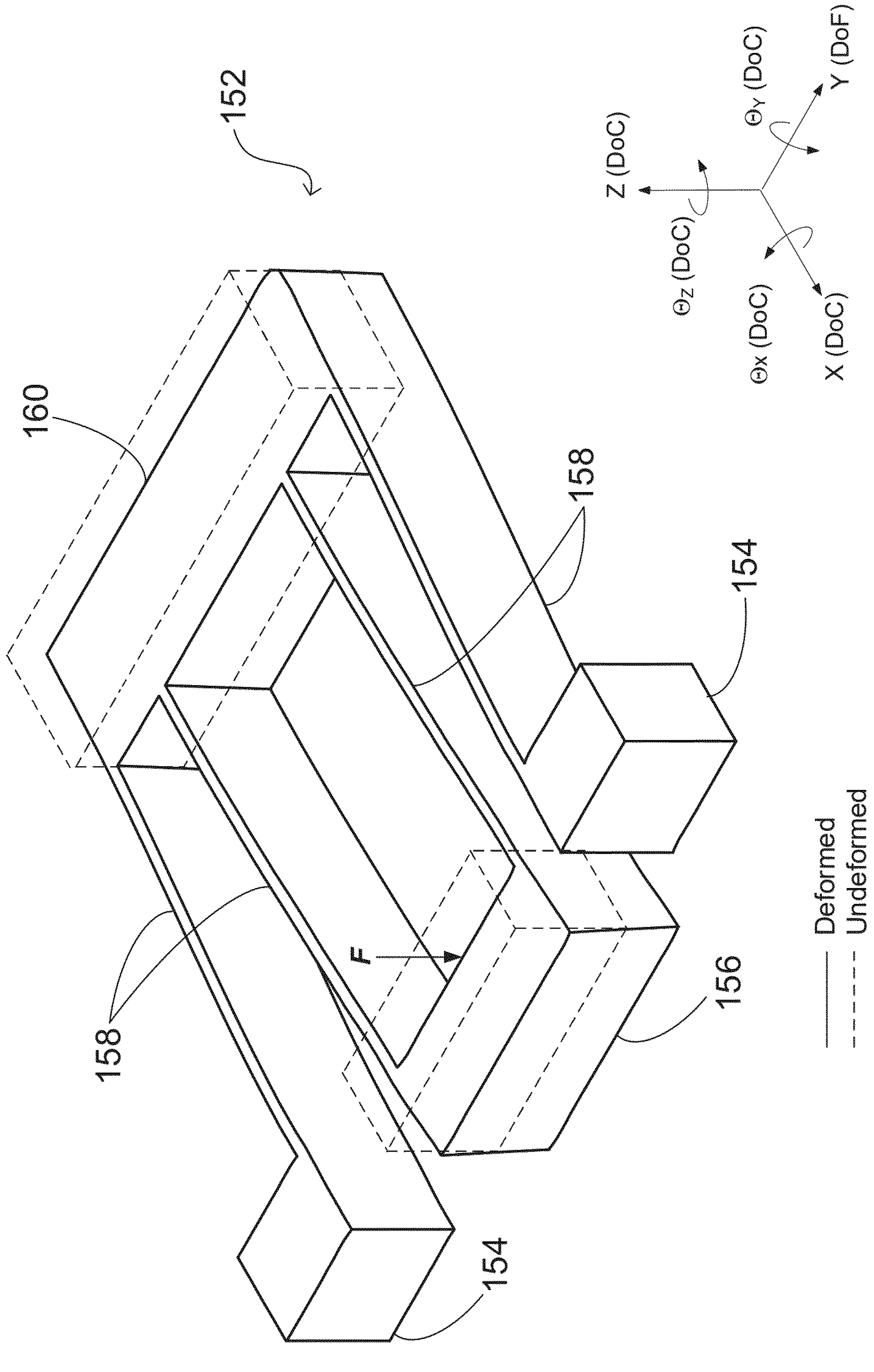
FIG. 17*b* is a schematic demonstration of deformation occurring at a secondary stage and at flexure blades of a DPFM at nominal position when a force is applied in the Z direction at a motion stage.

Cases in which the finite compliance of the flexible bodies along the DoC leads to loss of stiffness of the flexure mechanism are now described. In general, the DoC stiffness of a flexure mechanism can be classified as nominal DoC stiffness or non-nominal DoC stiffness. The DoC stiffness of the flexure mechanism, when its rigid body displacement along its DoF is zero, is called nominal DoC stiffness. The DoC stiffness of the flexure mechanism, when its rigid body has been displaced by finite amount along its DoF, is called non-nominal DoC stiffness. The graph of FIG. 17*a* shows the nominal and non-nominal Z direction (DoC) stiffness of a DPFM. The nominal DoC stiffness of the flexure mechanism occurs at y equal to zero, and the non-nominal DoC stiffness occurs at y not equal to zero. The nominal DoC stiffness can never be infinite due to the parasitic compliance of the rigid bodies and the finite compliance of the flexible bodies along the DoC. With reference now to FIG. 17*b*, an embodiment of a DPFM 152 has a ground body or stage 154, a motion body or stage 156, four flexure bodies or blades 158, and a secondary body or stage 160. FIG. 17*b* compares a deformed DPFM (represented in solid lines) with an undeformed DPFM (represented in broken lines) when Z direction force (F) is applied on the motion stage 156 which has not been displaced along its DoF in the Y direction. The Z direction is a DoC for the DPFM 152, which means it should exhibit infinite stiffness along that direction. But FIG. 17*b* illustrates a finite Z translation (z) and $\Theta_y$ rotation ($°_y$) of the motion stage 156 relative to the ground stage 154. These finite motions of the motion stage 156 along the DoCs are the result of the out of plane elastic deformations of the flexure blades 158, i.e., out of plane bending and out of shear deformation and the elastic deformations of the secondary stage 160 due to its parasitic compliances. These elastic deformations can be visualized in FIG. 17*b*.

Figure 17C:
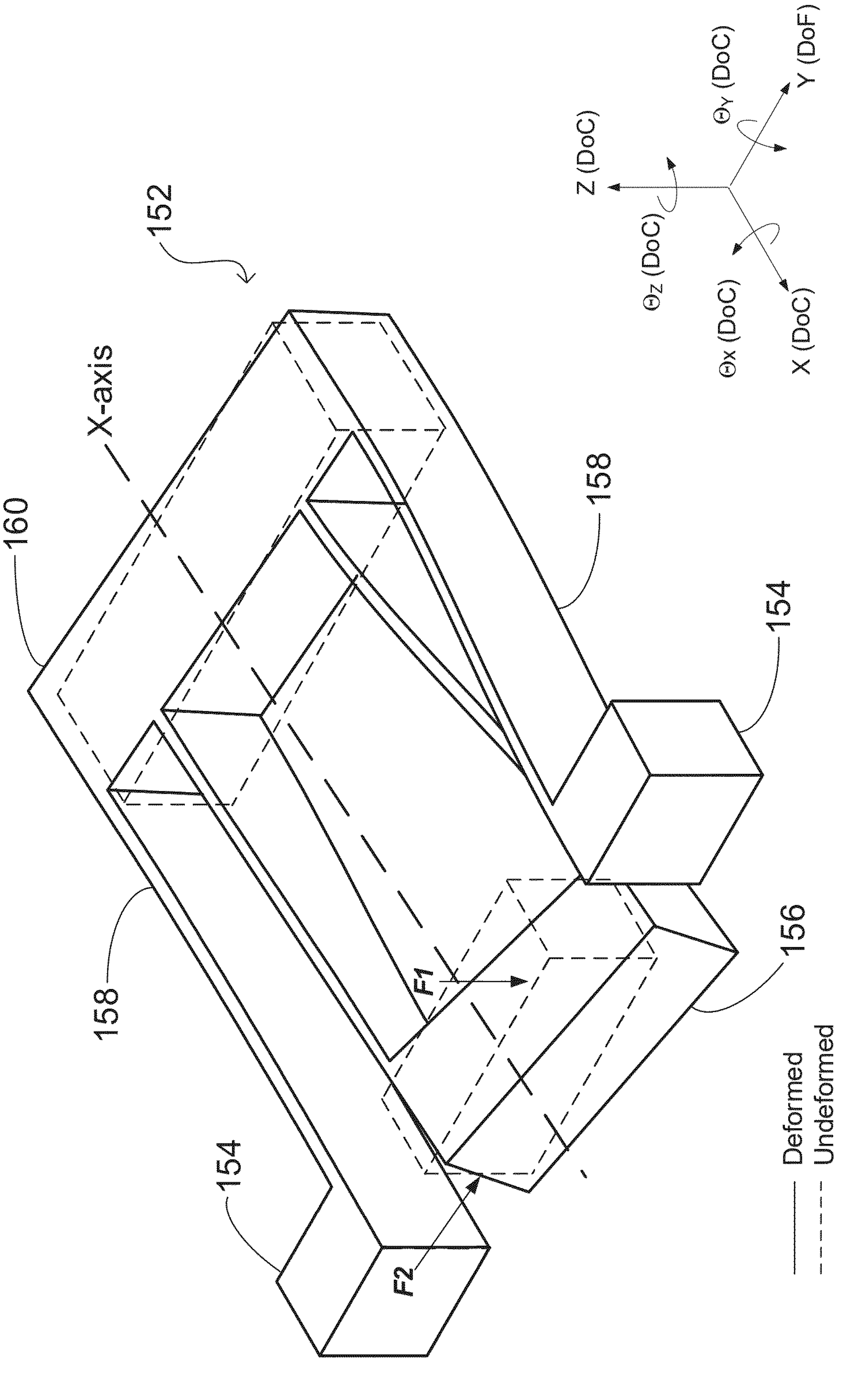
FIG. 17*c* is a schematic demonstration of torsional deformation occurring at the secondary stage and at the flexure blades of the DPFM of FIG. 17*b* at non-nominal position and upon displacement of the motion stage along its motion axis when a force is applied in the Y direction and when a force is applied in the Z direction at the motion stage.

Another observation from FIG. 17*a* is that the non-nominal DoC stiffness is smaller than the nominal stiffness and continues to drop as the motion stage is displaced along its DoF. FIG. 17*c* presents the DPFM 152 of FIG. 17*b*, and compares a deformed DPFM (represented in solid lines) with an undeformed DPFM (represented in broken lines) when Z direction force (F1) is applied on the motion stage 156 which has been displaced along its DoF in the Y direction (force F2). Since the flexure blades 158 have been deformed in the Y direction (DoF), the Z direction force on the motion stage 156 creates a torque that acts on the DPFM 152 which leads to the additional torsional deformation of the flexure blades 158 apart from the already existing out of plane elastic deformations. This causes additional displacement of the motion stage 156 in the Z direction. Therefore, the non-nominal stiffness of the DPFM 156 is lower than the nominal stiffness. As the motion stage Y translation (y) increases, the moment arm of the Z direction force F1 from the X axis increases, leading to more torque being applied on the DPFM 152 about the X axis. Higher torque leads to higher torsional deformation of the flexure blades 158 and hence the non-nominal stiffness keeps dropping as the motion stage displacement is increased along its DoF.

Figure 17D:
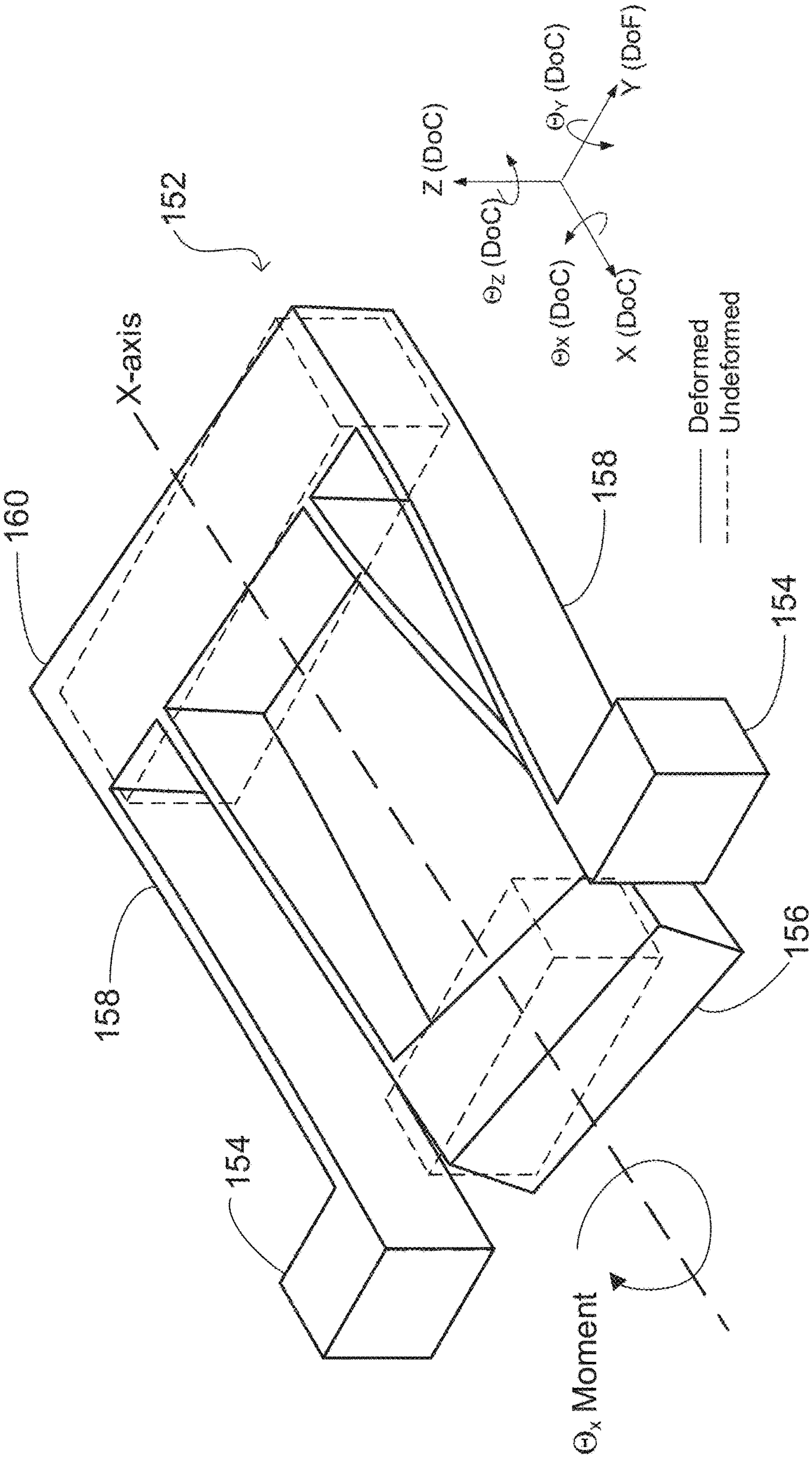
FIG. 17*d* is a schematic demonstration of torsional deformation occurring at the secondary stage and at the flexure blades of the DPFM of FIG. 17*b* when a $\Theta_x$ moment is applied along the X axis on the motion stage.

Furthermore, the $\Theta_y$ direction stiffness graph will behave the same way as the Z direction stiffness graph shown in FIG. 17*a*. When $\Theta_y$ direction moment is applied to the motion stage 156 in its nominal configuration, it will lead to finite Z translation (z) and $\Theta_y$ rotation ($\theta_y$) of the motion stage 156 relative to the ground stage 154. But unlike the case when only Z direction force is applied on the motion stage 156, this finite motion of the motion stage 156 along its DoCs will only be the result of out of plane bending deformation of the flexure blades 158 and the elastic deformations of the secondary stage 160 due to its parasitic compliances when only $\Theta_y$ direction moment is applied. When $\Theta_y$ direction moment is applied to the motion stage 156 in its non-nominal configuration, it leads to additional torsional deformation of the flexure blades 158 which leads to lower non-nominal $\Theta_y$ direction stiffness as compared to nominal $\Theta_y$ direction stiffness. Yet further, the $\Theta_x$ direction stiffness graph will behave the same way as the Z direction stiffness graph shown in FIG. 17*a*. When $\Theta_x$ direction moment is applied to the motion stage 156 in its nominal configuration, it will lead to finite $\Theta_x$ rotation ($\theta_x$) of the motion stage 156 relative to the ground stage 154, as shown in FIG. 17*d*. The finite $\Theta_x$ rotation ($\theta_x$) of the motion stage 156 along its DoC is the result of the out of plane elastic deformations of the flexure blades 158, i.e., out of plane bending and out of shear deformations and the elastic deformations of the secondary stage 160 due to its parasitic compliances. The flexure blades 158 connected to the motion stage 156 undergo the out of plane elastic deformation in opposite directions, as shown in FIG. 17*d*, which leads to the $\Theta_x$ rotation ($\theta_x$) of the motion stage 156 relative to the ground stage 154. When $\Theta_x$ direction moment is applied to the motion stage 156 in its non-nominal configuration, it leads to additional torsional deformation of the flexure blades 158 which leads to further $\Theta_x$ rotation ($\theta_x$) of the motion stage 156 and lower non-nominal $\Theta_x$ direction stiffness as compared to nominal $\Theta_x$ direction stiffness.

In FIGS. 17*b*, 17*c*, and 17*d*, the elastic deformations of the flexure blades 158 are much more pronounced than the elastic deformation of the secondary stage 160 due to its parasitic compliances. This occurs because the parasitic compliances of the secondary stage 160 are, generally, very small compared to the compliances of the flexure blades 158 along the DoCs. Accordingly, focus is on mitigation strategies to reduce the compliances of the flexure blades 158 in order to increase the DoC stiffness of the flexure mechanism.

One way to increase the nominal and non-nominal stiffness of a DPFM along the associated Z direction is to increase flexure blade stiffness in the Z direction and its torsional stiffness. This could be achieved by choosing appropriate dimensions of the flexure blades (e.g., flexure blades 158). In order to increase the Z direction and torsional stiffness, the out of plane thickness (e.g., h in FIG. 13) of the flexure blades can be increased. However, as described above, increasing the out of plane thickness of the flexure blades has been found to increase the DoF stiffness of the DPFM. Similarly, any change in the flexure blade dimension to increase its Z direction and torsional stiffness leads to increase in the DoF stiffness of the flexure mechanism.

Figure 18A:
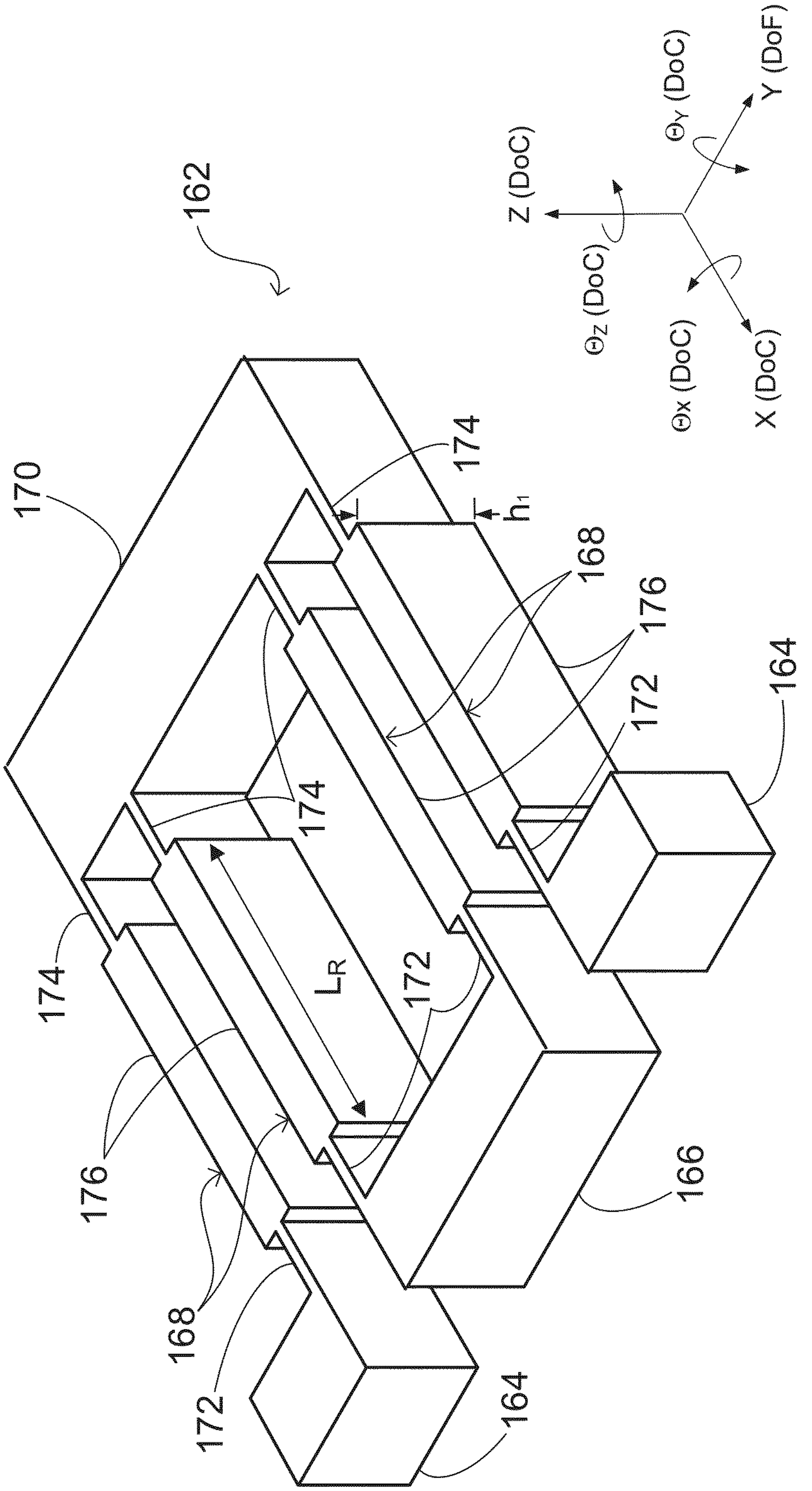
FIG. 18*a* is a perspective view of an embodiment of a DPFM having reinforcement stages at flexure blades.
Figure 18B:
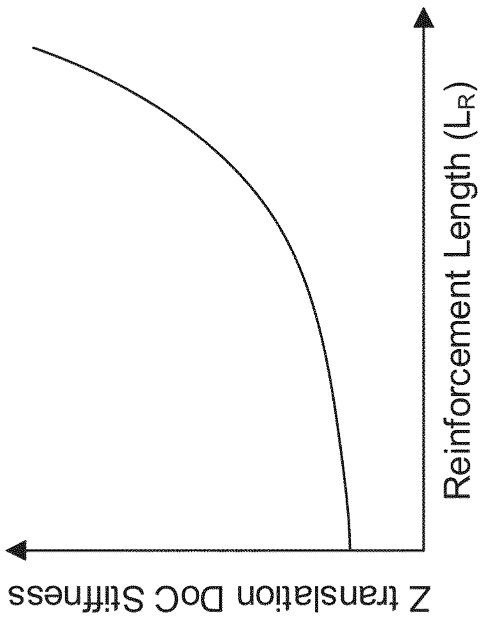
FIG. 18*b* is a graph demonstrating in a qualitative manner Z direction stiffness of reinforcement stages of flexure blades based on length ($L_R$) of the reinforcement stages, with reinforcement length ($L_R$) plotted on an x-axis and Z translation DoC stiffness plotted on a y-axis.
Figure 18C:
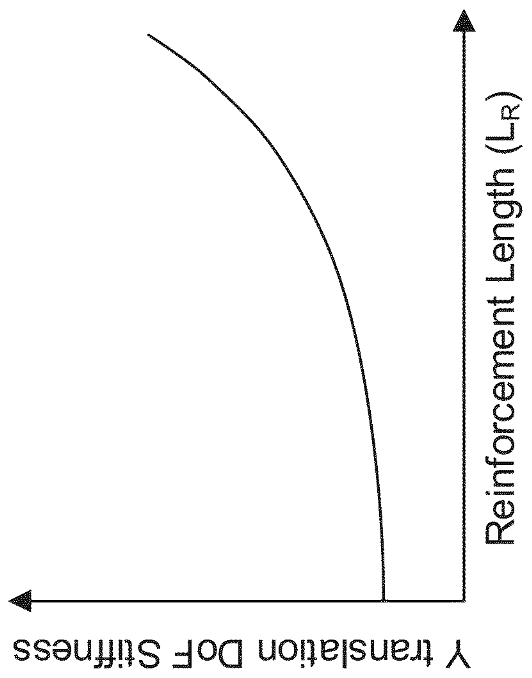
FIG. 18*c* is a graph demonstrating in a qualitative manner Y direction stiffness of reinforcement stages of flexure blades based on length ($L_R$) of the reinforcement stages, with reinforcement length ($L_R$) plotted on an x-axis and Y translation DoF stiffness plotted on a y-axis.

Another way to reduce the nominal and non-nominal compliance of a DPFM is to replace simple flexure blades with reinforced flexure blades, such as the flexure module 24 with the reinforcement body 30 shown and described with reference to FIG. 4. FIG. 18*a* illustrates an embodiment of a DPFM 162 design with reinforced flexure blades. The DPFM 162, according to this embodiment, has a ground body or stage 164, a motion body or stage 166, four reinforced flexure bodies or blades 168, and a secondary body or stage 170. The reinforced flexure blades 168 each include a first flexure blade 172, a second flexure blade 174, and a reinforcement body or stage 176 therebetween. The use of the reinforcement stages 176 in the flexure blades 168 reduces the torsional and the Z direction compliance of the flexure blades 168. Hence it leads to substantial improvement in the nominal and non-nominal stiffness of the DPFM 162. However, this comes at the cost of the reduced DoF compliance (i.e., increased DoF stiffness). In the graph of FIG. 18*b*, as a reinforcement length ($L_R$ in FIG. 18*a*) of the reinforcement stages 176 is increased, the nominal DoC stiffness of the DPFM 162 increases as well. The graph of FIG. 18*c*, on the other hand, shows that as the reinforcement length ($L_R$) is increased, the DoF stiffness of the DPFM 162 increases. Hence, the use of the reinforced flexure blades 168 is also not able to overcome the trade-off between the DoF and DoC stiffness of a DPFM. The trade-off between the DoF and DoC stiffness is a limitation of the known prior art on the design of flexure mechanisms.

Figure 19A:
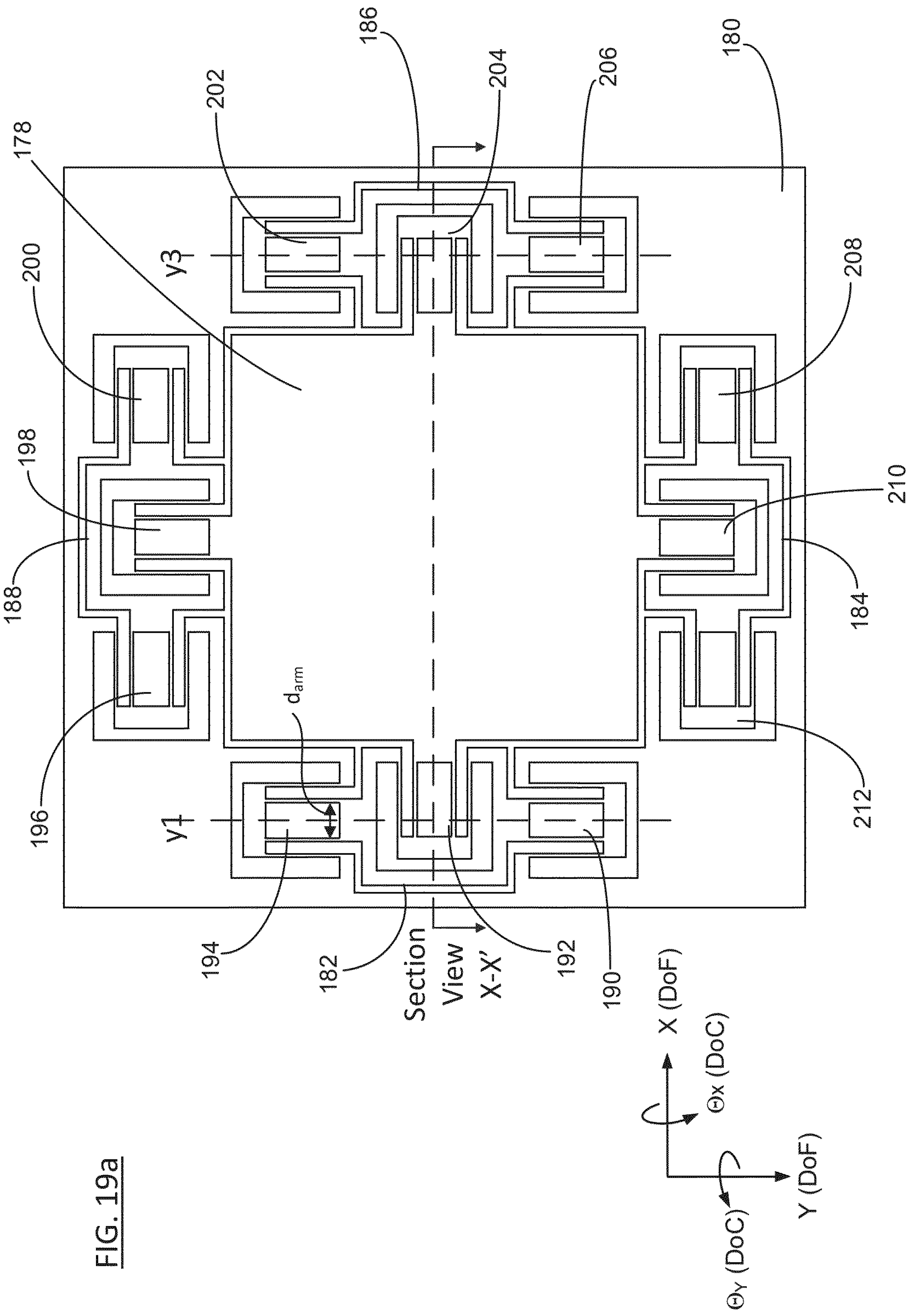
FIG. 19*a* is a top view of an embodiment of a PK XY flexure mechanism assembly having twelve DPFMs, the PK XY flexure mechanism assembly being in its nominal position.

When DPFMs are employed as flexure modules to build parallel kinematic XY flexure mechanisms, the deficiencies of a DPFM that prohibit it from achieving ideal bearing behavior are inherited by the parallel kinematic XY flexure mechanisms. FIG. 19*a* presents an embodiment of a parallel kinematic XY flexure mechanism that is constructed using twelve DPFMs as flexure modules and has two DoFs between a motion stage or body 178 and a ground stage or body 180, i.e., X direction and Y direction; still, in other embodiments the parallel kinematic XY flexure mechanism could have other quantities of DPFMs, including more or less DPFMs such as six, eight, ten, or another number of DPFMs where sister stages are exhibited. This embodiment includes a first intermediate stage or body 182, a second intermediate stage or body 184, a third intermediate stage or body 186, a fourth intermediate stage or body 188, a first DPFM 190, a second DPFM 192, a third DPFM 194, a fourth DPFM 196, a fifth DPFM 198, a sixth DPFM 200, a seventh DPFM 202, an eighth DPFM 204, a ninth DPFM 206, a tenth DPFM 208, an eleventh DPFM 210, and a twelfth DPFM 212. The DPFMs that connect the intermediate stages to the ground stage 180 are referred to as peripheral DPFMs, while the DPFMs that connect the intermediate stages to the motion stage 178 are referred to as inner DPFMs. In the embodiment of FIG. 19*a* the first, third, fourth, sixth, seventh, ninth, tenth, and twelfth DPFMS 190, 194, 196, 200, 202, 206, 208, 212 constitute peripheral DPFMs; and the second, fifth, eighth, and eleventh DPFMs 192, 198, 204, 210 constitute inner DPFMs. In an embodiment, individual DPFMs of the parallel kinematic XY flexure mechanism can resemble the DPFMs 152, 162 as described in connection with previous figures, or can have another design and construction and can have other components. The individual DPFMs can have the ground stage, motion stage, flexure blades, reinforced flexure blades, and/or secondary stages, as set forth.

Figure 19B:
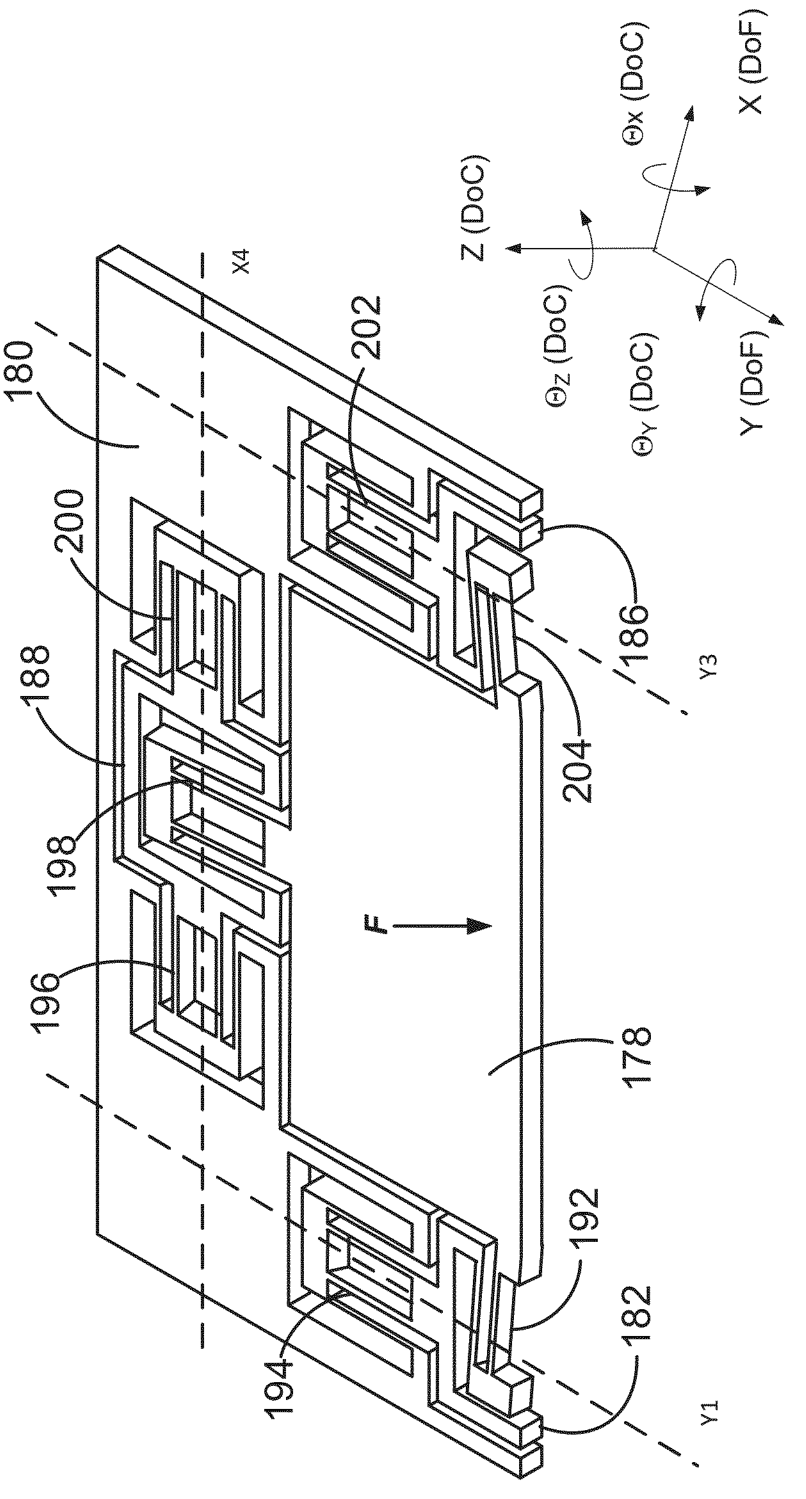
FIG. 19*b* is a sectional view of the PK XY flexure mechanism assembly of FIG. 19*a* demonstrating deformation at inner and peripheral DPFMs due to a force applied in the Z direction at a motion stage, the motion stage and intermediate stages caused to move in the Z direction.

In FIG. 19*a*, the parallel kinematic XY flexure mechanism is in its nominal configuration, i.e., the motion stage 178 has no displacement along its DoFs. In this configuration, if a Z direction force is applied at the center of the motion stage 178, then the motion stage 178 undergoes finite Z translation (z) along its DoC due to finite Z direction compliance of the flexure mechanism. In order to understand the source of the finite Z direction compliance of the flexure mechanism, FIG. 19*b* shows a sectional view (taken along the plane X-X' denoted in FIG. 19*a*) of the nominal configuration of the flexure mechanism when Z direction force (F) is applied at the center of the motion stage 178. FIG. 19*b* illustrates that the Z direction force at the motion stage 178 causes the flexure blades of the inner second, fifth, and eighth DPFMs 192, 198, 204 to undergo out of plane bending and shear deformations which leads to Z translation (z) of the motion stage 178 relative to the first, fourth, and third intermediate stages 182, 188, 186. This out of plane deformation of the inner second, fifth, and eighth DPFMs 192, 198, 204 in their nominal configurations is similar to the deformation of the DPFM 152 shown in FIG. 17*b*.

The motion of the first, third, and fourth intermediate stages 182, 186, 188 relative to the ground stage 180, per this embodiments, generally has two components. A first component is the Z translation (z) of the first, third, and fourth intermediate stages 182, 186, 188, which is caused by the out of plane shear and bending deformations of the accompanying flexure blades of the peripheral third, fourth, sixth, and seventh DPFMs 194, 196, 200, 202. This out of plane of deformations of these peripheral DPFMs 194, 196, 200, 202 is similar to the deformation of the DPFM 152 illustrated in FIG. 17*b*. The peripheral third, fourth, sixth, and seventh DPFMs 194, 196, 200, 202 connecting the first, third, and fourth intermediate stages 182, 186, 188 to the ground stage 180 undergo rotation about the Y1, Y3, and X4 axes (FIG. 19*b*) respectively leading to $\Theta_y$ rotation ($\theta_y$) of the first and third intermediate stages 182, 186 and leading to $\Theta_x$ rotation ($\theta_x$) of the fourth intermediate stage 188 relative to the ground stage 180. This out of plane deformation of the peripheral DPFMs 194, 196, 200, 202, which is also caused by the out of plane bending and shear deformation of the accompanying flexure blades, is similar to the deformation of the DPFM 152 illustrated in FIG. 17*d*. These rotations constitute a second component of the motion of the first, third, and fourth intermediate stages 182, 186, 188 relative to the ground stage 180. The sectional view of the parallel kinematic XY flexure mechanism in the embodiment of FIG. 19*b* only shows the deformation of inner second, fifth, and eighth DPFMs 192, 198, 204 and peripheral third, fourth, sixth, and seventh DPFMs 194, 196, 200, 202. But the remaining inner eleventh DPFM 210 and peripheral first, ninth, tenth, and twelfth DPFMs 190, 206, 208, 212 (not shown in FIG. 19*b*) would also experience and undergo similar out of plane deformations as the inner DPFMs 192, 198, 204 and peripheral DPFMs 194, 196, 200, 202 shown in FIG. 19*b*. Furthermore, in FIG. 19*b*, the first and third intermediate stages 182, 186 experience and undergo $\Theta_y$ rotation ($\theta_y$) about their respective axes, i.e., Y1 and Y3 axes in opposite directions. Therefore, it has been found that a design intervention that restricts the relative rotation between the first and third intermediate stages 182, 186 will lead to higher Z direction stiffness for the parallel kinematic XY flexure mechanism. Such a design intervention is described below.

Figure 19C:
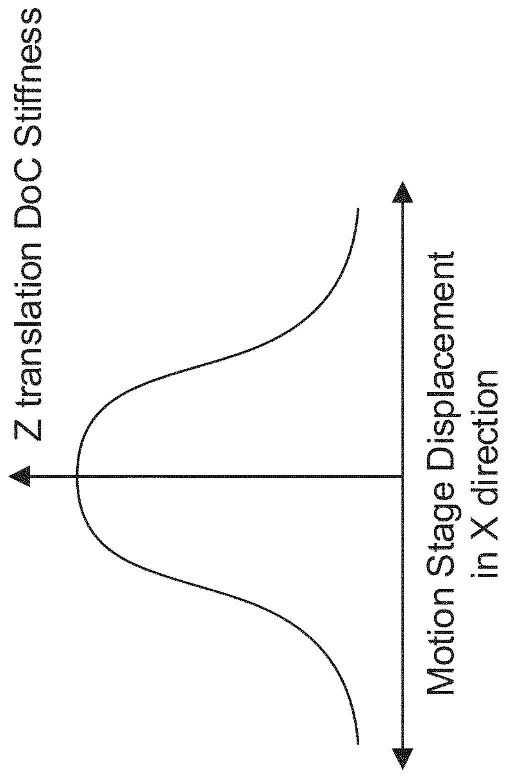
FIG. 19*c* is a graph demonstrating in a qualitative manner Z direction stiffness of the PK XY flexure mechanism assembly of FIG. 19*a* with respect to X direction translation of a motion stage thereof, with motion stage displacement in X direction plotted on an x-axis and Z translation DoC stiffness plotted on a y-axis.

If the parallel kinematic XY flexure mechanism of FIG. 19*a* is displaced along one of its DoFs—for example, the motion stage 178 is displaced in the X direction—then the inner fifth and eleventh DPFMs 198, 210 and peripheral first, third, seventh, and ninth DPFMs 190, 194, 202, 206 are in their non-nominal configuration. When Z direction force (denoted F in FIG. 19*b*) is applied at the motion stage 178, the accompanying flexure blades of the inner fifth and eleventh DPFMs 198, 210 and peripheral first, third, seventh, and ninth DPFMs 190, 194, 202, 206 in their non-nominal configuration experience and undergo additional torsional deformation. This deformation of the inner and peripheral DPFMs 198, 210, 190, 194, 202, 206 in their non-nominal configuration is similar to the deformation of the DPFM 152 in FIG. 17*c*. The reduction in the non-nominal stiffness of the inner and peripheral DPFMs 198, 210, 190, 194, 202, 206 due to the additional torsional deformation of their accompanying flexure blades leads to the reduction of the non-nominal Z direction stiffness of the parallel kinematic XY flexure mechanism. The nominal and non-nominal Z direction stiffness of the parallel kinematic XY flexure mechanism as a function of the motion stage displacement in the X direction is shown in the graph of FIG. 19*c*. The graph demonstrates finite DoC stiffness and decreasing non-nominal stiffness as the motion stage displacement is increased. When the motion stage 178 is displaced in the Y direction it leads to similar Z direction stiffness graph as shown in FIG. 19*c*.

Structural Reinforcements for Improved Static and Dynamic Performance

The known prior art has hence been shown to have limitations in designing flexure mechanisms when it comes to approaching ideal bearing behavior. It has been found that there can always be a significant trade-off between the DoF and DoC stiffness that can be achieved through any of the known prior art flexure mechanism designs.

Therefore, certain embodiments of flexure mechanism designs are set forth in this description that have been shown to mitigate or altogether resolve these trade-offs, and thereby approach the ideal bearing behavior more closely than has previously been shown. One or more inter-stage connections can be implemented in flexure mechanism designs, per the embodiments herein, in order to mitigate or altogether resolve the trade-offs and provide improved static and dynamic performance of the flexure mechanism. Inter-stage connections as the term and grammatical variations thereof are used herein are connections that restrict one or more relative motions in one or more directions between two rigid bodies or stages that are otherwise not directly connected to each other within a flexure mechanism. An inter-stage connection referred to as a rigid inter-stage connection herein restricts and constrains relative motion along all six directions of motion between two rigid bodies. Other types of inter-stage connections restrict and constrain relative motion between two rigid bodies in one, two, three, four, or five directions of motion. Such inter-stage connections are referred to as 1 DoC, 2 DoC, 3 DoC, 4 DoC, and 5 DoC inter-stage connections. In the embodiments of 1 to 5 DoC inter-stage connections, the connections are rigid in directions along which relative motion is restricted between two rigid bodies, and flexible in directions along which relative motion is allowed between two rigid bodies.

In the flexure mechanism embodiments described herein with redundant constraints and symmetrical layouts, there are familial stages or rigid bodies, as set forth above: twin stages, sister stages, and cousin stages. In any flexure mechanism design with twin stages, sister stages, and/or cousin stages, it has been determined that rigid inter-stage connection(s) can only be made between two or more twin stages or two or more sister stages, while a 1 DoC, 2 DoC, 3 DoC, 4 DoC, and/or 5 DoC inter-stage connection(s) can be made either between two or more twin stages, two or more sister stages, and/or two or more cousin stages.

Figure 20A:
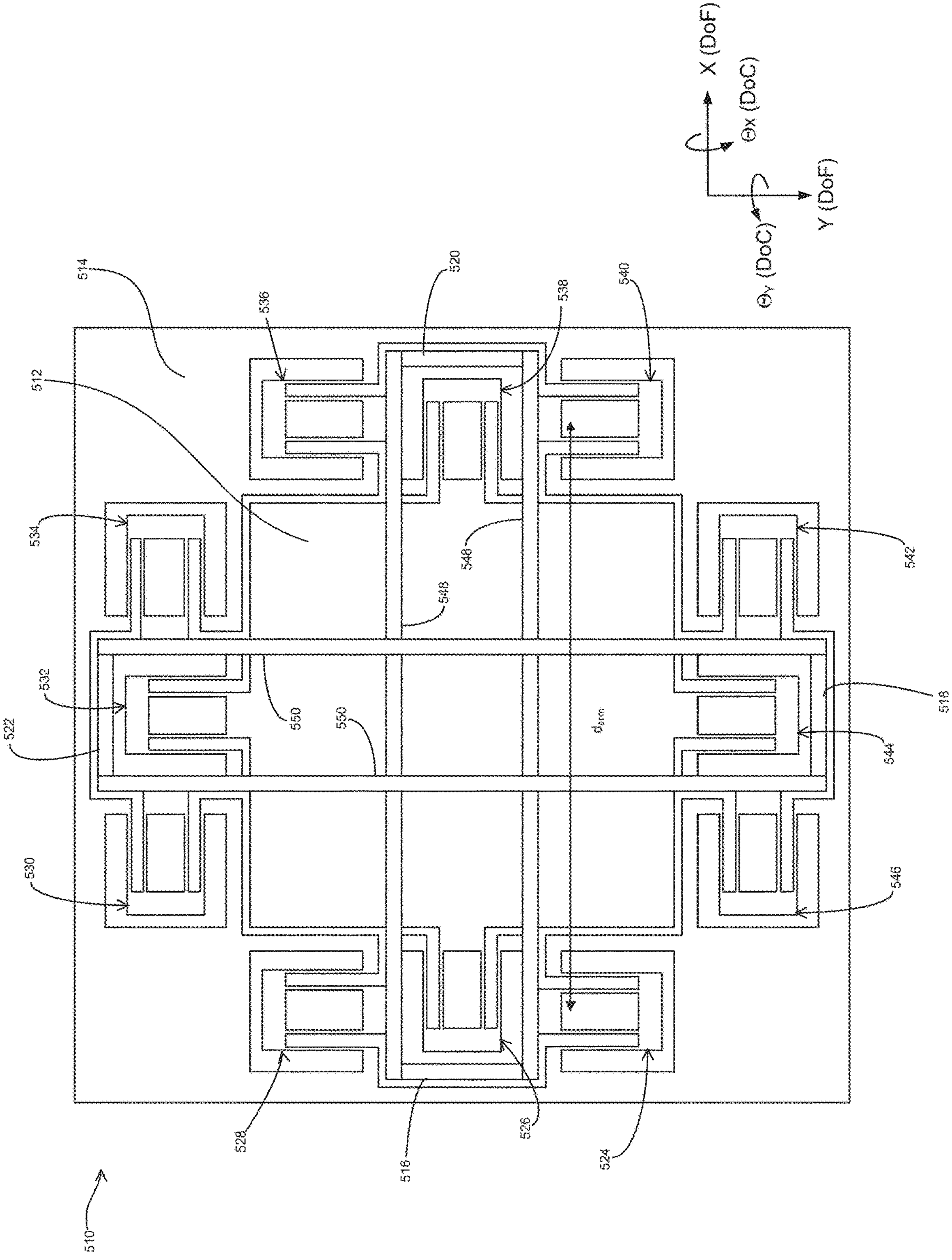
FIG. 20*a* is a top view of a parallel kinematic XY flexure mechanism with an embodiment of in-plane rigid inter-stage connections.

With reference now to FIG. 20*a*, an embodiment of a parallel kinematic (PK) XY flexure mechanism 510 is illustrated. The PK XY flexure mechanism 510 employs in-plane rigid inter-stage connections to achieve significantly higher DoC out of plane stiffness in the Z direction of its motion stage with respect to its ground stage upon a given X translation DoF and Y translation DoF stiffness compared to known prior art flexure mechanism designs. The term in-plane, as used herein with the phrase inter-stage connection(s), is not intended to mean that the inter-stage connection(s) is itself strictly configured in or along a particular plane; rather, the term in-plane is in reference to the stages subject to connection being arranged in the same plane or layer with respect to each other. In this embodiment, the PK XY flexure mechanism 510 exhibits resemblance to the parallel kinematic XY flexure mechanism of FIG. 19*a*; still, the PK XY flexure mechanism with in-plane rigid inter-stage connections could have other designs, constructions, and components in other embodiments. The PK XY flexure mechanism 510 includes a motion stage or body 512, a ground stage or body 514, and twelve DPFMs situated thereamong. Still, in other embodiments, a quantity of more or less DPFMs could be provided in a parallel kinematic XY flexure mechanism having in-plane rigid inter-stage connections such as those described elsewhere in this patent. Still further, in other embodiments, the PK XY flexure mechanism could have one or more or all flexure modules other than DPFMs in its design and construction. This embodiment of FIG. 20*a* includes a first intermediate stage or body 516, a second intermediate stage or body 518, a third intermediate stage or body 520, a fourth intermediate stage or body 522, a first DPFM 524, a second DPFM 526, a third DPFM 528, a fourth DPFM 530, a fifth DPFM 532, a sixth DPFM 534, a seventh DPFM 536, an eighth DPFM 538, a ninth DPFM 540, a tenth DPFM 542, an eleventh DPFM 544, and a twelfth DPFM 546. The DPFMs that connect the intermediate stages 516, 518, 520, 522 to the ground stage 514 are referred to as peripheral DPFMs, while the DPFMs that connect the intermediate stages 516, 518, 520, 522 to the motion stage 512 are referred to as inner DPFMs. In the embodiment of FIG. 20 then, the first, third, fourth, sixth, seventh, ninth, tenth, and twelfth DPFMS 524, 528, 530, 534, 536, 540, 542, 546 constitute peripheral DPFMs; and the second, fifth, eighth, and eleventh DPFMs 526, 532, 538, 544 constitute inner DPFMs. In an embodiment, individual DPFMs of the PK XY flexure mechanism 510 can resemble the DPFMs 152, 162 as described in connection with previous figures, or can have another design and construction and can have other components. The individual DPFMs of the PK XY flexure mechanism 510 can have the ground stage, motion stage, flexure blades, reinforced flexure blades, and/or secondary stages, as set forth.

In FIG. 20*a*, and as previously described, the first intermediate stage 516 and third intermediate stage 520 constitute sister stages that exhibit kinematically compatible motion, and the second intermediate stage 518 and fourth intermediate stage 522 constitute sister stages that exhibit kinematically compatible motion. Accordingly, it has been determined that these sister stages can be connected together via in-plane rigid inter-stage connections, as depicted in FIG. 20*a*. It has further been determined that such in-plane rigid inter-stage connections can be employed without increasing the X direction DoF stiffness of the motion stage 512 with respect to the ground stage 514, and likewise without increasing the Y direction DoF stiffness of the motion stage 512 with respect to the ground stage 514. The first and third intermediate stages 516, 520 reside in the same plane and same layer of the PK XY flexure mechanism 510 with respect to each other; that is, the first and third intermediate stages 516, 520 generally and qualitatively lie in the same plane relative to each other, and need not be strictly aligned in the same plane with mathematical exactitude. Similarly, the second and fourth intermediate stages 518, 522 reside in the same plane and same layer of the PK XY flexure mechanism 510 with respect to each other; that is, the second and fourth intermediate stages 518, 522 generally and qualitatively lie in the same plane relative to each other, and need not be strictly aligned in the same plane with mathematical exactitude. A first in-plane rigid inter-stage connection 548 connects the first intermediate stage 516 and third intermediate stage 520, and extends in the X direction therebetween. Further, a second in-plane rigid inter-stage connection 550 connects the second intermediate stage 518 and fourth intermediate stage 522, and extends in the Y direction therebetween.

The first in-plane rigid inter-stage connection 548 serves to constrain relative motion between the first and third intermediate stages 516, 520 in all six directions (i.e., X, Y, Z, $\Theta_x$, $\Theta_y$, $\Theta_z$ directions), and the second in-plane rigid inter-stage connection 550 serves to constrain relative motion between the second and fourth intermediate stages 518, 522 in all six directions (i.e., X, Y, Z, $\Theta_x$, $\Theta_y$, $\Theta_z$ directions). Still, in other embodiments, the first and second in-plane rigid inter-stage connections 548, 550 need not constrain all six directions between the respective intermediate stages, and rather could be in-plane inter-stage connections that constrain four or five directions of motion between the respective intermediate stages (i.e., a 4 DoC in-plane inter-stage connection or a 5 DoC in-plane inter-stage connection). While not readily apparent from the view of FIG. 20*a*, the first and second in-plane rigid inter-stage connections 548, 550 lack connection relative to each other. In this embodiment, the first in-plane rigid inter-stage connection 548 is in the form of a pair of elongated bars positioned on opposite sides of the first and third intermediate stages 516, 520. Similarly, the second in-plane rigid inter-stage connection 550 is in the form of a pair of elongated bars positioned on opposite sides of the second and fourth intermediate stages 518, 522. The first in-plane rigid inter-stage connection 548 extends in a first direction and the second in-plane rigid inter-stage connection 550 extends in a second direction. In this embodiment, the first direction is the X direction, and the second direction is the Y direction. The first and second directions are hence orthogonal with respect to each other. Still, in other embodiments, the first and second directions of extension of the first and second in-plane rigid inter-stage connections 548, 550 need not necessarily be in the respective X and Y directions and orthogonal to each other, and rather could extend in other directions and could be non-orthogonal with respect to each other. In general, the constructions and/or attachments of the in-plane rigid inter-stage connections described here and elsewhere in this description can involve adhesives, fasteners or bolts, rivets, welds, monolithic constructions and geometries, and/or other types of attachments and structures.

Figure 20B:
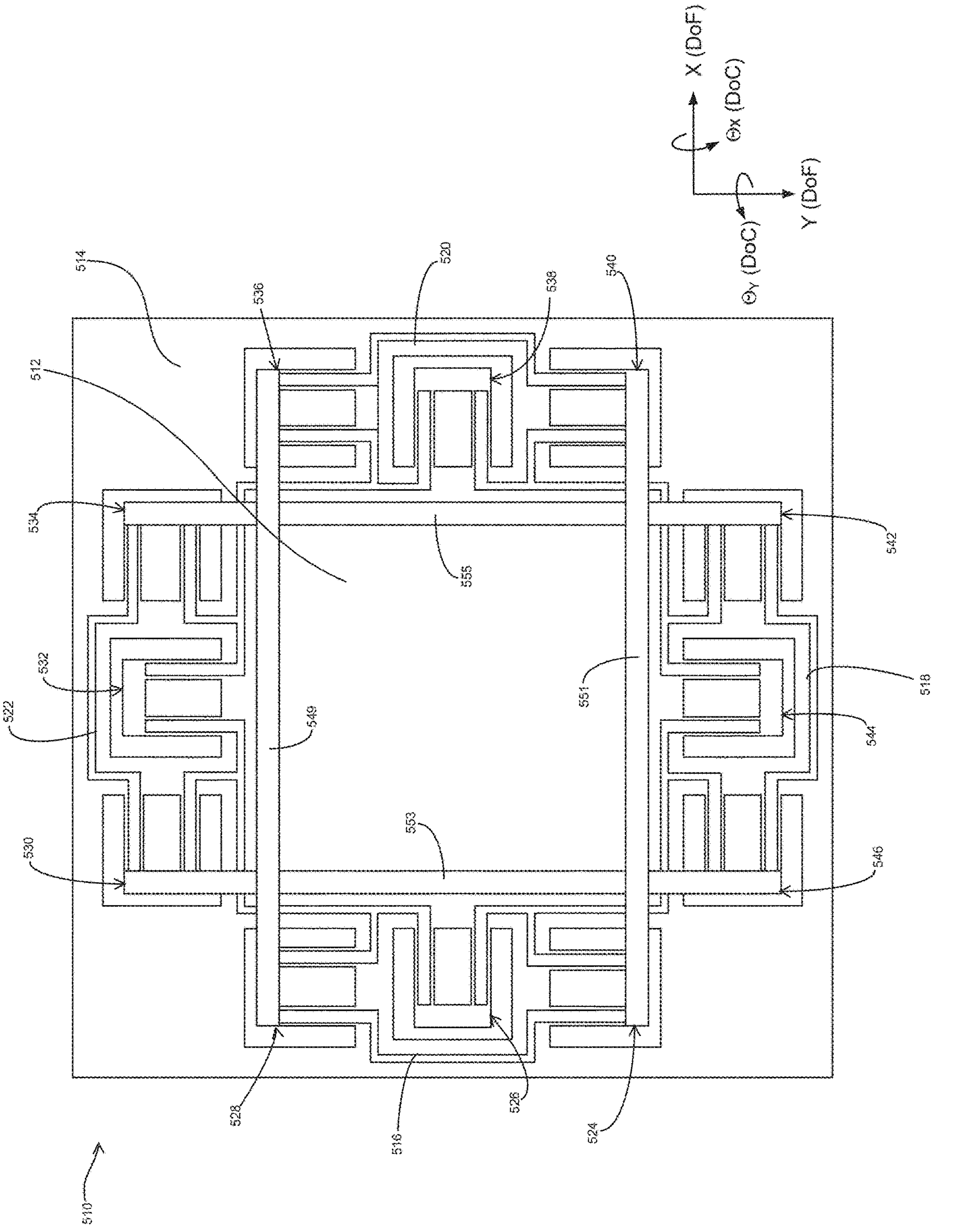
FIG. 20*b* is a top view of a parallel kinematic XY flexure mechanism with an embodiment of in-plane rigid inter-stage connections.

With reference now to FIG. 20*b*, another embodiment of the parallel kinematic (PK) XY flexure mechanism 510 is illustrated. This embodiment is similar to that of FIG. 20*a*, and hence some descriptions may not be repeated here. In FIG. 20*b*, in-plane rigid inter-stage connections are employed to achieve significantly higher DoC out of plane stiffness in the Z direction of its motion stage with respect to its ground stage upon a given X translation DoF and Y translation DoF stiffness compared to known prior art flexure mechanism designs. Here, secondary stages of certain DPFMs—in this embodiment, peripheral DPFMs—constitute sister stages that exhibit kinematically compatible motions, and hence it has been determined that such sister stages can be connected together via in-plane rigid inter-stage connections, as depicted in the figure. The in-plane inter-stage connections of the embodiment of FIG. 20*b* can be combined with in-plane inter-stage connections of other embodiments that connect intermediate stages together. It has further been determined that such in-plane rigid inter-stage connections can be employed without increasing the X direction DoF stiffness of the motion stage 512 with respect to the ground stage 514, and likewise without increasing the Y direction DoF stiffness of the motion stage 512 with respect to the ground stage 514. The secondary stages connected together reside in the same plane and same layer of the PK XY flexure mechanism 510 with respect to each other; that is, the secondary stages generally and qualitatively lie in the same plane relative to each other, and need not be strictly aligned in the same plane with mathematical exactitude.

A first in-plane rigid inter-stage connection 549 connects a secondary stage of the third DPFM 528 and a secondary stage of the seventh DPFM 536, and extends in the X direction therebetween. These secondary stages are sister stages in this embodiment. The first in-plane rigid inter-stage connection 549 serves to constrain relative motion between the secondary stages of the third and seventh DPFMs 528, 536 in all six directions (i.e., X, Y, Z, $\Theta_x$, $\Theta_y$, $\Theta_z$ directions). Further, a second in-plane rigid inter-stage connection 551 connects a secondary stage of the first DPFM 524 and a secondary stage of the ninth DPFM 540, and extends in the X direction therebetween. These secondary stages are sister stages in this embodiment. The second in-plane rigid inter-stage connection 551 serves to constrain relative motion between the secondary stages of the first and ninth DPFMs 524, 540 in all six directions. Yet further, a third in-plane rigid inter-stage connection 553 connects a secondary stage of the fourth DPFM 530 and a secondary stage of the twelfth DPFM 546, and extends in the Y direction therebetween. These secondary stages are sister stages in this embodiment. The third in-plane rigid inter-stage connection 553 serves to constrain relative motion between the secondary stages of the fourth and twelfth DPFMs 530, 546 in all six directions. Yet further, a fourth in-plane rigid inter-stage connection 555 connects a secondary stage of the sixth DPFM 534 and a secondary stage of the tenth DPFM 542, and extends in the Y direction therebetween. These secondary stages are sister stages in this embodiment. The fourth in-plane rigid inter-stage connection 555 serves to constrain relative motion between the secondary stages of the sixth and tenth DPFMs 534, 542 in all six directions. Still, in other embodiments, the first, second, third, and fourth in-plane rigid inter-stage connections 549, 551, 553, 555 need not constrain all six directions between the respective secondary stages, and rather could be in-plane inter-stage connections that constrain four or five directions of motion between the respective secondary stages (i.e., a 4 DoC in-plane inter-stage connection or a 5 DoC in-plane inter-stage connection).

As before, while not readily apparent from the view of FIG. 20*b*, the first, second, third, and fourth in-plane rigid inter-stage connections 549, 551, 553, 555 lack connection relative to one another. The first and second in-plane rigid inter-stage connections 549, 551 extend in a first direction and the third and fourth in-plane rigid inter-stage connections 553, 555 extend in a second direction. In this embodiment, the first direction is the X direction, and the second direction is the Y direction. The first and second directions are hence orthogonal with respect to each other. Still, in other embodiments, the first and second directions of extension of the first, second, third, and fourth in-plane rigid inter-stage connections 549, 551, 553, 555 need not necessarily be in the respective X and Y directions and orthogonal to each other, and rather could extend in other directions and could be non-orthogonal with respect to each other. Further, in general, the constructions and/or attachments of the in-plane rigid inter-stage connections described here and elsewhere in this description can involve adhesives, fasteners or bolts, rivets, welds, monolithic constructions and geometries, and/or other types of attachments and structures.

Figure 21:
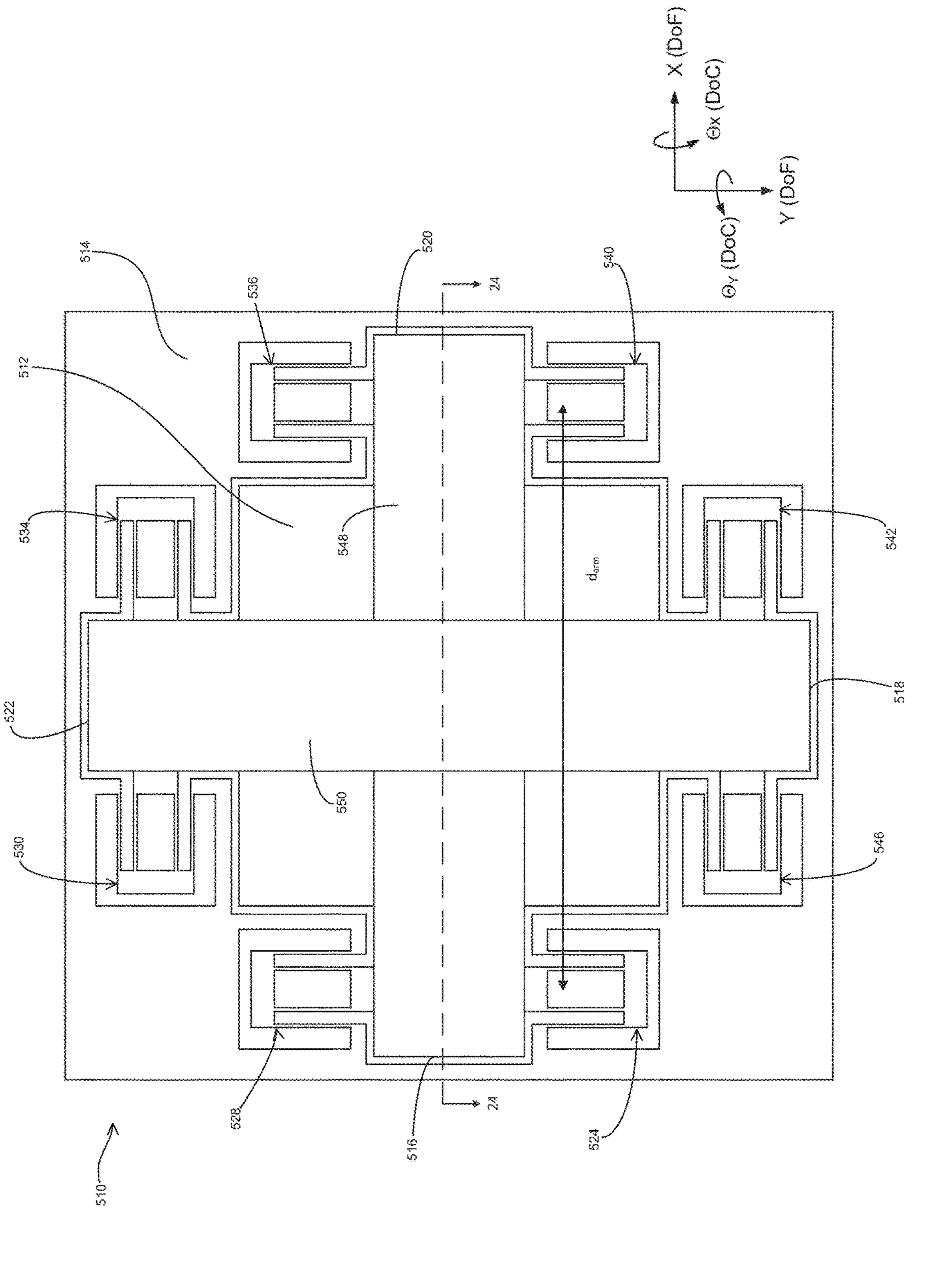
FIG. 21 is a top view of a parallel kinematic XY flexure mechanism with another embodiment of in-plane rigid inter-stage connections.

FIG. 21 presents another embodiment of the PK XY flexure mechanism 510 in which the first and second in-plane rigid inter-stage connections 548, 550 are in the form of solid and rectangular plates. As before, the first in-plane rigid inter-stage connection 548 connects the first intermediate stage 516 and third intermediate stage 520, and extends in the first or X direction therebetween. And the second in-plane rigid inter-stage connection 550 connects the second intermediate stage 518 and fourth intermediate stage 522, and extends in the second or Y direction therebetween. The first in-plane rigid inter-stage connection 548 serves to constrain relative motion between the first and third intermediate stages 516, 520 in all six directions (i.e., X, Y, Z, $\Theta_x$, $\Theta_y$, $\Theta_z$ directions), and the second in-plane rigid inter-stage connection 550 serves to constrain relative motion between the second and fourth intermediate stages 518, 522 in all six directions (i.e., X, Y, Z, $\Theta_x$, $\Theta_y$, $\Theta_z$ directions). Still, in other embodiments, the first and second in-plane rigid inter-stage connections 548, 550 need not constrain all six directions between the respective intermediate stages, and rather could be in-plane inter-stage connections that constrain four or five directions of motion between the respective intermediate stages (i.e., a 4 DoC in-plane inter-stage connection or a 5 DoC in-plane inter-stage connection). While not readily apparent from the view of FIG. 21, the first and second in-plane rigid inter-stage connections 548, 550 lack connection relative to each other.

It has been found that the PK XY flexure mechanism 510 with the in-plane rigid inter-stage connections 548, 549, 550, 551, 553, 555 provides a significantly higher nominal and non-nominal Z translation direction DoC stiffness compared to that provided by the PK XY flexure mechanism of FIG. 19*a* that lacks such in-plane rigid inter-stage connections. This is evidenced by the graph of FIG. 23. The graph shows a comparison of the nominal and non-nominal Z translation direction DoC stiffnesses of the PK XY flexure mechanism 510 and the PK XY flexure mechanism of FIG. 19*a*, according to the embodiments set forth. The nominal Z translation direction DoC stiffness is at zero motion stage displacement in the X direction in the graph, and the non-nominal Z translation direction DoC stiffness is at non-zero motion stage displacements in the X direction in the graph. The PK XY flexure mechanism 510 with the in-plane rigid inter-stage connections 548, 549, 550, 551, 553, 555 is represented by line $L_1$ in the graph, and the PK XY flexure mechanism of FIG. 19*a* is represented by line $L_2$. Further, the PK XY flexure mechanism 510 and the PK XY flexure mechanism of FIG. 19*a* exhibit the same X and Y DoF stiffnesses.

It has been determined that the enhanced nominal Z translation direction DoC stiffness is due in part or more to rotation restriction of the intermediate stages 516, 520, 518, 522 and of the respective secondary stages furnished via the in-plane rigid inter-stage connections 548, 549, 550, 551, 553, 555. With reference to the sectional view of FIG. 19*b*, the intermediate stages 182, 186 experience $\Theta_y$ rotation about their respective Y1 and Y3 axes in opposite directions with respect to the ground stage 180 upon application of the Z direction force (F) at the motion stage 178. This $\Theta_y$ rotation, it has been found, is partly responsible for the finite nominal Z translation direction DoC stiffness between the motion stage 178 and ground stage 180. With reference now to the sectional view of FIG. 24, the first in-plane rigid inter-stage connection 548 precludes and restricts the $\Theta_y$ rotation about the Y1 and Y3 axes that would otherwise occur at the first and third intermediate stages 516, 520, and the second in-plane rigid inter-stage connection 550 precludes and restricts the $\Theta_x$ rotation about the X4 axis (axis X2 of the second intermediate stage 518 unshown) that would otherwise occur at the second and fourth intermediate stages 518, 522. Accordingly, the in-plane rigid inter-stage connections 548, 549, 550, 551, 553, 555 provide a significantly higher nominal Z translation direction DoC stiffness between the motion stage 512 and ground stage 514, as depicted in the graph of FIG. 23 by line $L_1$.

Figure 23:
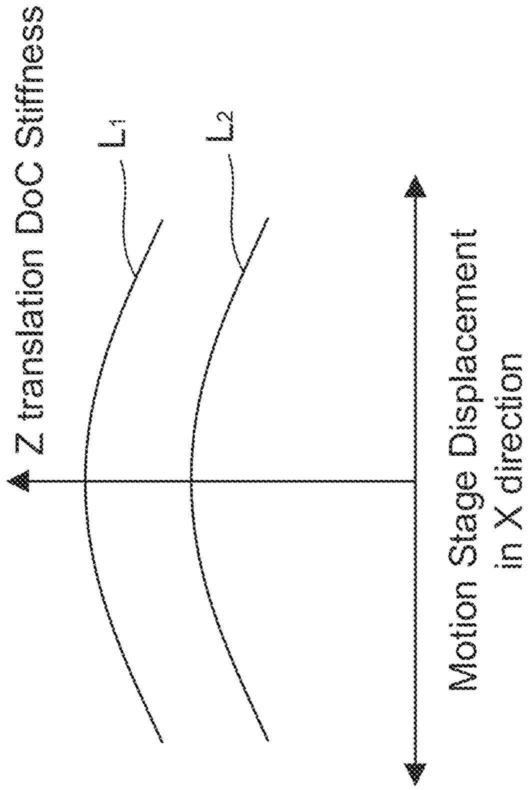
FIG. 23 is a graph demonstrating in a qualitative manner Z translation direction DoC stiffness with respect to X direction displacement of motion stages of an embodiment of a parallel kinematic XY flexure mechanism with in-plane rigid inter-stage connections like that of FIGS. 20*a* and 21 and of a parallel XY flexure mechanism assembly lacking in-plane rigid inter-stage connections like that of FIG. 19*a*, with motion stage displacement in X direction plotted on an x-axis and Z translation DoC stiffness plotted on a y-axis.
Figure 24:
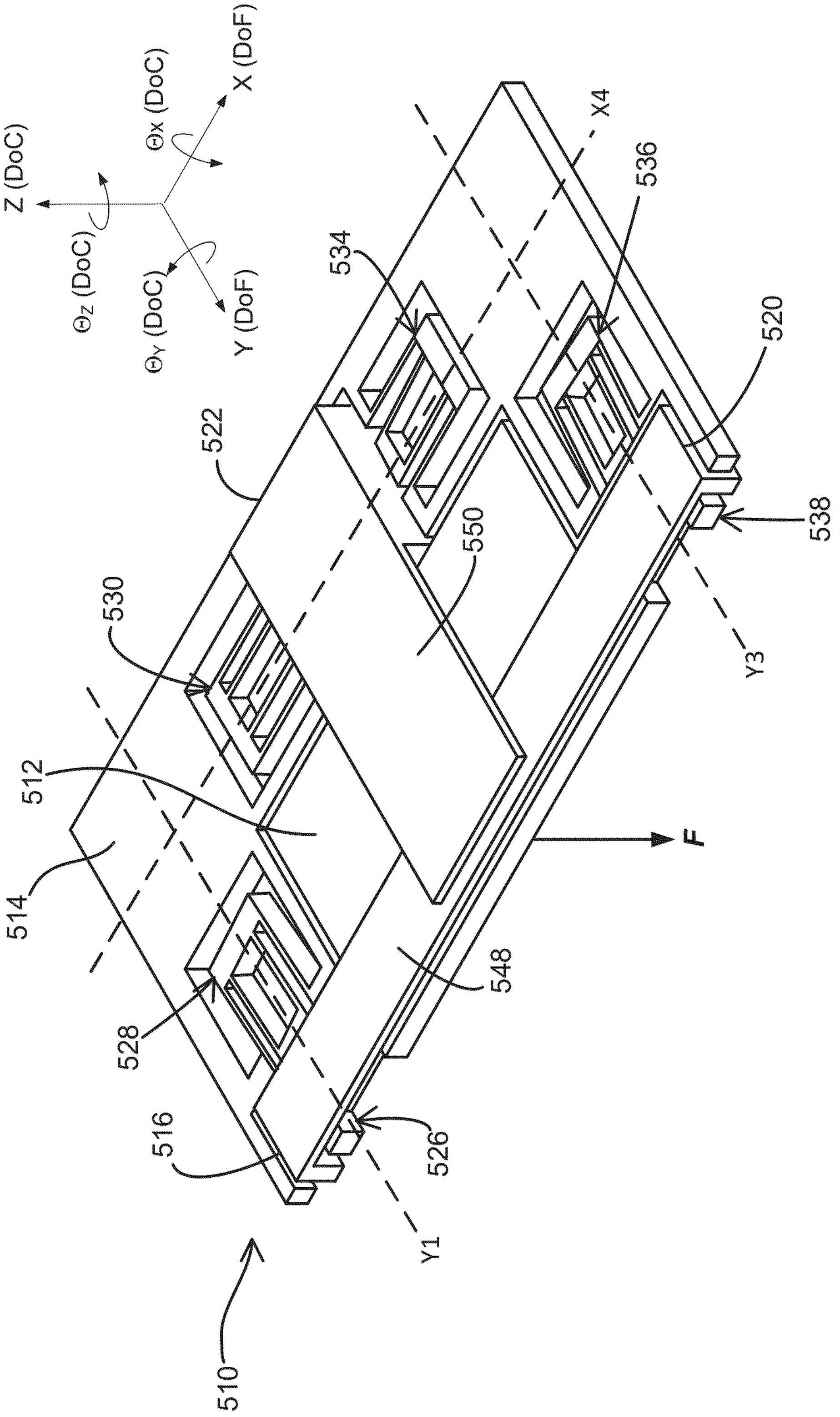
FIG. 24 is a sectional view of the PK XY flexure mechanism of FIG. 21 taken at arrowed line 24.

The graph of FIG. 23 shows a decrease in non-nominal Z translation direction DoC stiffness of the PK XY flexure mechanism 510 with the in-plane rigid inter-stage connections 548, 549, 550, 551, 553, 555 (i.e., line $L_1$) at the same rate as the decrease of the PK XY flexure mechanism of FIG. 19*a* without any in-plane rigid inter-stage connections (i.e., line $L_2$). This decrease and reduction is a consequence of torsional deformations of the associated flexure blades of the inner and peripheral DPFMs, as described above in connection with FIG. 19*c*. Since, according to the embodiments of FIGS. 20*a* and 21, the dimensions of the associated flexure blades in the PK XY flexure mechanism 510 are unchanged relative to those of the PK XY flexure mechanism of FIG. 19*a*, the respective non-nominal Z translation direction DoC stiffness decreases at the same rate. Still, in other embodiments, the dimensions of the associated flexure blades in the PK XY flexure mechanism 510 could indeed be modified, as set forth elsewhere in this description, including being outfitted with reinforced flexure blades.

Figure 22B:
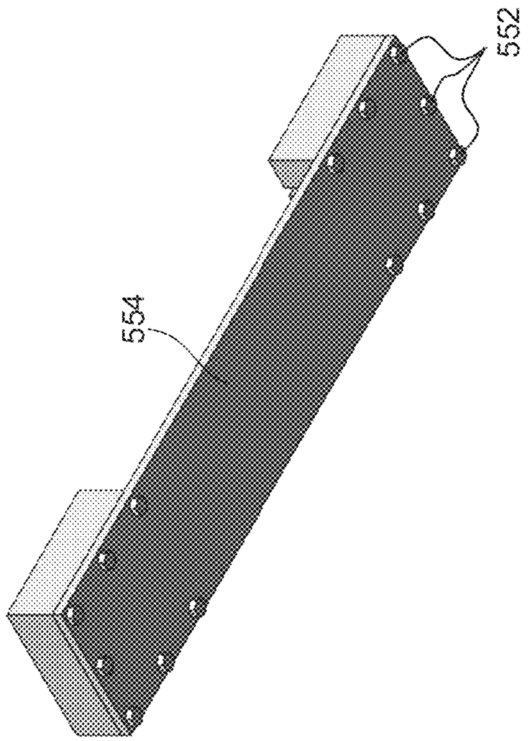
FIG. 22*b* is a perspective view of an embodiment of an in-plane rigid inter-stage connection.
Figure 22A:
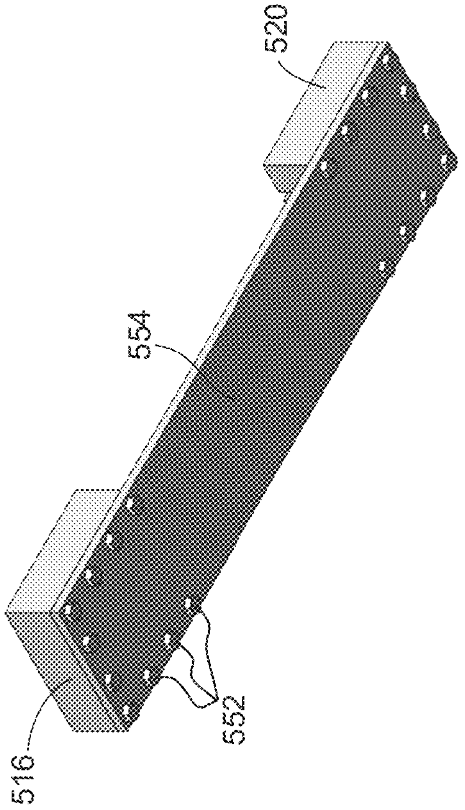
FIG. 22*a* is a perspective view of an embodiment of an in-plane rigid inter-stage connection.
Figure 22D:
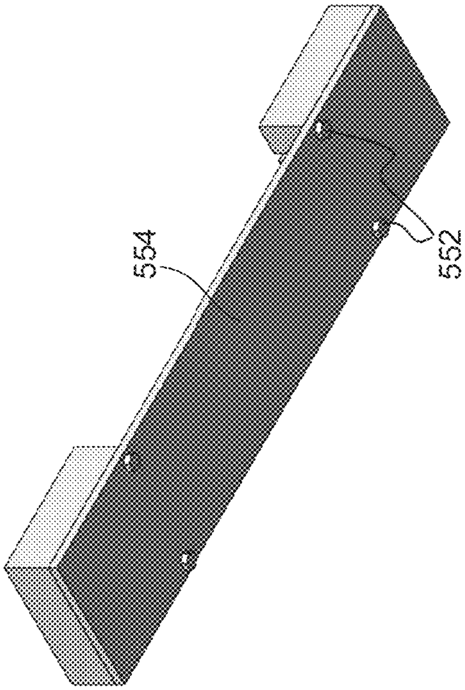
FIG. 22*d* is a perspective view of an embodiment of an in-plane rigid inter-stage connection.
Figure 22C:
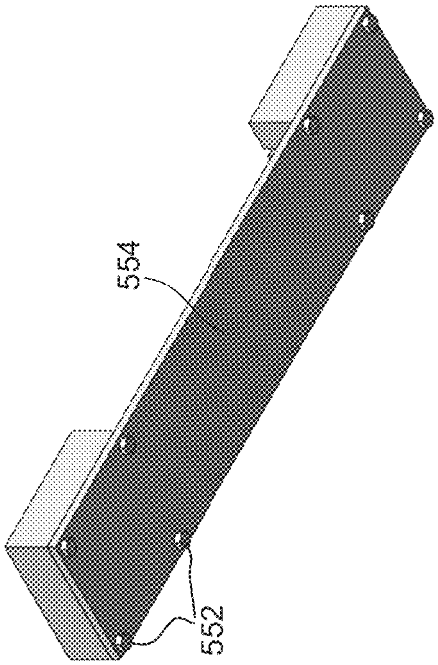
FIG. 22*c* is a perspective view of an embodiment of an in-plane rigid inter-stage connection.
Figure 22F:
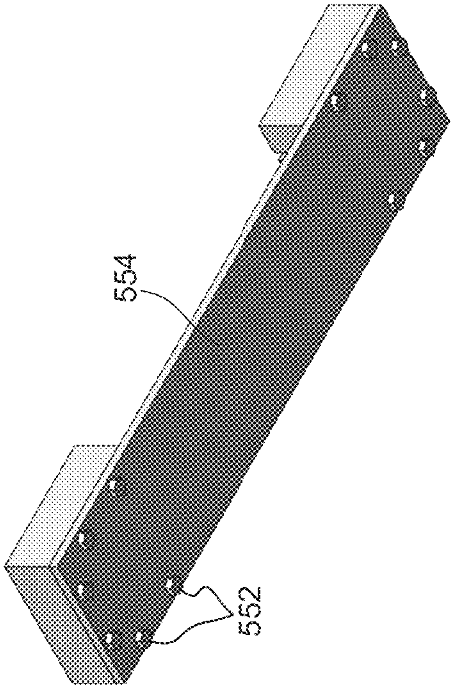
FIG. 22*f* is a perspective view of an embodiment of an in-plane rigid inter-stage connection.
Figure 22E:
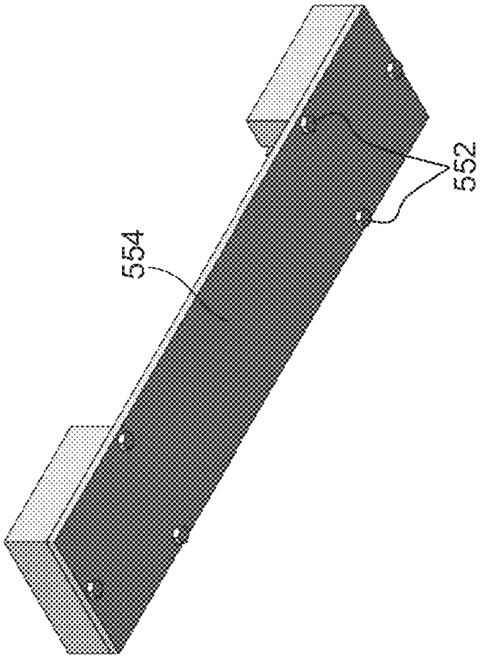
FIG. 22*e* is a perspective view of an embodiment of an in-plane rigid inter-stage connection.
Figure 22H:
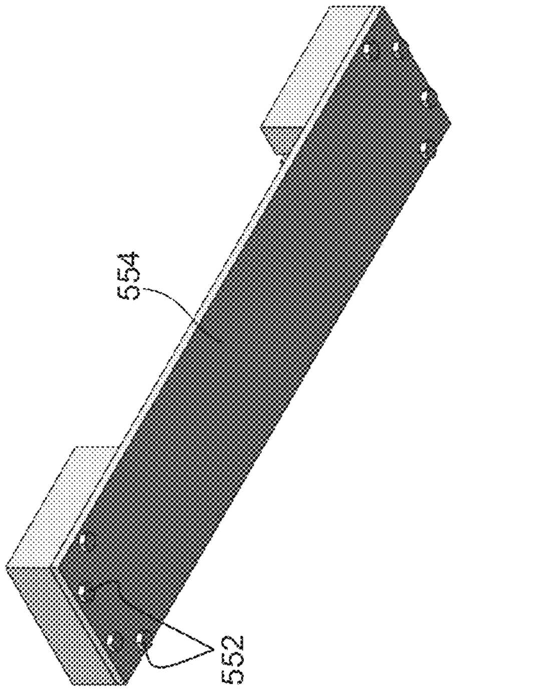
FIG. 22*h* is a perspective view of an embodiment of an in-plane rigid inter-stage connection.
Figure 22G:
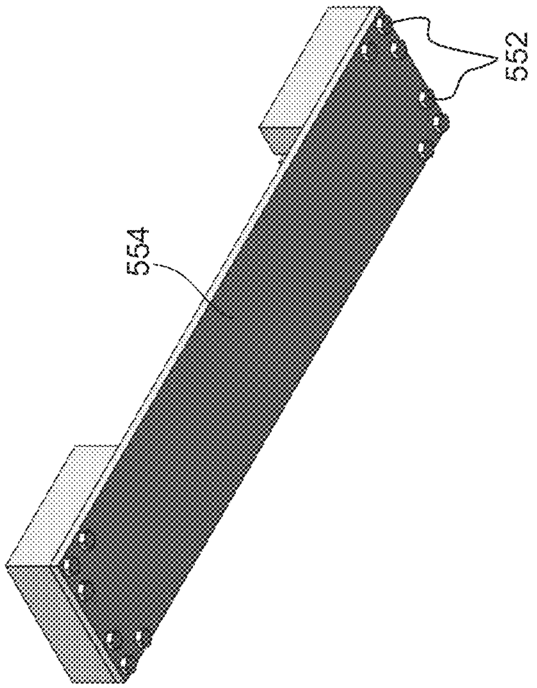
FIG. 22*g* is a perspective view of an embodiment of an in-plane rigid inter-stage connection.

As described, the in-plane rigid inter-stage connections can take varying forms, shapes, and sizes, depending on the embodiment and the flexure mechanism design and construction. While rigid in construction, the in-plane rigid inter-stage connections 548, 549, 550, 551, 553, 555 exhibit small amounts of parasitic compliance and have mass, both of which can be detrimental to performance. The in-plane rigid inter-stage connections 548, 549, 550, 551, 553, 555 can hence be designed and constructed in order to minimize these undesired effects. Example embodiments are presented in FIGS. 22*a*-22*x*. In these embodiments and figures, an in-plane rigid inter-stage connection 554 is shown structurally connecting sister intermediate stages 516, 520, as an example. In FIGS. 22*a*-22*i*, the in-plane rigid inter-stage connection 554 is in the form of a rectangular plate connected to the intermediate stages 516, 520 via a multitude of bolts or rivets 552 and via a multitude of bolt or rivet arrangements. In FIG. 22*a*, a total of twenty bolts or rivets 552 connect the components, ten bolts or rivets 552 between the in-plane rigid inter-stage connection 554 and the first intermediate stage 516 and ten bolts or rivets 552 between the in-plane rigid inter-stage connection 554 and the third intermediate stage 520. In a similar way in FIG. 22*b*, a total of fourteen bolts or rivets 552 connect the components. In a similar way in FIG. 22*c*, a total of eight bolts or rivets 552 connect the components. In a similar way in FIG. 22*d*, a total of four bolts or rivets 552 connect the components. In a similar way in FIG. 22*e*, a total of six bolts or rivets 552 connect the components. In a similar way in FIG. 22*f*, a total of twelve bolts or rivets 552 connect the components. In a similar way in FIG. 22*g*, a total of twelve bolts or rivets 552 connect the components via a varying bolt or rivet pattern than FIG. 22*f*. In a similar way in FIG. 22*h*, a total of eight bolts or rivets 552 connect the components via a varying bolt or rivet pattern than FIG. 22*c*. In a similar way in FIG. 22*i*, a total of twenty-six bolts or rivets 552 connect the components.

Figure 22J:
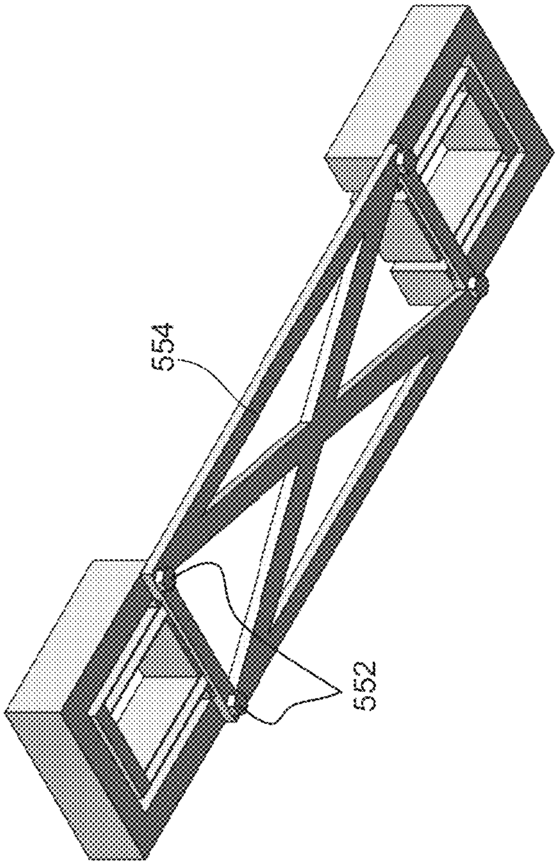
FIG. 22*j* is a perspective view of an embodiment of an in-plane rigid inter-stage connection.
Figure 22I:
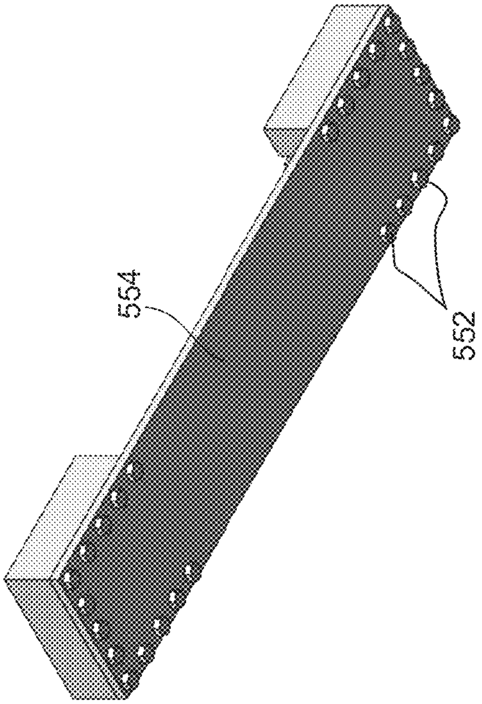
FIG. 22*i* is a perspective view of an embodiment of an in-plane rigid inter-stage connection.
Figure 22L:
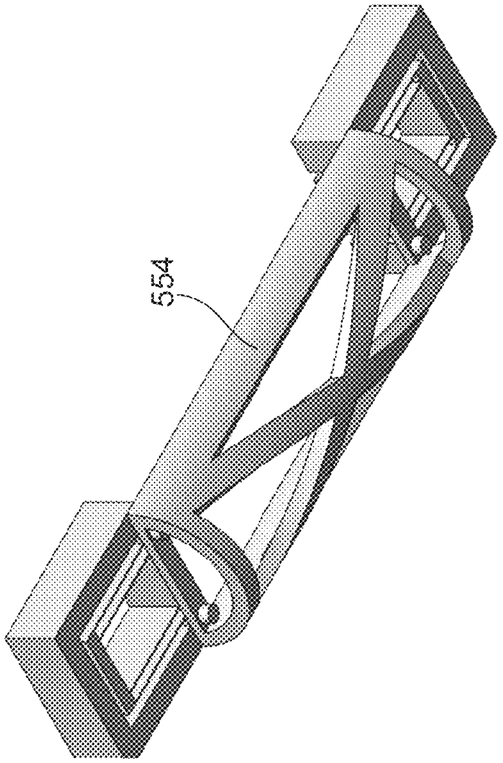
FIG. 22*l* is a perspective view of an embodiment of an in-plane rigid inter-stage connection.
Figure 22K:
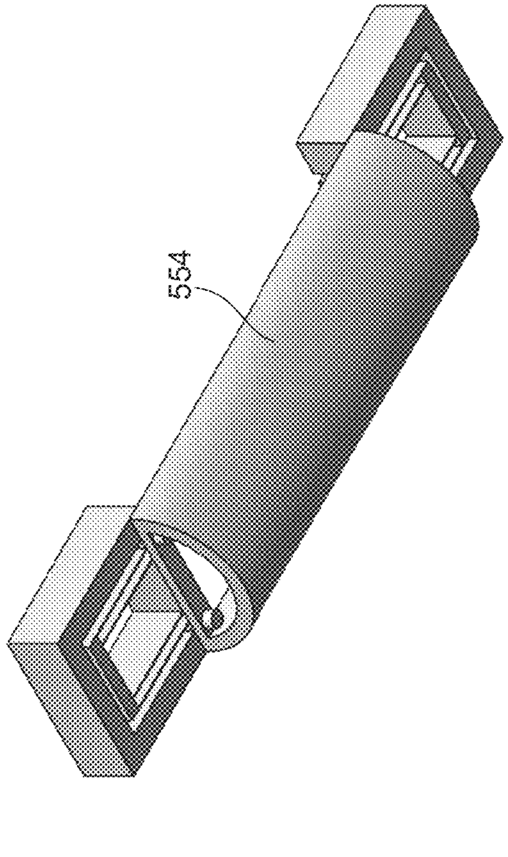
FIG. 22*k* is a perspective view of an embodiment of an in-plane rigid inter-stage connection.
Figure 22N:
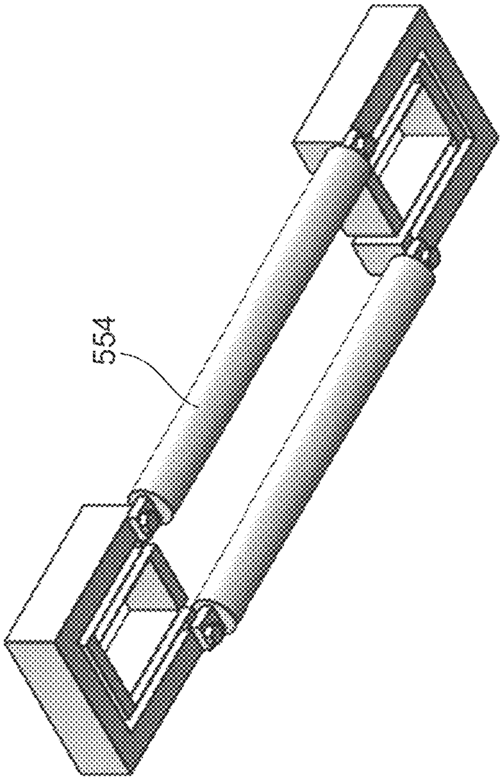
FIG. 22*n* is a perspective view of an embodiment of an in-plane rigid inter-stage connection.
Figure 22M:
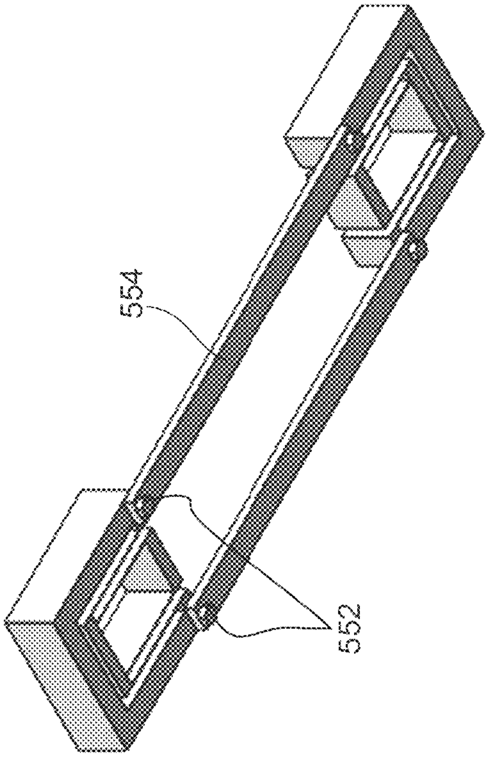
FIG. 22*m* is a perspective view of an embodiment of an in-plane rigid inter-stage connection.
Figure 22P:
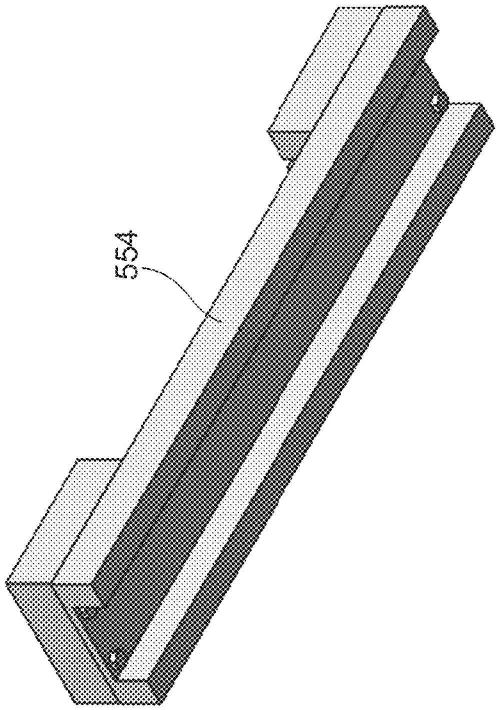
FIG. 22*p* is a perspective view of an embodiment of an in-plane rigid inter-stage connection.
Figure 22O:
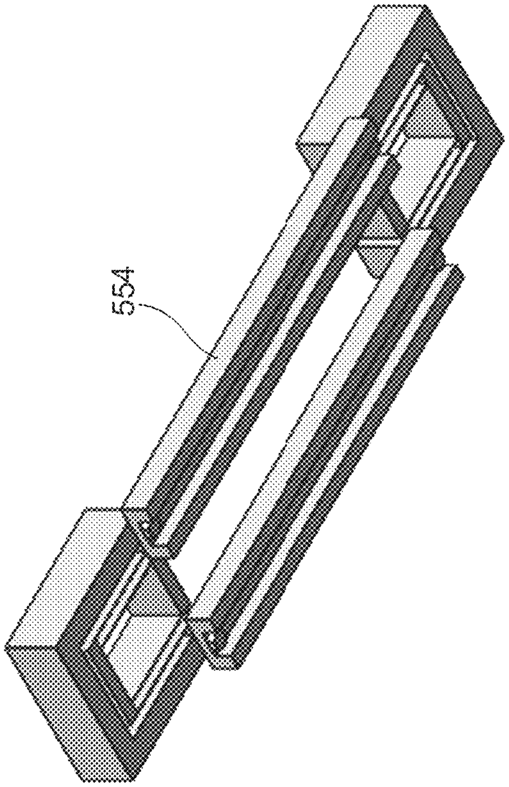
FIG. 22*o* is a perspective view of an embodiment of an in-plane rigid inter-stage connection.
Figure 22R:
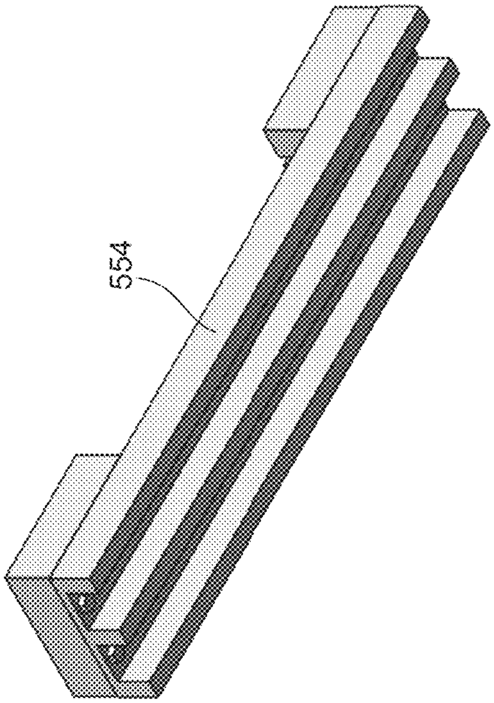
FIG. 22*r* is a perspective view of an embodiment of an in-plane rigid inter-stage connection.
Figure 22Q:
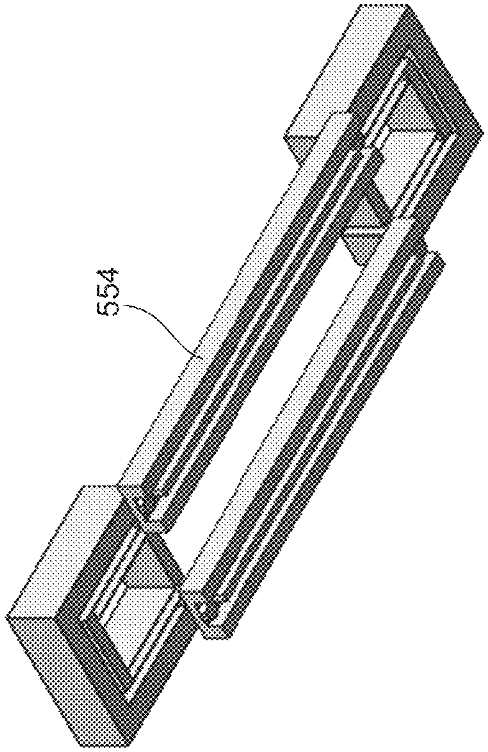
FIG. 22*q* is a perspective view of an embodiment of an in-plane rigid inter-stage connection.
Figure 22T:
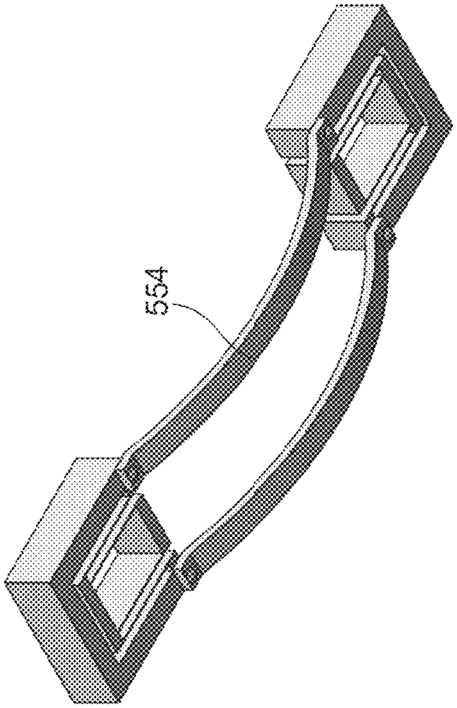
FIG. 22*t* is a perspective view of an embodiment of an in-plane rigid inter-stage connection.
Figure 22S:
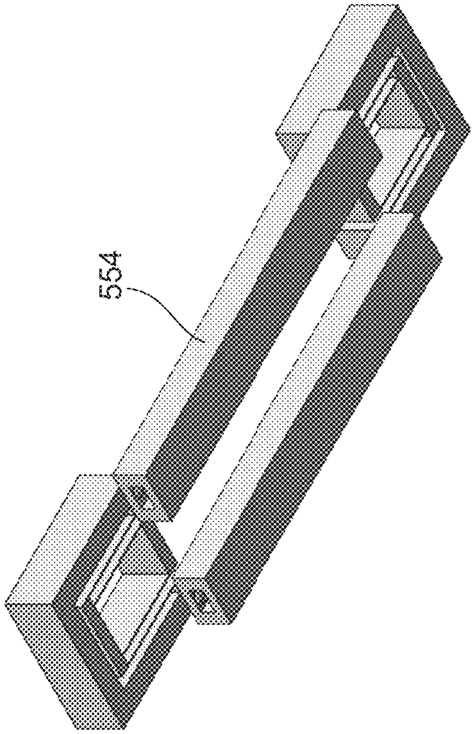
FIG. 22*s* is a perspective view of an embodiment of an in-plane rigid inter-stage connection.
Figure 22V:
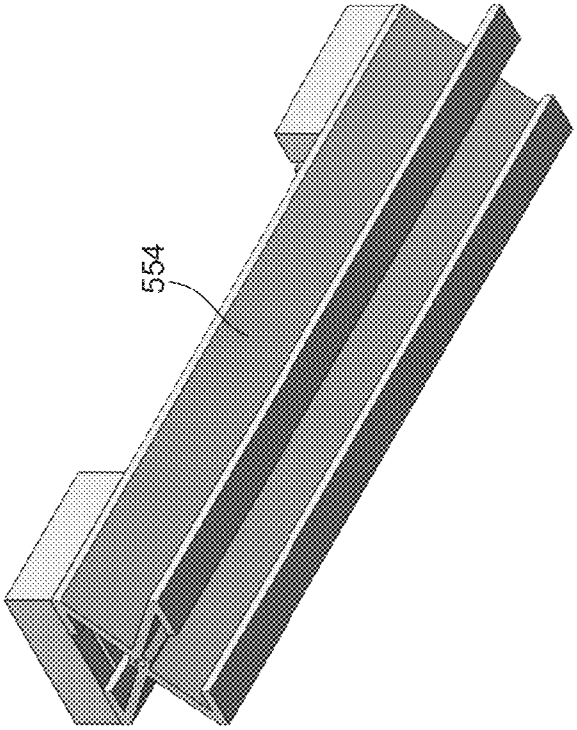
FIG. 22*v* is a perspective view of an embodiment of an in-plane rigid inter-stage connection.
Figure 22U:
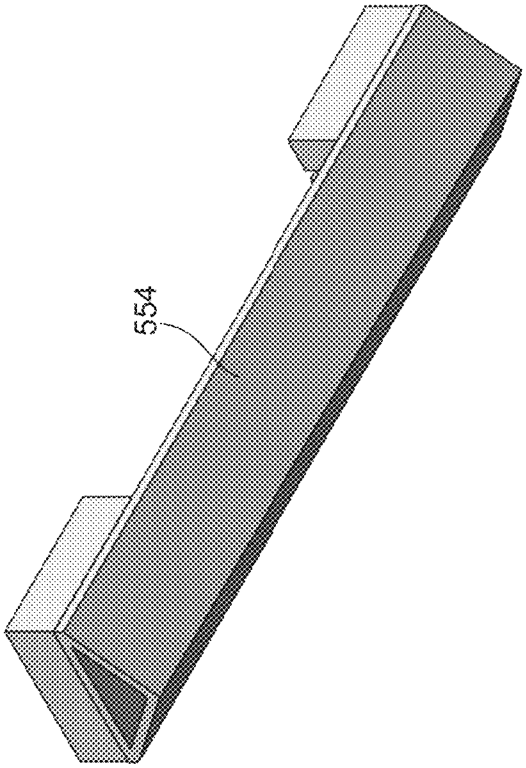
FIG. 22*u* is a perspective view of an embodiment of an in-plane rigid inter-stage connection.
Figure 22X:
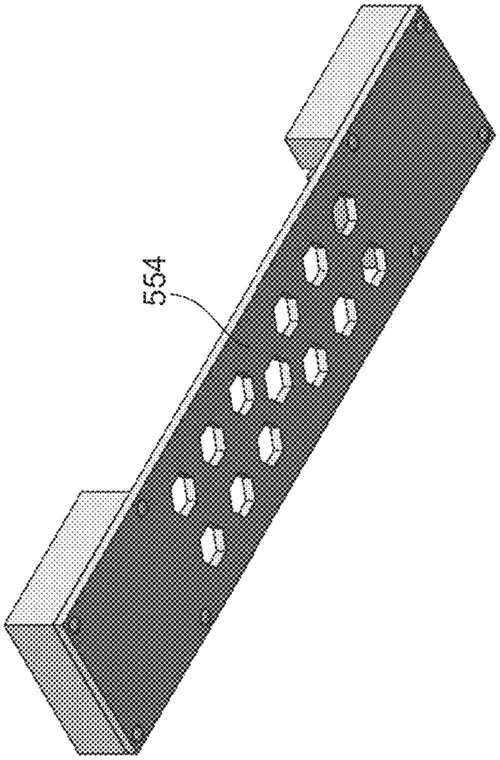
FIG. 22*x* is a perspective view of an embodiment of an in-plane rigid inter-stage connection.
Figure 22W:
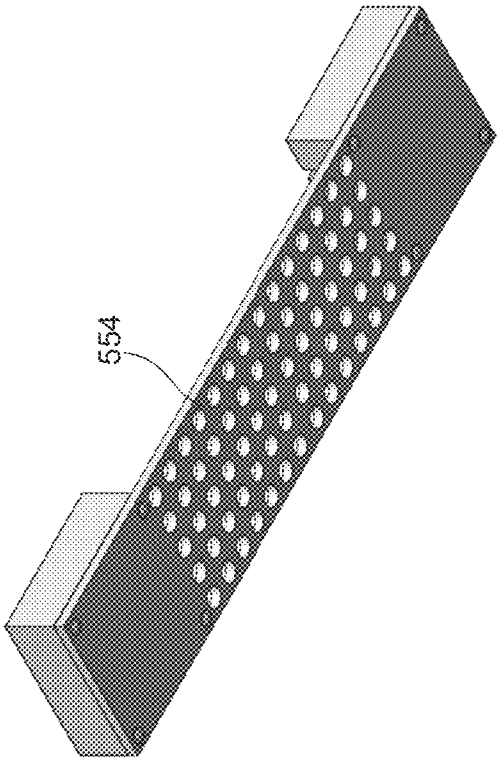
FIG. 22*w* is a perspective view of an embodiment of an in-plane rigid inter-stage connection.

Further, in FIG. 22*j*, the in-plane rigid inter-stage connection 554 is in the form of a shortened rectangular plate with lightening holes for reducing the mass of the plate. Bolts or rivets 552 at near ends of the intermediate stages 516, 520 establish the connection with the in-plane rigid inter-stage connection 554. In FIGS. 22*k* and 221, the in-plane rigid inter-stage connection 554 is in the form of a semi-cylindrical plate connected at the near ends of the intermediate stages 516, 520 via bolts or rivets 552. Lightening holes reside in the semi-cylindrical plate of FIG. 22*l*. In FIG. 22*m*, the in-plane rigid inter-stage connection 554 is in the form of a pair of rectangular plates connected at the near ends of the intermediate stages 516, 520 via bolts or rivets 552. In FIG. 22*n*, the in-plane rigid inter-stage connection 554 is in the form of a pair of cylinders with terminal flanges connected at the near ends of the intermediate stages 516, 520 via bolts or rivets 552. In FIG. 22*o*, the in-plane rigid inter-stage connection 554 is in the form of a pair of C-channels connected at the near ends of the intermediate stages 516, 520 via bolts or rivets 552. In FIG. 22*p*, the in-plane rigid inter-stage connection 554 is in the form of a C-channel connected at far ends of the intermediate stages 516, 520 via bolts or rivets 552. In FIG. 22*q*, the in-plane rigid inter-stage connection 554 is in the form of a pair of W-channels connected at the near ends of the intermediate stages 516, 520 via bolts or rivets 552. In FIG. 22*r*, the in-plane rigid inter-stage connection 554 is in the form of a W-channel connected at far ends of the intermediate stages 516, 520 via bolts or rivets 552. In FIG. 22*s*, the in-plane rigid inter-stage connection 554 is in the form of a pair of box-channels connected at the near ends of the intermediate stages 516, 520 via bolts or rivets 552. In FIG. 22*t*, the in-plane rigid inter-stage connection 554 is in the form of a pair of arches connected at the near ends of the intermediate stages 516, 520 via bolts or rivets 552. In FIG. 22*u*, the in-plane rigid inter-stage connection 554 is in the form of a triangular plate connected at the near and/or far ends of the intermediate stages 516, 520. In FIG. 22*v*, the in-plane rigid inter-stage connection 554 is in the form of an X-channel/T-track plate connected at the near and/or far ends of the intermediate stages 516, 520. Lastly, in FIGS. 22*w* and 22*x*, the in-plane rigid inter-stage connection 554 is in the form of a rectangular plate with lightening holes of varying sizes and patterns.

Moreover, it has been found that use of the in-plane rigid inter-stage connections in the PK XY flexure mechanism 510 provides an increased $\Theta_z$ rotation DoC stiffness of the accompanying intermediate stages 516, 520, 518, 522 and of the accompanying secondary stages with respect to the ground stage 514 compared to that provided by the PK XY flexure mechanism of FIG. 19*a* that lacks such in-plane rigid inter-stage connections. In the PK XY flexure mechanism of FIG. 19*a*, the $\Theta_z$ rotation DoC stiffness of the first intermediate stage 182 with respect to the ground stage 180, for instance, is based on the first and third DPFMs 190, 194. The $\Theta_z$ rotation DoC stiffness in FIG. 19*a* is hence proportional to a distance $d_{arm}$ in the figure. But in the PK XY flexure mechanism 510 of FIG. 20*a* with the first and second in-plane rigid inter-stage connections 548, 550, on the other hand, the $\Theta_z$ rotation DoC stiffness of the first intermediate stage 516 with respect to the ground stage 514 is based on the first, third, seventh, and ninth DPFMs 524, 528, 536, 540. Here, and as shown in FIG. 20*a*, due to the first in-plane rigid inter-stage connection 548 the associated distance $d_{arm}$ is taken over the X direction between the first or third DPFM 524, 528 at one side of the motion stage 512 and the seventh or ninth DPFM 536, 540 at the opposite side of the motion stage 512. Since the $\Theta_z$ rotation DoC stiffness is proportional to the distance $d_{arm}$ in FIG. 20*a*, the first in-plane rigid inter-stage connection 548 provides a higher $\Theta_z$ rotation DoC stiffness of the first and third intermediate stages 516, 520 with respect to the ground stage 514. The same relationship and same increase in $\Theta_z$ rotation DoC stiffness is effected via the second in-plane rigid inter-stage connection 550 in connection with the second and fourth intermediate stages 518, 522 with respect to the ground stage 514.

As used herein, the terms "general" and "generally" and "substantially" are intended to account for the inherent degree of variance and imprecision that is often attributed to, and often accompanies, any design and manufacturing process, including engineering tolerances—and without deviation from the relevant functionality and outcome—such that mathematical precision and exactitude is not implied and, in some instances, is not possible. In other instances, the terms "general" and "generally" and "substantially" are intended to represent the inherent degree of uncertainty that is often attributed to any quantitative comparison, value, and measurement calculation, or other representation.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A flexure mechanism assembly, comprising:

a ground body plate;

a motion body plate disposed within a central aperture of said ground body plate, said motion body plate being coplanar with or parallel to said ground body plate;

a plurality of flexure modules arranged between said ground body plate and said motion body plate, each of said plurality of flexure modules comprising:

a first secondary body;

a second secondary body;

an intermediate body;

a first plurality of flexure blades extending between said ground body plate and said first secondary body;

a second plurality of flexure blades extending between said motion body plate and said second secondary body;

a third plurality of flexure blades extending between said first secondary body and said intermediate body; and a fourth plurality of flexure blades extending between said second secondary body and said intermediate body; and at least one rigid in-plane inter-stage connection member extending between a pair of flexure modules on opposing sides of said motion body plate, the connection member coupled to a pair of respective intermediate bodies or respective first secondary bodies of said opposing flexure modules, wherein the connected said secondary bodies or said intermediate bodies exhibit kinematically compatible motion with respect to each other, wherein the connected said secondary bodies or said intermediate bodies resides in the same plane or in a same parallel plane of the flexure mechanism assembly with respect to each other.

2. The flexure mechanism assembly as set forth in claim 1, wherein said at least one in-plane inter-stage connection member provides six degrees of constraint between the connected said secondary bodies or said intermediate bodies.

3. The flexure mechanism assembly as set forth in claim 1, wherein said at least one in-plane inter-stage connection member comprises a first in-plane inter-stage connection member that extends between a pair of respective first and second intermediate bodies and provides at least four degrees of constraint between said first intermediate body and said second intermediate body.

4. The flexure mechanism assembly as set forth in claim 3, wherein said at least one in-plane inter-stage connection member comprises a second in-plane inter-stage connection member that extends between a pair of respective third and fourth intermediate bodies and provides at least four degrees of constraint between said third intermediate body and said fourth intermediate body.

5. The flexure mechanism assembly as set forth in claim 4, wherein said first in-plane inter-stage connection member provides six degrees of constraint between said first intermediate body and said second intermediate body, and said second in-plane inter-stage connection member provides six degrees of constraint between said third intermediate body and said fourth intermediate body.

6. The flexure mechanism assembly as set forth in claim 1, wherein said at least one in-plane inter-stage connection member comprises a first in-plane inter-stage connection member that extends between a pair of respective first and second first secondary bodies.

7. The flexure mechanism assembly as set forth in claim 6, wherein said at least one in-plane inter-stage connection member comprises a second in-plane inter-stage connection member that extends between a respective pair of third and fourth first secondary bodies.

8. The flexure mechanism assembly as set forth in claim 7, wherein said first in-plane inter-stage connection member provides at least four degrees of constraint between said first first secondary body and said second first secondary body, and said second in-plane inter-stage connection member provides at least four degrees of constraint between said third first secondary body and said fourth first secondary body.

9. The flexure mechanism assembly as set forth in claim 1, wherein said at least one in-plane inter-stage connection member comprises at least a first in-plane inter-stage connection member that extends between a pair of respective intermediate bodies, and at least a second in-plane inter-stage connection member that extends between a pair of respective first secondary bodies.

10. A flexure mechanism assembly, comprising:
- a ground body plate;
- a motion body plate disposed within a central aperture of said ground body plate, said motion body plate being coplanar with or parallel to said ground body plate;
- a plurality of intermediate bodies arranged between said motion body plate and said ground body plate, a pair of first and second intermediate bodies disposed on opposing sides of said motion body plate;
- a plurality of flexure modules arranged between said ground body and said motion body, said plurality of flexure modules comprising:
- a first flexure module extending between said ground body plate and said first intermediate body;
- a second flexure module extending between said motion body plate and said first intermediate body;
- a third flexure module extending between said ground body plate and said second intermediate body;
- a fourth flexure module extending between said motion body plate and said second intermediate body; and
- at least one rigid in-plane inter-stage connection member extending between said first intermediate body and said second intermediate body, wherein said at least one in-plane inter-stage connection member provides six degrees of constraint between said first intermediate body and said second intermediate body, wherein said at least one in-plane inter-stage connection member spans opposite sides of at least one of said motion body plate and said ground body plate.

11. The flexure mechanism assembly as set forth in claim 10, wherein said first intermediate body and said second intermediate body exhibit kinematically compatible motion with respect to each other amid use of the flexure mechanism assembly.

12. The flexure mechanism assembly as set forth in claim 10, further comprising a pair of third and fourth intermediate bodies disposed on opposing sides of said motion body plate, and wherein said at least one in-plane rigid inter-stage connection member comprises a first in-plane rigid inter-stage connection member extending between said first intermediate body and said second intermediate body, and comprises a second in-plane rigid inter-stage connection member extending between said third intermediate body and said fourth intermediate body.

13. The flexure mechanism assembly as set forth in claim 12, wherein said third intermediate body and said fourth intermediate body exhibit kinematically compatible motion with respect to each other amid use of the flexure mechanism assembly.

14. The flexure mechanism assembly as set forth in claim 10, wherein said first intermediate body is situated on a first side of said motion body plate and said second intermediate body is situated on a second, opposite side of said motion body plate.

15. A flexure mechanism assembly, comprising:
- a ground body plate;
- a motion body plate disposed within a central aperture of said ground body plate, said motion body plate being coplanar with or parallel to said ground body plate;
- at least four intermediate bodies arranged between said motion body plate and said ground body plate, a pair of first and second intermediate bodies and a pair of third and fourth intermediate bodies each disposed on opposing sides of said motion body plate, respectively;
- at least four flexure modules arranged between said ground body and said motion body, said flexure modules comprising:
- a first flexure module connected to said ground body plate and to said first intermediate body;
- a second flexure module connected to said motion body plate and to said second intermediate body;
- a third flexure module connected to said ground body plate and to said third intermediate body;
- a fourth flexure module connected to said motion body plate and to said fourth intermediate body;
- a fifth flexure module connected to said motion body plate and to said first intermediate body:
- a sixth flexure module connected to said ground body plate and to said second intermediate body;
- a seventh flexure module connected to said motion body plate and to said third intermediate body; and
- an eighth flexure module connected to said ground body plate and to said fourth intermediate body:

at least one rigid first in-plane inter-stage connection member extending between said first intermediate body and said second intermediate body, wherein said first intermediate body is situated on a first side of said motion body plate and said second intermediate body is situated on a second side of said motion body plate, said first side is opposite said second side; and at least one rigid second in-plane inter-stage connection member extending between said third intermediate body and said fourth intermediate body, wherein said third intermediate body is situated on a third side of said motion body plate and said fourth intermediate body is situated on a fourth side of said motion body plate, said third side is opposite said fourth side.

16. The flexure mechanism assembly as set forth in claim 15, wherein said at least one first in-plane inter-stage connection member provides six degrees of constraint between said first intermediate body and said second intermediate body, and said at least one second in-plane inter-stage connection member provides six degrees of constraint between said third intermediate body and said fourth intermediate body.

* * * * *